United States Patent
Yerkes et al.

(10) Patent No.: US 12,481,357 B2
(45) Date of Patent: Nov. 25, 2025

(54) DEVICES, METHODS, FOR INTERACTING WITH GRAPHICAL USER INTERFACES

(71) Applicant: Apple Inc., Cupertino, CA (US)

(72) Inventors: Giancarlo Yerkes, San Francisco, CA (US); Allison W. Dryer, Tiburon, CA (US); Gregory Lutter, Boulder Creek, CA (US); Brian W. Temple, Santa Clara, CA (US); Devin W. Chalmers, Oakland, CA (US); Luis R. Deliz Centeno, Fremont, CA (US); Anshu K. Chimalamarri, Sunnyvale, CA (US); Nahckjoon Kim, Sunnyvale, CA (US); Jessica Trinh, Oakland, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 18/370,847

(22) Filed: Sep. 20, 2023

(65) Prior Publication Data

US 2024/0103614 A1   Mar. 28, 2024

Related U.S. Application Data

(60) Provisional application No. 63/409,744, filed on Sep. 24, 2022.

(51) Int. Cl.
*G06F 3/01* (2006.01)
*G06F 3/04815* (2022.01)
*G06F 3/16* (2006.01)

(52) U.S. Cl.
CPC .......... *G06F 3/013* (2013.01); *G06F 3/04815* (2013.01); *G06F 3/165* (2013.01)

(58) Field of Classification Search
None
See application file for complete search history.

(56) References Cited

U.S. PATENT DOCUMENTS

| | | |
|---|---|---|
| 5,046,001 A | 9/1991 | Barker et al. |
| 5,422,993 A | 6/1995 | Fleming |
| 5,430,496 A | 7/1995 | Silverbrook et al. |

(Continued)

FOREIGN PATENT DOCUMENTS

| | | |
|---|---|---|
| CN | 102843523 A | 12/2012 |
| CN | 103164017 A | 6/2013 |

(Continued)

OTHER PUBLICATIONS

Office Action received for Chinese Patent Application No. 202210616910.7, mailed on Nov. 22, 2024, 17 pages (9 pages of English Translation and 8 pages of Official Copy).

(Continued)

*Primary Examiner* — Tuan S Nguyen
(74) *Attorney, Agent, or Firm* — DLA Piper LLP (US)

(57) ABSTRACT

In some embodiments, the present disclosure includes techniques and user interfaces for interacting with graphical user interfaces using gaze. In some embodiments, the present disclosure includes techniques and user interfaces for repositioning virtual objects. In some embodiments, the present disclosure includes techniques and user interfaces for transitioning modes of a camera capture user interface.

37 Claims, 31 Drawing Sheets

(56) References Cited

U.S. PATENT DOCUMENTS

| | | | |
|---|---|---|---|
| 5,557,711 A | 9/1996 | Malzbender et al. |
| 5,608,860 A | 3/1997 | Fitzpatrick et al. |
| 5,651,107 A | 7/1997 | Frank et al. |
| 5,664,133 A | 9/1997 | Malamud et al. |
| 5,765,179 A | 6/1998 | Sumita et al. |
| 5,786,818 A | 7/1998 | Brewer et al. |
| 5,808,605 A | 9/1998 | Shieh |
| 5,825,360 A | 10/1998 | Odam et al. |
| 5,859,639 A | 1/1999 | Ebrahim |
| 5,880,735 A | 3/1999 | Shinohara et al. |
| 5,949,432 A | 9/1999 | Gough et al. |
| 5,973,702 A | 10/1999 | Orton et al. |
| 5,999,178 A | 12/1999 | Hwang et al. |
| 6,118,427 A | 9/2000 | Buxton et al. |
| 6,202,096 B1 | 3/2001 | Arnold et al. |
| 6,411,312 B1 | 6/2002 | Sheppard et al. |
| 6,429,883 B1 | 8/2002 | Plow et al. |
| 6,456,285 B2 | 9/2002 | Hayhurst et al. |
| 6,483,519 B1 | 11/2002 | Long et al. |
| 6,515,675 B1 | 2/2003 | Bourdev et al. |
| 6,628,309 B1 | 9/2003 | Dodson et al. |
| 6,636,245 B1 | 10/2003 | Estipona et al. |
| 6,654,036 B1 | 11/2003 | Jones |
| 6,670,970 B1 | 12/2003 | Silverman et al. |
| 6,801,230 B2 | 10/2004 | Driskell et al. |
| 6,907,576 B2 | 6/2005 | Barbanson et al. |
| 6,915,490 B1 | 7/2005 | Ewing |
| 7,136,064 B2 | 11/2006 | Zuiderveld et al. |
| 7,168,084 B1 | 1/2007 | Asmussen et al. |
| 7,260,390 B1 | 8/2007 | Skinner et al. |
| 7,283,064 B2 | 10/2007 | He et al. |
| 7,343,562 B2 | 3/2008 | Silverman et al. |
| 7,355,609 B1 | 4/2008 | Voas et al. |
| 7,577,700 B2 | 8/2009 | Tolson et al. |
| 7,739,604 B1 | 6/2010 | Lyons et al. |
| 7,752,566 B1 | 7/2010 | Nelson et al. |
| RE41,922 E | 11/2010 | Gough et al. |
| 7,975,399 B2 | 7/2011 | Kikinis et al. |
| 8,408,706 B2 | 4/2013 | Yahav |
| 8,487,867 B2 | 7/2013 | Wu et al. |
| 8,701,030 B2 | 4/2014 | Lyons et al. |
| 8,949,728 B2 | 2/2015 | Silverman et al. |
| 9,007,301 B1 | 4/2015 | Raffle et al. |
| 9,088,532 B1 | 7/2015 | Dorsey et al. |
| 9,092,128 B2 | 7/2015 | Toprani et al. |
| 9,098,166 B2 | 8/2015 | Bonura et al. |
| 9,507,501 B2 | 11/2016 | Silverman et al. |
| 10,110,678 B2 | 10/2018 | Hebsur et al. |
| 10,248,399 B2 | 4/2019 | Yoon |
| 10,353,532 B1 | 7/2019 | Holz et al. |
| 11,132,162 B2 | 9/2021 | Bar-Zeev et al. |
| 11,550,444 B2 | 1/2023 | Josephson et al. |
| 11,714,592 B2 | 8/2023 | Bar-Zeev et al. |
| 2001/0012018 A1 | 8/2001 | Hayhurst et al. |
| 2002/0070935 A1 | 6/2002 | Suzuki et al. |
| 2002/0113943 A1 | 8/2002 | Trajkovic et al. |
| 2003/0076362 A1 | 4/2003 | Terada et al. |
| 2003/0197739 A1 | 10/2003 | Bauer et al. |
| 2003/0221167 A1 | 11/2003 | Goldstein et al. |
| 2003/0222915 A1 | 12/2003 | Marion et al. |
| 2004/0076177 A1 | 4/2004 | Koch et al. |
| 2004/0090467 A1 | 5/2004 | Bonura et al. |
| 2004/0150584 A1 | 8/2004 | Chuman et al. |
| 2004/0257384 A1 | 12/2004 | Park et al. |
| 2005/0091578 A1 | 4/2005 | Madan et al. |
| 2005/0175218 A1 | 8/2005 | Vertegaal et al. |
| 2005/0198585 A1 | 9/2005 | Haynes et al. |
| 2005/0278585 A1 | 12/2005 | Spencer et al. |
| 2006/0038796 A1 | 2/2006 | Hinckley et al. |
| 2006/0048072 A1 | 3/2006 | Jarrett et al. |
| 2006/0242596 A1 | 10/2006 | Armstrong |
| 2006/0277467 A1 | 12/2006 | Reponen et al. |
| 2007/0162872 A1 | 7/2007 | Hong et al. |
| 2007/0260984 A1 | 11/2007 | Marks et al. |
| 2008/0154494 A1 | 6/2008 | Kato et al. |
| 2008/0155438 A1 | 6/2008 | Bonura et al. |
| 2008/0165146 A1 | 7/2008 | Matas |
| 2008/0167078 A1 | 7/2008 | Eibye et al. |
| 2008/0181452 A1 | 7/2008 | Kwon et al. |
| 2008/0201650 A1 | 8/2008 | Lemay et al. |
| 2008/0211766 A1 | 9/2008 | Westerman et al. |
| 2008/0294981 A1 | 11/2008 | Balzano et al. |
| 2008/0307360 A1 | 12/2008 | Chaudhri et al. |
| 2009/0058828 A1 | 3/2009 | Jiang et al. |
| 2009/0128567 A1 | 5/2009 | Shuster et al. |
| 2009/0293004 A1 | 11/2009 | Emam et al. |
| 2010/0269038 A1 | 10/2010 | Tsuda et al. |
| 2011/0037712 A1 | 2/2011 | Kim et al. |
| 2011/0090255 A1 | 4/2011 | Wilson et al. |
| 2011/0161890 A1 | 6/2011 | Anderson et al. |
| 2011/0225492 A1 | 9/2011 | Boettcher et al. |
| 2012/0249416 A1 | 10/2012 | Maciocci et al. |
| 2012/0306890 A1 | 12/2012 | Shaffer et al. |
| 2013/0007668 A1 | 1/2013 | Liu et al. |
| 2013/0042296 A1* | 2/2013 | Hastings ............ G06Q 50/184 726/1 |
| 2013/0050258 A1 | 2/2013 | Liu et al. |
| 2013/0050432 A1 | 2/2013 | Perez et al. |
| 2013/0080927 A1 | 3/2013 | Weaver et al. |
| 2013/0141419 A1 | 6/2013 | Mount et al. |
| 2013/0241805 A1 | 9/2013 | Gomez |
| 2013/0283208 A1 | 10/2013 | Bychkov et al. |
| 2013/0328762 A1 | 12/2013 | Mcculloch et al. |
| 2014/0043227 A1 | 2/2014 | Skogoe et al. |
| 2014/0096076 A1 | 4/2014 | Ashbrook et al. |
| 2014/0160001 A1 | 6/2014 | Kinnebrew et al. |
| 2014/0184550 A1 | 7/2014 | Hennessey et al. |
| 2014/0201844 A1 | 7/2014 | Buck |
| 2014/0204002 A1 | 7/2014 | Bennet et al. |
| 2014/0240471 A1 | 8/2014 | Srinivasa et al. |
| 2014/0253592 A1 | 9/2014 | Cho |
| 2014/0333666 A1 | 11/2014 | Poulos et al. |
| 2014/0344737 A1 | 11/2014 | Silverman et al. |
| 2015/0084857 A1 | 3/2015 | Kimura |
| 2015/0100803 A1 | 4/2015 | Chen et al. |
| 2015/0103149 A1 | 4/2015 | Mcnamer et al. |
| 2015/0130716 A1 | 5/2015 | Sridharan et al. |
| 2015/0138079 A1 | 5/2015 | Lannsjö |
| 2015/0162006 A1 | 6/2015 | Kummer |
| 2015/0199005 A1 | 7/2015 | Haddon |
| 2015/0205494 A1 | 7/2015 | Scott et al. |
| 2015/0268821 A1 | 9/2015 | Ramsby et al. |
| 2015/0293592 A1 | 10/2015 | Cheong et al. |
| 2015/0317518 A1 | 11/2015 | Fujimaki et al. |
| 2015/0317837 A1 | 11/2015 | Sholudko et al. |
| 2015/0323990 A1 | 11/2015 | Maltz |
| 2015/0339040 A1 | 11/2015 | Silverman et al. |
| 2015/0347114 A1 | 12/2015 | Yoon |
| 2015/0362729 A1 | 12/2015 | Jang et al. |
| 2016/0005229 A1* | 1/2016 | Lee .................. G06T 11/60 345/419 |
| 2016/0018645 A1 | 1/2016 | Haddick et al. |
| 2016/0018654 A1 | 1/2016 | Haddick et al. |
| 2016/0025981 A1 | 1/2016 | Burns et al. |
| 2016/0026242 A1 | 1/2016 | Burns et al. |
| 2016/0026253 A1 | 1/2016 | Bradski et al. |
| 2016/0085301 A1 | 3/2016 | Lopez |
| 2016/0116980 A1 | 4/2016 | George-Svahn et al. |
| 2016/0179336 A1 | 6/2016 | Ambrus et al. |
| 2016/0182877 A1 | 6/2016 | Deluca |
| 2016/0241767 A1 | 8/2016 | Cho et al. |
| 2016/0262614 A1 | 9/2016 | Ninomiya et al. |
| 2016/0267708 A1 | 9/2016 | Nistico et al. |
| 2016/0274762 A1 | 9/2016 | Lopez et al. |
| 2016/0284123 A1 | 9/2016 | Hare et al. |
| 2016/0292759 A1 | 10/2016 | Gonzalez Miranda et al. |
| 2016/0295038 A1 | 10/2016 | Rao et al. |
| 2016/0313875 A1 | 10/2016 | Williams et al. |
| 2016/0371888 A1 | 12/2016 | Wright et al. |
| 2016/0379418 A1 | 12/2016 | Osborn et al. |
| 2017/0038829 A1 | 2/2017 | Lanier et al. |
| 2017/0060230 A1* | 3/2017 | Faaborg ............ G06F 3/017 |
| 2017/0060371 A1 | 3/2017 | Bonura et al. |
| 2017/0078825 A1 | 3/2017 | Mangiat et al. |

(56) References Cited

U.S. PATENT DOCUMENTS

| | | | |
|---|---|---|---|
| 2017/0090566 A1 | 3/2017 | George-Svahn et al. | |
| 2017/0099481 A1 | 4/2017 | Held et al. | |
| 2017/0123491 A1* | 5/2017 | Hansen | G06F 3/012 |
| 2017/0134553 A1 | 5/2017 | Jeon et al. | |
| 2017/0153701 A1 | 6/2017 | Mahon et al. | |
| 2017/0185156 A1 | 6/2017 | Shotton et al. | |
| 2017/0185276 A1 | 6/2017 | Lee et al. | |
| 2017/0194768 A1 | 7/2017 | Powers et al. | |
| 2017/0221276 A1 | 8/2017 | Osborn et al. | |
| 2017/0237974 A1 | 8/2017 | Samec et al. | |
| 2017/0285737 A1* | 10/2017 | Khalid | G06F 3/013 |
| 2017/0318019 A1 | 11/2017 | Gordon et al. | |
| 2018/0004283 A1 | 1/2018 | Mathey-Owens et al. | |
| 2018/0054487 A1 | 2/2018 | Hebsur et al. | |
| 2018/0081171 A1 | 3/2018 | Park et al. | |
| 2018/0095635 A1 | 4/2018 | Valdivia et al. | |
| 2018/0096202 A1 | 4/2018 | Stathacopoulos et al. | |
| 2018/0204385 A1 | 7/2018 | Sarangdhar et al. | |
| 2018/0249086 A1 | 8/2018 | Ozawa et al. | |
| 2019/0025910 A1 | 1/2019 | Gilra | |
| 2019/0122420 A1 | 4/2019 | Terahata | |
| 2019/0244416 A1 | 8/2019 | Tamaoki et al. | |
| 2019/0318660 A1 | 10/2019 | Kimoto | |
| 2019/0378423 A1 | 12/2019 | Bachrach et al. | |
| 2020/0192622 A1 | 6/2020 | Stoyles et al. | |
| 2020/0201444 A1 | 6/2020 | Stoyles et al. | |
| 2020/0225746 A1 | 7/2020 | Bar-Zeev et al. | |
| 2020/0225747 A1* | 7/2020 | Bar-Zeev | G06F 3/017 |
| 2020/0301553 A1 | 9/2020 | Taylor et al. | |
| 2021/0096726 A1 | 4/2021 | Faulkner et al. | |
| 2021/0097776 A1 | 4/2021 | Faulkner et al. | |
| 2021/0240331 A1 | 8/2021 | Olson et al. | |
| 2021/0365228 A1 | 11/2021 | Stoyles et al. | |
| 2022/0012002 A1 | 1/2022 | Bar-Zeev et al. | |
| 2022/0083303 A1 | 3/2022 | Stoyles et al. | |
| 2022/0245900 A1 | 8/2022 | Tan et al. | |
| 2023/0325140 A1 | 10/2023 | Bar-Zeev et al. | |
| 2023/0376261 A1 | 11/2023 | Stoyles et al. | |
| 2023/0393796 A1 | 12/2023 | Stoyles et al. | |
| 2024/0104871 A1 | 3/2024 | Brewer et al. | |
| 2024/0411497 A1 | 12/2024 | Stoyles et al. | |
| 2025/0103133 A1 | 3/2025 | Pastrana Vicente et al. | |
| 2025/0190161 A1 | 6/2025 | Stoyles et al. | |

FOREIGN PATENT DOCUMENTS

| | | |
|---|---|---|
| CN | 103460256 A | 12/2013 |
| CN | 103765346 A | 4/2014 |
| CN | 104516497 A | 4/2015 |
| CN | 105009039 A | 10/2015 |
| CN | 105393190 A | 3/2016 |
| CN | 105493501 A | 4/2016 |
| CN | 106164818 A | 11/2016 |
| CN | 106371206 A | 2/2017 |
| CN | 106415444 A | 2/2017 |
| CN | 106462231 A | 2/2017 |
| CN | 106462733 A | 2/2017 |
| CN | 106951069 A | 7/2017 |
| CN | 107003521 A | 8/2017 |
| EP | 0513584 A2 | 11/1992 |
| EP | 0548709 A2 | 6/1993 |
| EP | 0605945 A1 | 7/1994 |
| EP | 1242989 A1 | 9/2002 |
| EP | 1055200 B1 | 5/2003 |
| EP | 2940556 A1 | 11/2015 |
| EP | 2947546 A1 | 11/2015 |
| EP | 3118722 A1 | 1/2017 |
| JP | 2004-37149 A | 2/2004 |
| JP | 2004-513403 A | 4/2004 |
| JP | 2004-517359 A | 6/2004 |
| JP | 2005-157329 A | 6/2005 |
| JP | 2008-158583 A | 7/2008 |
| JP | 2009-64395 A | 3/2009 |
| JP | 2012-221498 A | 11/2012 |
| JP | 2015-90635 A | 5/2015 |
| JP | 2015-126857 A | 7/2015 |
| JP | 2016-502120 A | 1/2016 |
| JP | 2016-85588 A | 5/2016 |
| JP | 2016-192132 A | 11/2016 |
| KR | 10-2002-0086590 A | 11/2002 |
| KR | 10-2007-0067332 A | 6/2007 |
| KR | 10-2015-0125472 A | 11/2015 |
| WO | 98/37483 A1 | 8/1998 |
| WO | 2013/144807 A1 | 10/2013 |
| WO | 2014/033306 A1 | 3/2014 |
| WO | 2014/204755 A1 | 12/2014 |
| WO | 2015/110852 A1 | 7/2015 |
| WO | 2015/140106 A1 | 9/2015 |
| WO | 2015/142966 A1 | 9/2015 |
| WO | 2016/045784 A1 | 3/2016 |
| WO | 2016/099706 A1 | 6/2016 |
| WO | 2017/031089 A1 | 2/2017 |
| WO | 2017/096097 A1 | 6/2017 |
| WO | 2017/112692 A2 | 6/2017 |
| WO | 2023/049170 A2 | 3/2023 |

OTHER PUBLICATIONS

Applicant-Initiated Interview Summary received for U.S. Appl. No. 18/209,931, mailed on Nov. 27, 2024, 2 pages.
Decision to Grant received for Japanese Patent Application No. 2023-149802, mailed on Dec. 3, 2024, 3 pages (1 page of English Translation and 2 pages of Official Copy).
Final Office Action received for U.S. Appl. No. 18/209,931, mailed on Dec. 13, 2024, 23 pages.
Notice of Allowance received for U.S. Appl. No. 18/235,693, mailed on Dec. 13, 2024, 10 pages.
Office Action received for Korean Patent Application No. 10-2023-7022376, mailed on Oct. 21, 2024, 7 pages (2 pages of English Translation and 5 pages of Official Copy).
Non-Final Office Action received for U.S. Appl. No. 18/209,931, mailed on Oct. 22, 2024, 18 pages.
103164017, CN, A, Cited by Chinese Patent Office in an Office Action for related Patent Application No. 201980028660.1 on Oct. 18, 2023.
2004-37149, JP, A, Cited by Chinese Patent Office in an Office Action for related Patent Application No. 201980028660.1 on Oct. 18, 2023.
2009-64395, JP, A, Cited by Chinese Patent Office in an Office Action for related Patent Application No. 201980028660.1 on Oct. 18, 2023.
International Preliminary Report on Patentability received for PCT Patent Application No. PCT/US2023/033501, mailed on Apr. 3, 2025, 16 pages.
International Preliminary Report on Patentability received for PCT Patent Application No. PCT/US2023/033549, mailed on Apr. 3, 2025, 10 pages.
International Search Report and Written Opinion received for PCT Patent Application No. PCT/US2024/045209, mailed on Jan. 31, 2025, 14 pages.
Invitation to Pay Additional Fees and Partial International Search Report received for PCT Patent Application No. PCT/US2024/045209, mailed on Dec. 10, 2024, 11 pages.
Non-Final Office Action received for U.S. Appl. No. 18/209,931, mailed on Apr. 10, 2025, 7 pages.
Notice of Allowance received for Chinese Patent Application No. 202210618012.5, mailed on Jan. 1, 2025, 5 pages (1 page of English Translation and 4 pages of Official Copy).
Applicant-Initiated Interview Summary received for U.S. Appl. No. 18/209,931, mailed on Feb. 3, 2025, 4 pages.
Applicant-Initiated Interview Summary received for U.S. Appl. No. 18/229,059, mailed on Apr. 26, 2024, 2 pages.
Chatterjee et al., "Gaze+Gesture: Expressive, Precise and Targeted Free-Space Interactions", ICMI '15: Proceedings of the 2015 ACM on International Conference on Multimodal Interaction, Online available at: https://dl.acm.org/doi/10.1145/2818346.2820752, Nov. 9-13, 2015, pp. 131-138.
Extended European Search Report received for European Patent Application No. 23173161.3, mailed on Oct. 30, 2023, 9 pages.

(56) References Cited

OTHER PUBLICATIONS

Extended European Search Report received for European Patent Application No. 23219457.1, mailed on Apr. 16, 2024, 10 pages.
International Search Report and Written Opinion received for PCT Patent Application No. PCT/US2023/033501, mailed on Feb. 26, 2024, 21 pages.
International Search Report and Written Opinion received for PCT Patent Application No. PCT/US2023/033549, mailed on Jan. 15, 2024, 15 pages.
Invitation to Pay Additional Fees and Partial International Search Report received for PCT Patent Application No. PCT/US2023/033501, mailed on Jan. 5, 2024, 15 pages.
Non-Final Office Action received for U.S. Appl. No. 18/229,059, mailed on Mar. 7, 2024, 15 pages.
Non-Final Office Action received for U.S. Appl. No. 18/235,693, mailed on Jul. 3, 2024, 25 pages.
Notice of Allowance received for Chinese Patent Application No. 201980028660.1, mailed on Feb. 27, 2024, 2 pages (1 page of English Translation and 1 page of Official Copy).
Notice of Allowance received for U.S. Appl. No. 18/229,059, mailed on Jul. 11, 2024, 7 pages.
Notice of Allowance received for U.S. Appl. No. 18/235,693, mailed on Aug. 28, 2024, 11 pages.
Office Action received for Chinese Patent Application No. 201980028660.1, mailed on Oct. 18, 2023, 11 pages (5 pages of English Translation and 6 pages of Official Copy).
Office Action received for Chinese Patent Application No. 202210616910.7, mailed on Aug. 8, 2024, 19 pages (10 pages of English Translation and 9 pages of Official Copy).
Office Action received for Chinese Patent Application No. 202210618012.5, mailed on Aug. 9, 2024, 16 pages (9 pages of English Translation and 7 pages of Official Copy).
Office Action received for Japanese Patent Application No. 2023-149802, mailed on Jul. 29, 2024, 2 pages (1 page of English Translation and 1 page of Official Copy).
Office Action received for Korean Patent Application No. 10-2023-7022376, mailed on Jan. 30, 2024, 9 pages (4 pages of English Translation and 5 pages of Official Copy).
Notice of Allowance received for U.S. Appl. No. 18/209,931, mailed on May 21, 2025, 16 pages.
Notice of Allowance received for U.S. Appl. No. 18/370,363, mailed on May 29, 2025, 14 pages.
Non-Final Office Action received for U.S. Appl. No. 18/811,647, mailed on Jun. 30, 2025, 12 pages.
2004-517359, JP, A, Cited by Korean Patent Office in an Office Action for related Patent Application No. 10-2023-7022376 on Oct. 21, 2024.
Corrected Notice of Allowance received for U.S. Appl. No. 18/235,693, mailed on Feb. 20, 2025, 2 pages.
Advisory Action received for U.S. Appl. No. 09/467,316, mailed on May 21, 2003, 2 pages.
Advisory Action received for U.S. Appl. No. 13/247,965, mailed on Jan. 26, 2015, 6 pages.
Advisory Action received for U.S. Appl. No. 10/213,929, mailed on Sep. 22, 2006, 3 pages.
Advisory Action received for U.S. Appl. No. 90/013,146, mailed on Jul. 7, 2015, 16 pages.
Applicant-Initiated Interview Summary received for U.S. Appl. No. 16/802,188, mailed on Mar. 23, 2021, 2 pages.
Applicant-Initiated Interview Summary received for U.S. Appl. No. 16/802,320, mailed on Apr. 9, 2021, 2 pages.
Applicant-Initiated Interview Summary received for U.S. Appl. No. 16/828,852, mailed on Jan. 27, 2021, 4 pages.
Applicant-Initiated Interview Summary received for U.S. Appl. No. 16/828,852, mailed on Jun. 8, 2021, 2 pages.
Applicant-Initiated Interview Summary received for U.S. Appl. No. 16/828,857, mailed on Jun. 10, 2021, 3 pages.
Applicant-Initiated Interview Summary received for U.S. Appl. No. 17/052,081, mailed on Oct. 18, 2021, 4 pages.
Applicant-Initiated Interview Summary received for U.S. Appl. No. 17/486,646, mailed on Aug. 23, 2022, 2 pages.
Applicant-Initiated Interview Summary received for U.S. Appl. No. 17/486,646, mailed on Dec. 28, 2022, 2 pages.
Applicant-Initiated Interview Summary received for U.S. Appl. No. 17/534,102, mailed on Sep. 27, 2022, 2 pages.
Brief Communication regarding Oral Proceedings received for European Patent Application No. 18786644.7, mailed on Feb. 27, 2023, 3 pages.
Businesswire, "SMI Gaze Interaction Powers Google Glass Prototype", Online Available at: https://www.youtube.com/watch?v=R3xxqap7DmQ&t=1s, Mar. 3, 2015, 3 pages.
Chester et al., "Mastering Excel 97", Sybex Inc., Fourth Edition, pp. 6, 35, and 44-45.
Corrected Notice of Allowance received for U.S. Appl. No. 16/828,857, mailed on Sep. 1, 2021, 3 pages.
Corrected Notice of Allowance received for U.S. Appl. No. 17/394,114, mailed on Jun. 14, 2023, 2 pages.
Cowart Robert, "Mastering Windows 3.1", Sybex, Special Edition, 1993, pp. 66-67.
Decision of Rejection received for Japanese Patent Application No. 2021-142308, mailed on May 15, 2023, 4 pages (2 pages of English Translation and 2 pages of Official Copy).
Decision to Grant received for European Patent Application No. 00982078.8, mailed on Jun. 16, 2016, 2 pages.
Decision to Grant received for European Patent Application No. 10011078.2, mailed on Mar. 12, 2015, 2 pages.
Decision to Grant received for Japanese Patent Application No. 2020-512573, mailed on Aug. 2, 2021, 3 pages (1 page of English Translation and 2 pages of Official Copy).
Decision to Refuse received for European Patent Application No. 18786644.7, mailed on Mar. 27, 2023, 9 pages.
Ex Parte Reexamination Office Action in received for U.S. Appl. No. 90/013,146, mailed on Jan. 8, 2019, 13 pages.
Extended European Search Report (includes European Search Report and Search Opinion) received for European Patent Application No. 10011078.2, mailed on Apr. 15, 2011, 10 pages.
Feronato Emanuele, "Box2D: Tutorial for the Absolute Beginners", available at <http://web.archive.org/web/20101208032155/http://www.emanueleferonato.com/2009/01/27/box2d-tutorial-for-the-absolute-beginners/>, Jan. 27, 2009, 18 pages.
Final Office Action received for U.S. Appl. No. 09/467,316, mailed on Mar. 10, 2003, 11 pages.
Final Office Action received for U.S. Appl. No. 09/467,316, mailed on Oct. 3, 2002, 11 pages.
Final Office Action received for U.S. Appl. No. 10/213,929, mailed on Dec. 14, 2004, 13 pages.
Final Office Action received for U.S. Appl. No. 10/213,929, mailed on Jul. 25, 2007, 25 pages.
Final Office Action received for U.S. Appl. No. 10/213,929, mailed on Mar. 22, 2006, 22 pages.
Final Office Action received for U.S. Appl. No. 10/255,899, mailed on Apr. 9, 2008, 25 pages.
Final Office Action received for U.S. Appl. No. 10/255,899, mailed on Apr. 10, 2007, 21 pages.
Final Office Action received for U.S. Appl. No. 10/255,899, mailed on Apr. 28, 2009, 29 pages.
Final Office Action received for U.S. Appl. No. 12/046,171, mailed on Oct. 14, 2011, 9 pages.
Final Office Action received for U.S. Appl. No. 12/722,428, mailed on Aug. 16, 2012, 16 pages.
Final Office Action received for U.S. Appl. No. 12/785,408, mailed on Dec. 18, 2014, 28 pages.
Final Office Action received for U.S. Appl. No. 12/785,408, mailed on Nov. 5, 2012, 19 pages.
Final Office Action received for U.S. Appl. No. 13/247,965, mailed on Apr. 10, 2014, 12 pages.
Final Office Action received for U.S. Appl. No. 13/247,969, mailed on Jan. 30, 2015, 15 pages.
Final Office Action received for U.S. Appl. No. 16/802,188, mailed on May 14, 2021, 18 pages.
Final Office Action received for U.S. Appl. No. 16/828,852, mailed on Mar. 9, 2021, 16 pages.

(56) References Cited

OTHER PUBLICATIONS

Final Office Action received for U.S. Appl. No. 17/486,646, mailed on Oct. 5, 2022, 20 pages.
Final Office Action received for U.S. Appl. No. 17/534,102, mailed on Nov. 30, 2022, 14 pages.
Final Office Action received for U.S. Appl. No. 90/013,146, mailed on Mar. 17, 2015, 49 pages.
Howmuchtech, "5 Best Smart Glasses of 2022", Online Available at: https://www.youtube.com/watch?v=xll2Ycc6Fv0&t=162s, Dec. 24, 2021, 6 pages.
IBM, "Translucent Window Attribute", IBM Technical Disclosure Bulletin, vol. 36, No. 6a, Jun. 1, 1993, pp. 135-136.
Intention to Grant received for European Patent Application No. 00982078.8, mailed on Jan. 25, 2016, 8 pages.
Intention to Grant received for European Patent Application No. 10011078.2, mailed on Oct. 21, 2014, 10 pages.
International Business Machines, "Reducing Desktop Clutter in GUI", Research Disclosure, Mason Publications, vol. 411, No. 119, Jul. 1, 1998, 1 page.
International Preliminary Examination Report received for PCT Patent Application No. PCT/US2000/030158, mailed on Jul. 22, 2002, 5 pages.
International Preliminary Report on Patentability received for PCT Patent Application No. PCT/US2018/053415, mailed on Apr. 9, 2020, 10 pages.
International Preliminary Report on Patentability received for PCT Patent Application No. PCT/US2018/053422, mailed on Apr. 9, 2020, 10 pages.
International Preliminary Report on Patentability received for PCT Patent Application No. PCT/US2018/053427, mailed on Apr. 9, 2020, 14 pages.
International Preliminary Report on Patentability received for PCT Patent Application No. PCT/US2018/053428, mailed on Apr. 9, 2020, 8 pages.
International Preliminary Report on Patentability received for PCT Patent Application No. PCT/US2019/028980, mailed on Nov. 19, 2020, 10 pages.
International Search Report and Written Opinion received for PCT Patent Application No. PCT/US2000/030158, mailed on Apr. 2, 2001, 6 pages.
International Search Report and Written Opinion received for PCT Patent Application No. PCT/US2018/053415, mailed on Dec. 13, 2018, 14 pages.
International Search Report and Written Opinion received for PCT Patent Application No. PCT/US2018/053422, mailed on Dec. 19, 2018, 13 pages.
International Search Report and Written Opinion received for PCT Patent Application No. PCT/US2018/053427, mailed on Mar. 25, 2019, 18 pages.
International Search Report and Written Opinion received for PCT Patent Application No. PCT/US2018/053428, mailed on Jan. 25, 2019, 9 pages.
International Search Report and Written Opinion received for PCT Patent Application No. PCT/US2019/028980, mailed on Aug. 16, 2019, 14 pages.
Invitation to Pay Additional Fees received for PCT Patent Application No. PCT/US2018/053427, mailed on Feb. 1, 2019, 13 pages.
Kunhee et al., "Distant 3D Object Grasping with Gaze-supported Selection", The 12th International Conference on Ubiquitous Robots and Ambient Intelligence (URAI 2015), Oct. 28-30, 2015, pp. 541-544.
Liu et al., "Video avatar-based remote video collaboration", Journal of Beijing University of Aeronautics and Astronautics, vol. 41, No. 6, Jun. 2015, pp. 1087-1094 (Official Copy Only) {See Communication under 37 CFR § 1.98(a) (3)}.
Minutes of the Oral Proceedings received for European Patent Application No. 18786644.7, mailed on Mar. 24, 2023, 5 pages.
Non-Final Office Action received for U.S. Appl. No. 11/961,743, mailed on Jun. 17, 2011, 18 pages.
Non-Final Office Action received for U.S. Appl. No. 12/722,428, mailed on Mar. 15, 2012, 18 pages.
Non-Final Office Action received for U.S. Appl. No. 12/785,408, mailed on Apr. 23, 2012, 28 pages.
Non-Final Office Action received for U.S. Appl. No. 12/785,408, mailed on Mar. 27, 2014, 20 pages.
Non-Final Office Action received for U.S. Appl. No. 13/247,965, mailed on Sep. 25, 2013, 11 pages.
Non-Final Office Action received for U.S. Appl. No. 13/247,969, mailed on Apr. 14, 2014, 14 pages.
Non-Final Office Action received for U.S. Appl. No. 13/247,969, mailed on Sep. 25, 2013, 11 pages.
Non-Final Office Action received for U.S. Appl. No. 16/802,188, mailed on Dec. 16, 2020, 15 pages.
Non-Final Office Action received for U.S. Appl. No. 16/802,320, mailed on Dec. 24, 2020, 19 pages.
Non-Final Office Action received for U.S. Appl. No. 16/828,852, mailed on Nov. 9, 2020, 14 pages.
Non-Final Office Action received for U.S. Appl. No. 16/828,857, mailed on Feb. 17, 2021, 12 pages.
Non-Final Office Action received for U.S. Appl. No. 17/052,081, mailed on Jul. 14, 2021, 16 pages.
Non-Final Office Action received for U.S. Appl. No. 17/394,114, mailed on Jul. 6, 2022, 17 pages.
Non-Final Office Action received for U.S. Appl. No. 17/486,646, mailed on Jun. 15, 2022, 17 pages.
Non-Final Office Action received for U.S. Appl. No. 17/534,102, mailed on Jul. 7, 2022, 14 pages.
Non-Final Office Action received for U.S. Appl. No. 90/013,146, mailed on Aug. 29, 2014, 50 pages.
Non-Final Office Action received for U.S. Appl. No. 10/213,929, mailed on Aug. 24, 2005, 12 pages.
Non-Final Office Action received for U.S. Appl. No. 10/213,929, mailed on Feb. 12, 2007, 27 pages.
Non-Final Office Action received for U.S. Appl. No. 10/213,929, mailed on May 5, 2004, 11 pages.
Non-Final Office Action received for U.S. Appl. No. 10/255,899, mailed on Dec. 16, 2005, 29 pages.
Non-Final Office Action received for U.S. Appl. No. 10/255,899, mailed on Oct. 2, 2008, 27 pages.
Non-Final Office Action received for U.S. Appl. No. 10/255,899, mailed on Oct. 9, 2007, 25 pages.
Non-Final Office Action received for U.S. Appl. No. 10/255,899, mailed on Sep. 3, 2009, 30 pages.
Non-Final Office Action received for U.S. Appl. No. 10/255,899, mailed on Sep. 7, 2006, 19 pages.
Non-Final Office Action received for U.S. Appl. No. 10/702,969, mailed on Jun. 20, 2007, 10 pages.
Non-Final Office Action received for U.S. Appl. No. 12/046,171, mailed on Apr. 26, 2011, 9 pages.
Non-Final Office Action received for U.S. Appl. No. 12/046,171, mailed on Jul. 31, 2013, 12 pages.
Non-Final Office Action received for U.S. Appl. No. 12/816,326, mailed on May 10, 2013, 6 pages.
Non-Final Office Action received for U.S. Appl. No. 14/288,527, mailed on Nov. 6, 2014, 11 pages.
Non-Final Office Action received for U.S. Appl. No. 14/816,494, mailed on Mar. 3, 2016, 8 pages.
Notice of Allowance received for Chinese Patent Application No. 201880051530.5, mailed on Apr. 8, 2022, 5 pages (1 page of English Translation and 4 pages of Official Copy).
Notice of Allowance received for Chinese Patent Application No. 201880052303.4, mailed on Mar. 9, 2022, 4 pages (1 page of English Translation and 3 pages of Official Copy).
Notice of Allowance received for Chinese Patent Application No. 201880055893.6, mailed on Mar. 30, 2022, 4 pages (1 page of English Translation and 3 pages of Official Copy).
Notice of Allowance received for Korean Patent Application No. 10-2020-7006018, mailed on Apr. 18, 2022, 4 pages (1 page of English Translation and 3 pages of Official Copy).
Notice of Allowance received for U.S. Appl. No. 12/722,428, mailed on Feb. 1, 2013, 11 pages.

(56) References Cited

OTHER PUBLICATIONS

Notice of Allowance received for U.S. Appl. No. 12/722,428, mailed on Jul. 26, 2013, 10 pages.
Notice of Allowance received for U.S. Appl. No. 09/467,316, mailed on Jul. 28, 2003, 7 pages.
Notice of Allowance received for U.S. Appl. No. 10/213,929, mailed on Nov. 15, 2007, 9 pages.
Notice of Allowance received for U.S. Appl. No. 10/255,899, mailed on Feb. 1, 2010, 6 pages.
Notice of Allowance received for U.S. Appl. No. 10/702,969, mailed on Oct. 18, 2007, 6 pages.
Notice of Allowance received for U.S. Appl. No. 11/961,743, mailed on Nov. 28, 2011, 7 pages.
Notice of Allowance received for U.S. Appl. No. 12/046,171, mailed on Aug. 20, 2014, 5 pages.
Notice of Allowance received for U.S. Appl. No. 12/046,171, mailed on Dec. 12, 2014, 2 pages.
Notice of Allowance received for U.S. Appl. No. 12/046,171, mailed on Feb. 21, 2014, 10 pages.
Notice of Allowance received for U.S. Appl. No. 12/046,171, mailed on Jan. 7, 2015, 2 pages.
Notice of Allowance received for U.S. Appl. No. 12/785,408, mailed on Mar. 26, 2015, 17 pages.
Notice of Allowance received for U.S. Appl. No. 12/816,326, mailed on Nov. 20, 2013, 9 pages.
Notice of Allowance received for U.S. Appl. No. 13/247,969, mailed on Sep. 16, 2015, 7 pages.
Notice of Allowance received for U.S. Appl. No. 14/288,527, mailed on Mar. 30, 2015, 5 pages.
Notice of Allowance received for U.S. Appl. No. 14/816,494, mailed on Aug. 2, 2016, 5 pages.
Notice of Allowance received for U.S. Appl. No. 15/348,829, mailed on Dec. 16, 2016, 6 pages.
Notice of Allowance received for U.S. Appl. No. 15/348,829, mailed on Jan. 18, 2017, 2 pages.
Notice of Allowance received for U.S. Appl. No. 15/348,829, mailed on Mar. 1, 2017, 2 pages.
Notice of Allowance received for U.S. Appl. No. 16/802,188, mailed on Jul. 29, 2021, 8 pages.
Notice of Allowance received for U.S. Appl. No. 16/802,320, mailed on Apr. 30, 2021, 9 pages.
Notice of Allowance received for U.S. Appl. No. 16/828,852, mailed on Jul. 27, 2021, 10 pages.
Notice of Allowance received for U.S. Appl. No. 16/828,857, mailed on Jul. 14, 2021, 6 pages.
Notice of Allowance received for U.S. Appl. No. 17/052,081, mailed on Jan. 14, 2022, 7 pages.
Notice of Allowance received for U.S. Appl. No. 17/394,114, mailed on Feb. 7, 2023, 10 pages.
Notice of Allowance received for U.S. Appl. No. 17/394,114, mailed on Jun. 2, 2023, 11 pages.
Notice of Allowance received for U.S. Appl. No. 17/394,114, mailed on Oct. 21, 2022, 10 pages.
Notice of Allowance received for U.S. Appl. No. 17/486,646, mailed on Mar. 22, 2023, 9 pages.
Notice of Allowance received for U.S. Appl. No. 17/534,102, mailed on Jan. 11, 2023, 8 pages.
Notice of Allowance received for U.S. Appl. No. 17/534,102, mailed on May 2, 2023, 8 pages.
Notice of Intent to Issue a Reexam Certificate received for U.S. Appl. No. 90/013,146, mailed on Jul. 9, 2019, 1 page.
Notice of Intent to Issue a Reexam Certificate received for U.S. Appl. No. 90/013,146, mailed on Jun. 10, 2019, 11 pages.
Office Action received for Chinese Patent Application No. 201880051530.5, mailed on Sep. 6, 2021, 18 pages (6 pages of English Translation and 12 pages of Official Copy).
Office Action received for Chinese Patent Application No. 201880052303.4, mailed on Sep. 27, 2021, 20 pages (7 pages of English Translation and 13 pages of Official Copy).
Office Action received for Chinese Patent Application No. 201880055893.6, mailed on Sep. 6, 2021, 21 pages (6 pages of English Translation and 15 pages of Official Copy).
Office Action received for European Patent Application No. 00982078.8, mailed on Dec. 13, 2007, 6 pages.
Office Action received for European Patent Application No. 00982078.8, mailed on Feb. 4, 2008, 7 pages.
Office Action received for European Patent Application No. 00982078.8, mailed on May 14, 2012, 7 pages.
Office Action received for European Patent Application No. 10011078.2, mailed on May 24, 2012, 4 pages.
Office Action received for European Patent Application No. 18786644.7, mailed on Apr. 28, 2021, 6 pages.
Office Action received for Japanese Patent Application No. 2020-512573, mailed on Apr. 12, 2021, 7 pages (4 pages of English Translation and 3 pages of Official Copy).
Office Action received for Japanese Patent Application No. 2021-142308, mailed on Oct. 31, 2022, 10 pages (7 pages of English Translation and 3 pages of Official Copy).
Office Action received for Korean Patent Application No. 10-2020-7006018, mailed on Oct. 9, 2021, 9 pages (4 pages of English Translation and 5 pages of Official Copy).
Office Action received for Korean Patent Application No. 10-2022-7022762, mailed on Apr. 11, 2023, 8 pages (4 pages of English Translation and 4 pages of Official Copy).
Office Action received for Korean Patent Application No. 10-2022-7022762, mailed on Jan. 27, 2023, 6 pages (3 pages of English Translation and 3 pages of Official Copy).
Office Action received for Korean Patent Application No. 10-2022-7022762, mailed on Jul. 19, 2022, 9 pages (4 pages of English Translation and 5 pages of Official Copy).
Office Action received for Korean Patent Application No. 10-2023-7022376, mailed on Jul. 26, 2023, 9 pages (4 pages of English Translation and 5 pages of Official Copy).
Special Effect, "Open Drive—Eye Gaze Games | Eye Gaze Controls & Options", Online Available at: https://www.youtube.com/watch?v=IJi2aOdSau8&t=63s, Mar. 18, 2022, 3 pages.
Stellmach et al., "Look & Touch: Gaze-supported Target Acquisition", CHI'12: Proceedings of the SIGGHI Conference on Human Factors in Computing Systems; Available online at: https://dl.acm.org/doi/10.1145/2207676.2208709, May 5-10, 2012, pp. 2981-2990.
Stellmach et al., "Still Looking: Investigating Seamless Gaze-supported Selection, Positioning, and Manipulation of Distant Targets", CHI'13: Proceedings of the SIGCHI Conference on Human Factors in Computing Systems; Available online at: https://dl.acm.org/doi/10.1145/2470654.2470695, Apr. 2013, pp. 285-294.
Summons to Attend Oral Proceedings received for European Patent Application No. 10011078.2, mailed on Jun. 12, 2013, 9 pages.
Summons to Attend Oral Proceedings received for European Patent Application No. 18786644.7, mailed on Nov. 10, 2022, 5 pages.
Takase et al., "Gestural Interface and the Intuitive Interaction with Virtual Objects", ICROS-SICE International Joint Conference, 2009, pp. 3260-3263.
The Silky-Smooth Marquee, http://.com/demo/marquee.html, http://remysharp.com/2008/09/1 0/the-silky-smooth-marquee/, published on Sep. 10, 2008, 41 pages.
Wang Zichuan, "Transmissive smart glasses based on image recognition and gesture tracking", Innovation Technology Frontier, pp. 26-28 (Official Copy Only) (See Communication under 37 CFR § 1.98(a) (3)).

* cited by examiner

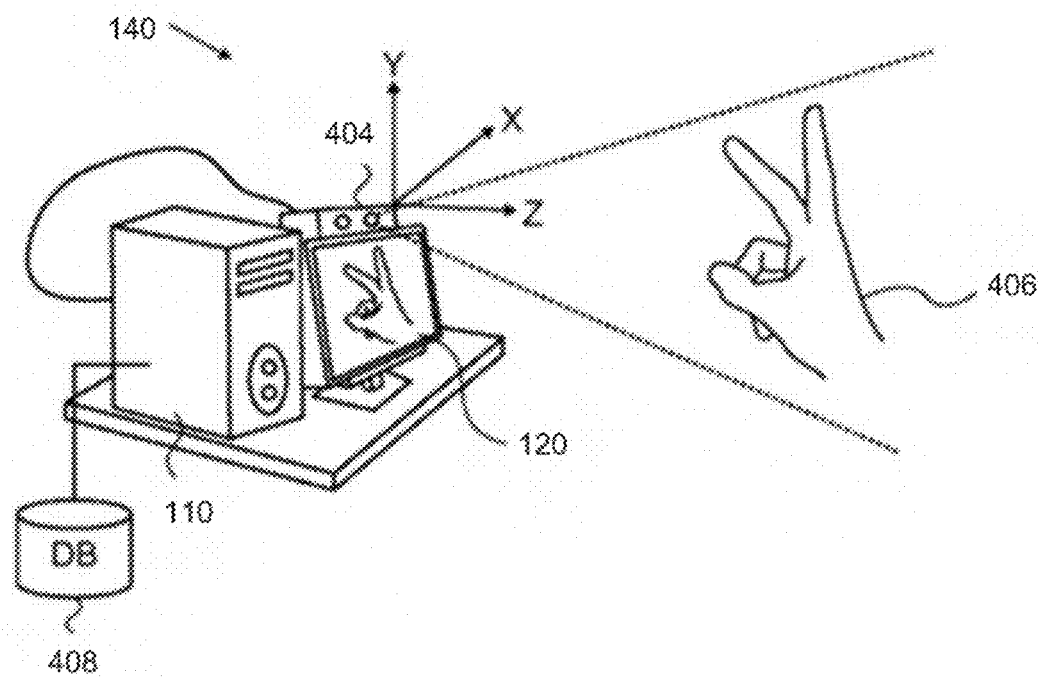
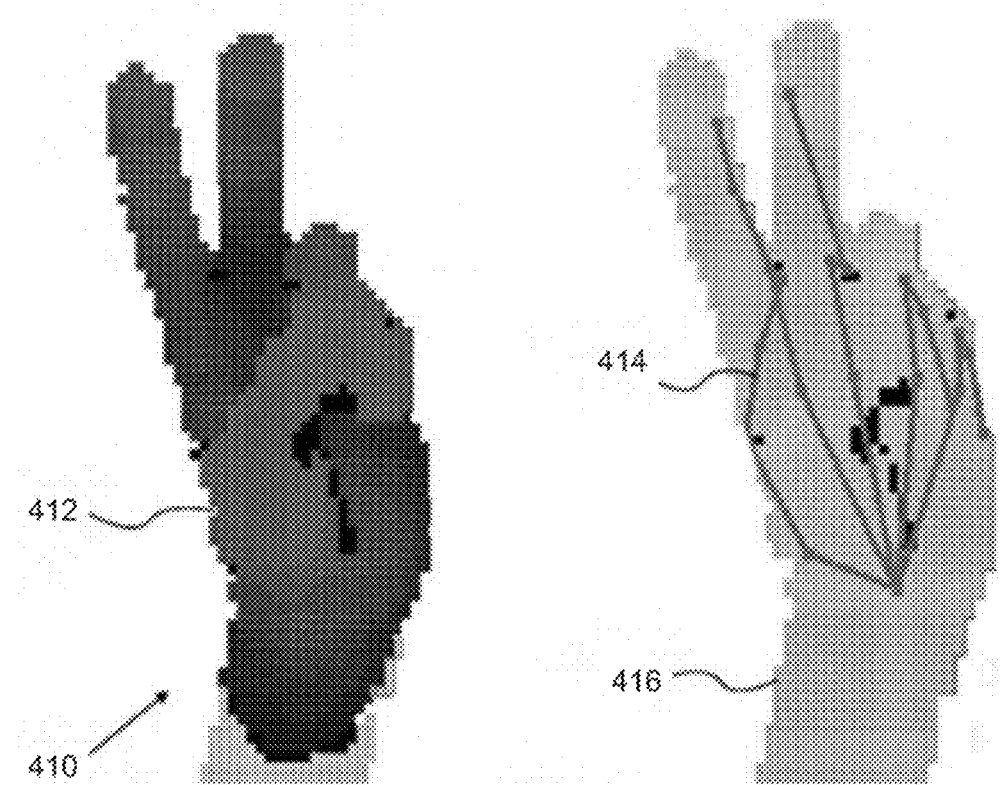
FIG. 4

1000

1002
display a respective user interface, wherein displaying the respective user interface includes displaying:

1004
a first user interface object, wherein at a least a first portion of the first user interface object is at least partially translucent and includes first content

1006
a second user interface object, wherein at a least a first portion of the second user interface object includes second content, different from the first content; and the first user interface object is displayed in front of the second user interface object such that the first portion of the first user interface object overlays the first portion of the second user interface object

1008
while displaying the first user interface object in front of the second user interface object, receive a request to move the second user interface object in front of the first user interface object

1010
in response to receiving the request to move the second user interface object in front of the first user interface object:

1012
initiate a process to move the second user interface object in front of the first user interface object, the process including modifying the visual appearance of the first portion of the first user interface object to include third content that is based on a first combination of the first content and the second conte

*FIG. 10*

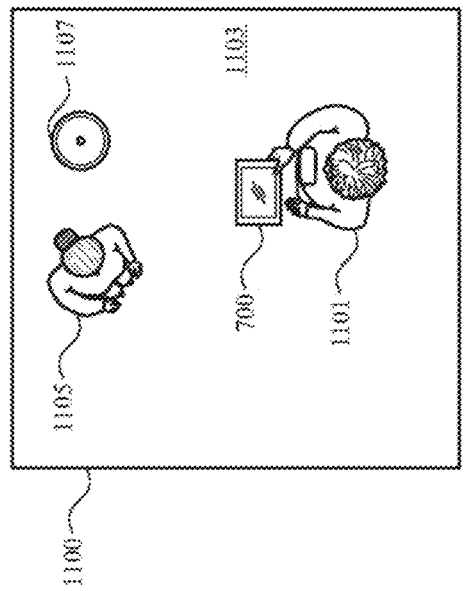
FIG. 11A
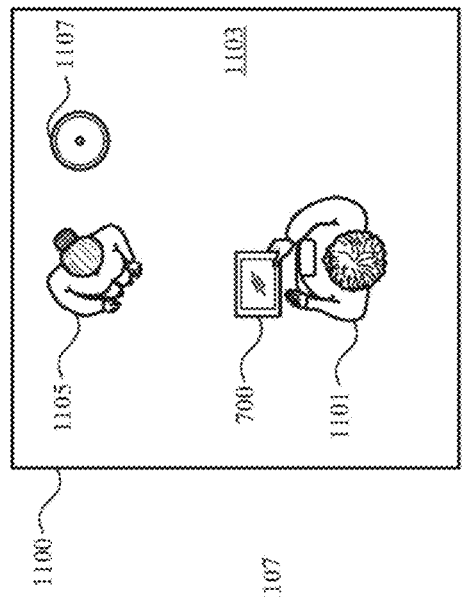
FIG. 11B
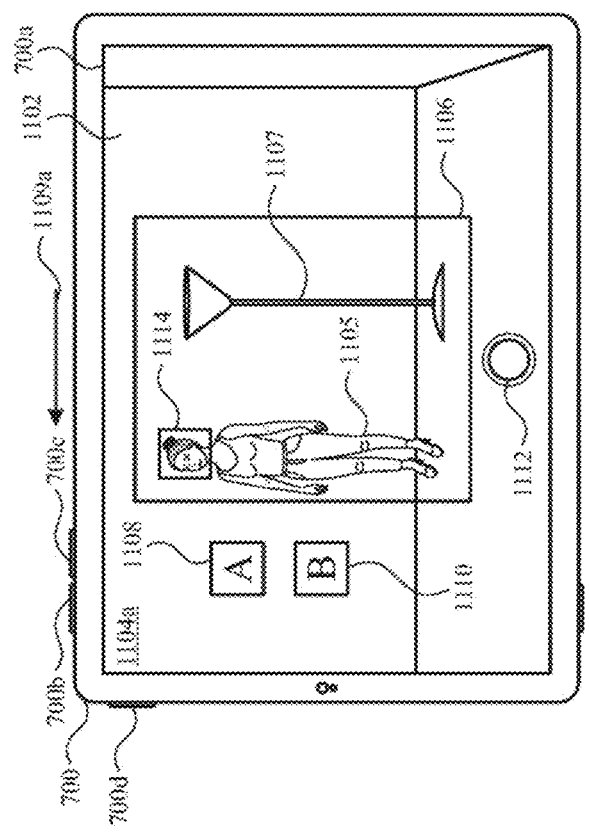
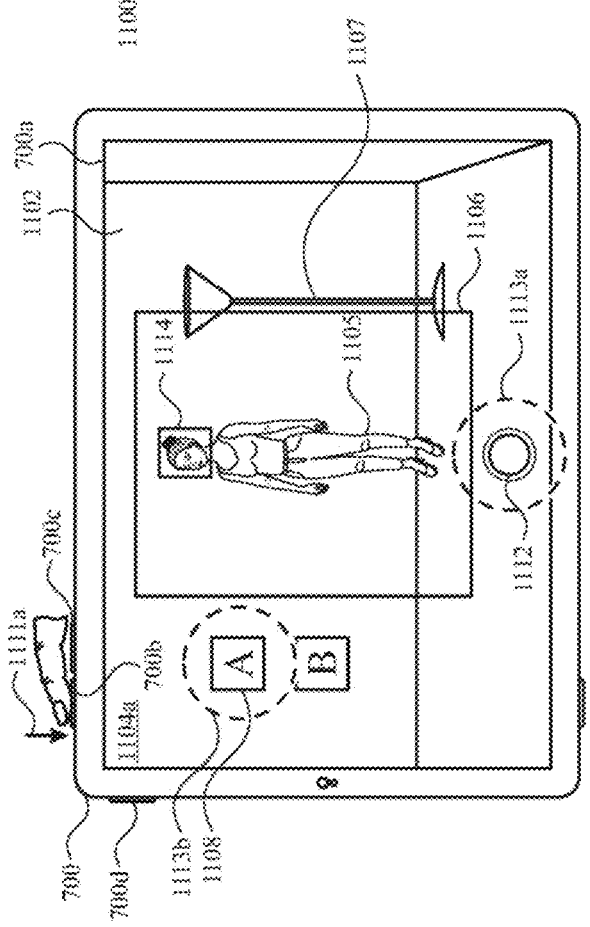

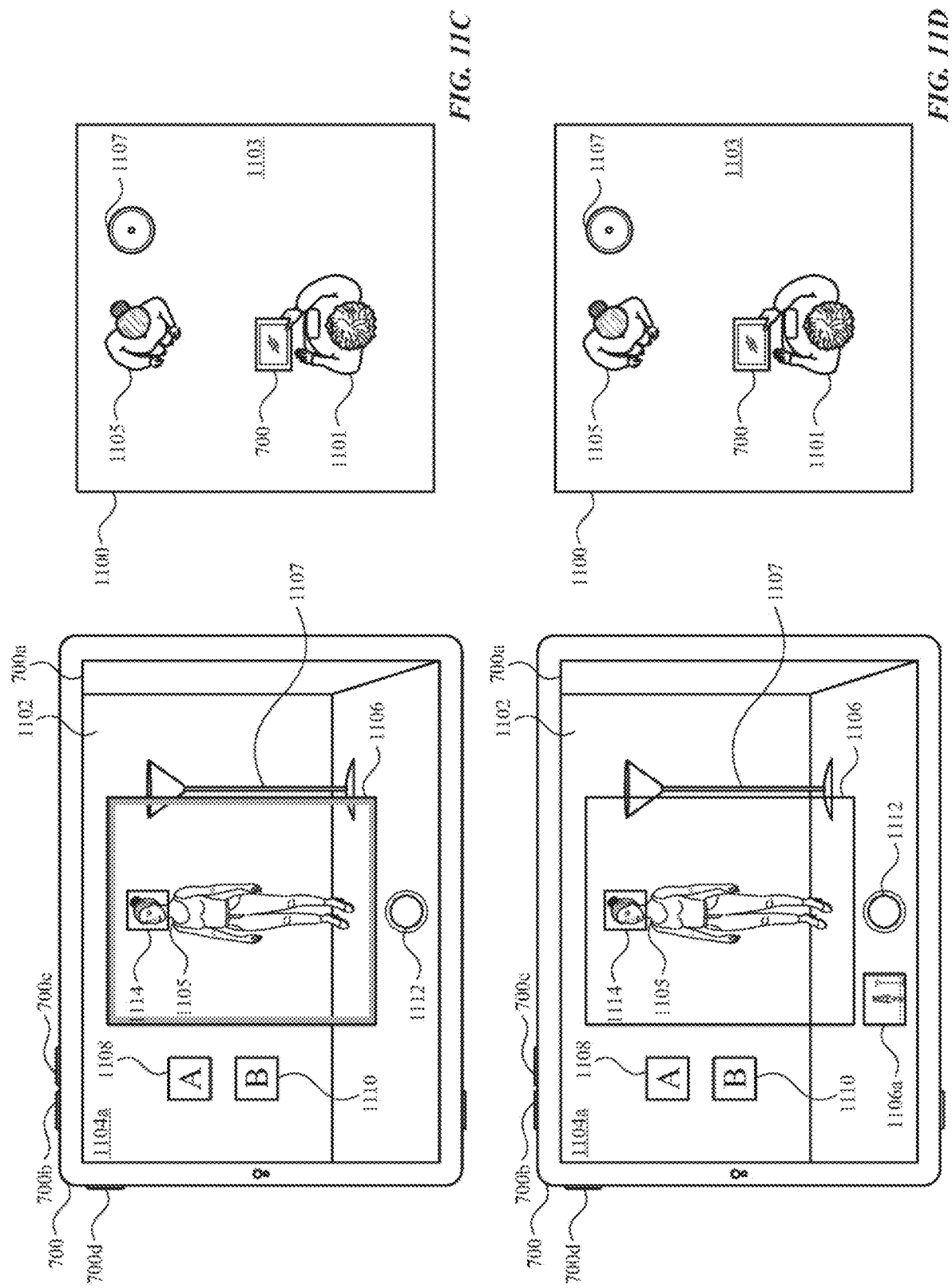

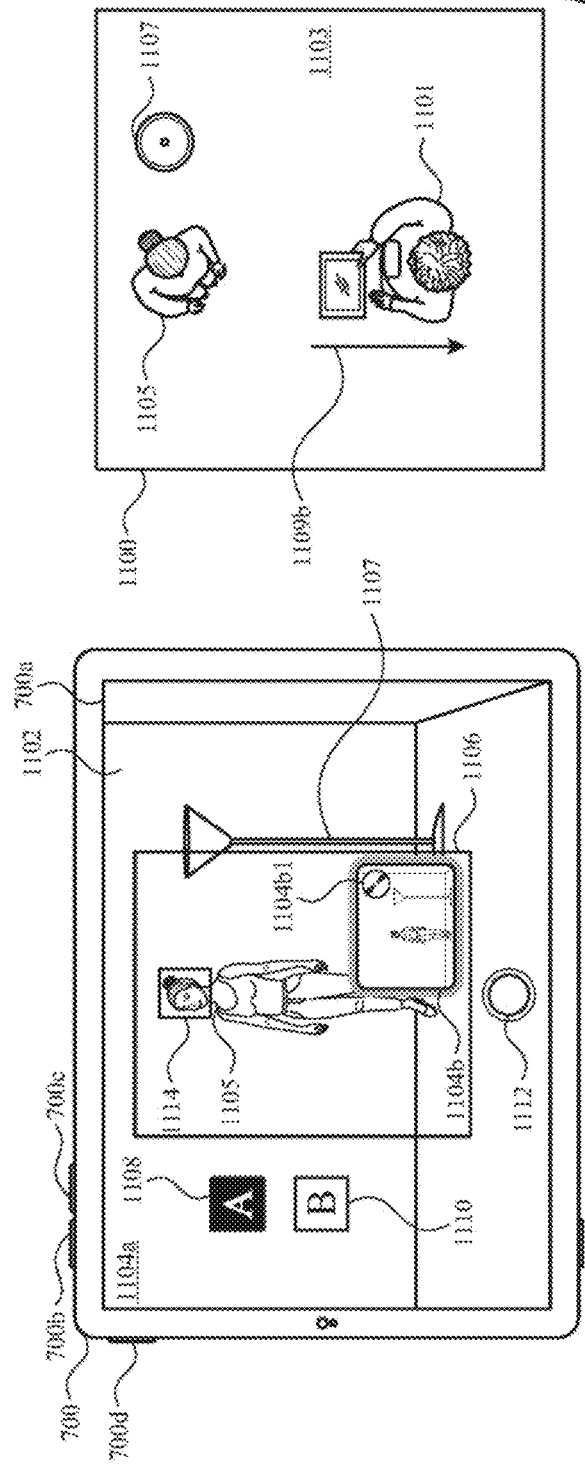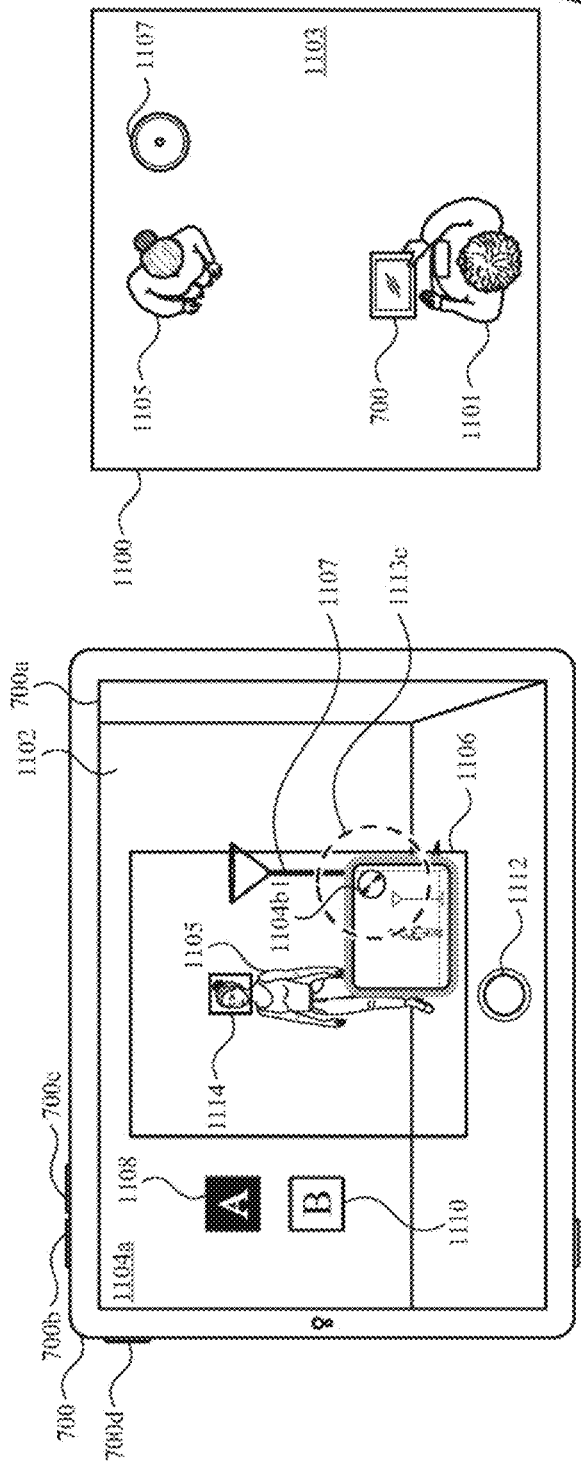

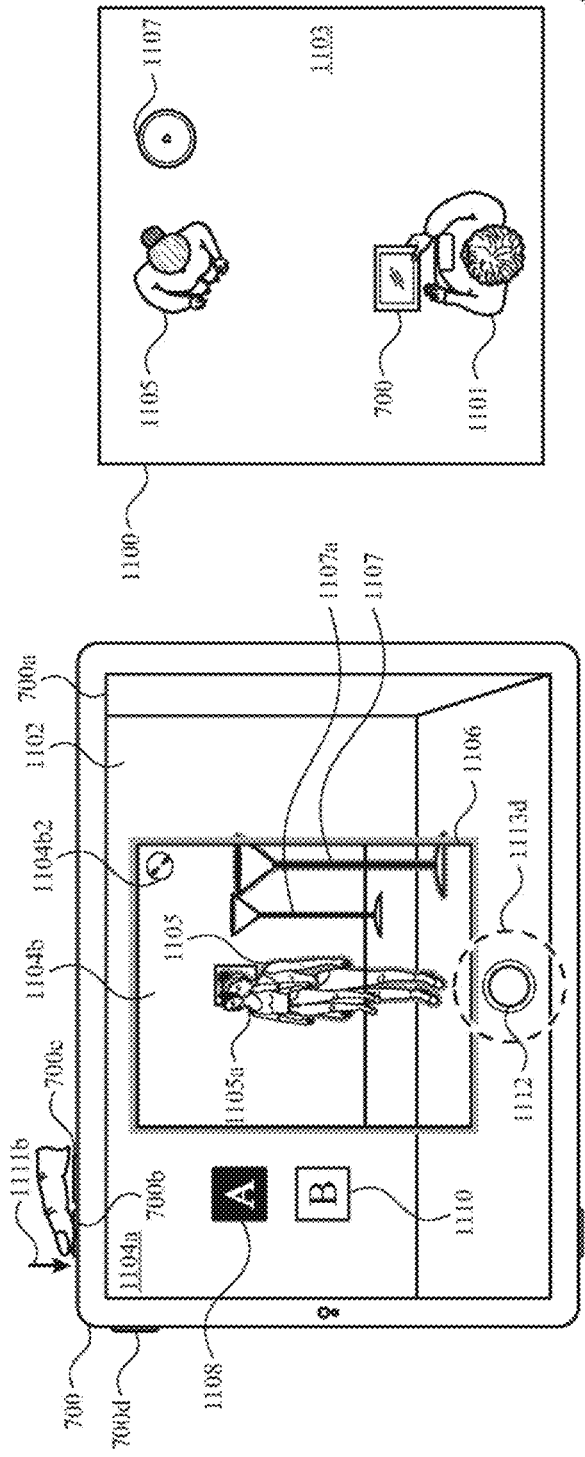

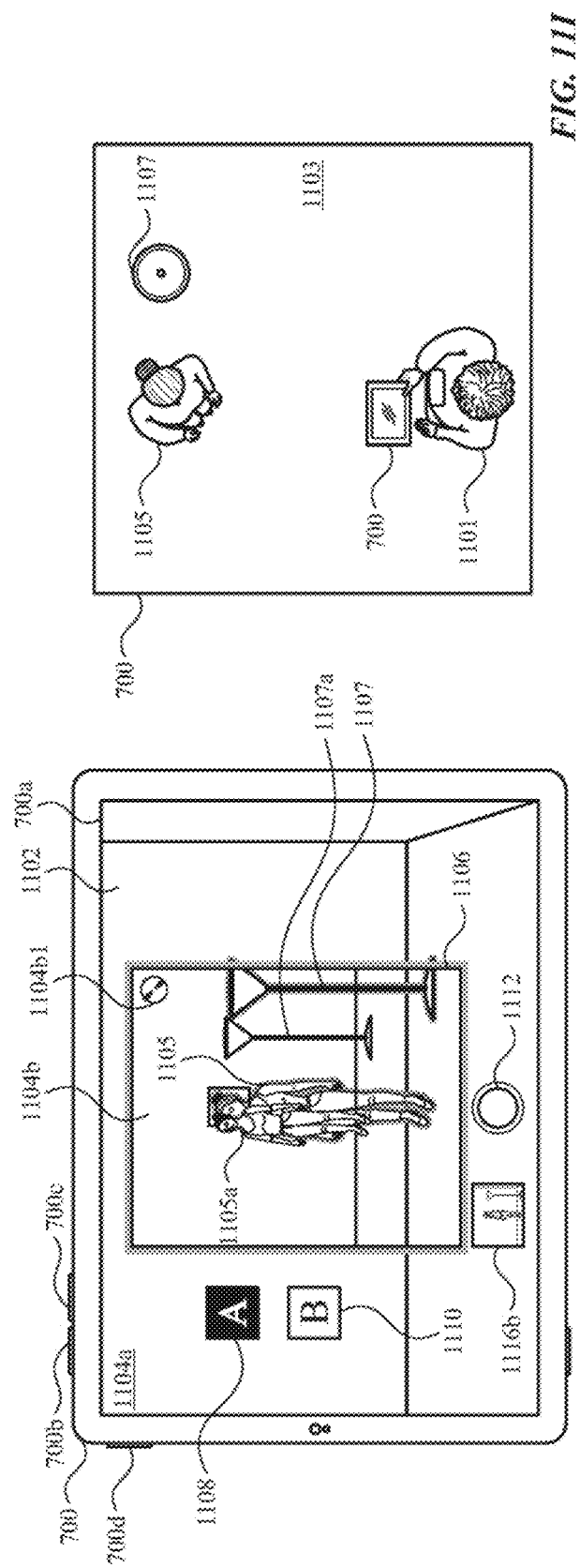

1400 ⟶

1402
displaying, a respective user interface, wherein displaying the respective user interface includes displaying a set of one or more virtual objects that includes a first virtual object displayed at a first position within a displayable area in which the display generation component can display content

1404
while displaying the first virtual object at the first position within the displayable area, detect that a gaze of a user of the computer system is directed to the first virtual object

1406
in response to detecting that the gaze of the user of the computer system is directed to the first virtual object, move the first virtual object from the first position within the displayable area towards a second position within the displayable area that is different from the first position

1408
while moving the first virtual object towards the second position within the displayable area and before the first virtual object arrives at the second position, detecting, via the one or more gaze-tracking sensors, movement of the gaze

1410
in response to detecting the movement of the gaze:

1412
in accordance with a determination that the gaze of the user of the computer system continues to be directed to the first virtual object, continue to move the first virtual object towards the second position

1414
in accordance with a determination that the gaze of the user of the computer system has ceased to be directed to the first virtual object, cease to move the first virtual object towards the second position within the displayable area

*FIG. 14*

DEVICES, METHODS, FOR INTERACTING WITH GRAPHICAL USER INTERFACES

CROSS-REFERENCE TO RELATED APPLICATIONS

This application claims priority to U.S. Provisional Patent Application 63/409,744, entitled "DEVICES, METHODS, FOR INTERACTING WITH GRAPHICAL USER INTERFACES," filed Sep. 24, 2022, the contents of which are hereby incorporated by reference in their entirety.

TECHNICAL FIELD

The present disclosure relates generally to computer systems that are in communication with a display generation component and, optionally, one or more cameras and/or gaze-tracking sensors, that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with graphical user interfaces (e.g., interacting with virtual objects, applications, augmented reality environments, mixed reality environments, and virtual reality environments via graphical user interfaces) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for interacting with graphical user interfaces more efficient and intuitive for a user. Such methods and interfaces optionally complement or replace conventional methods for interacting with graphical user interfaces. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with graphical user interfaces. Such methods and interfaces may complement or replace conventional methods for interacting with graphical user interfaces. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a method, performed at a computer system that is in communication with one or more gaze-tracking sensors and a display generation component, is described. The method includes: displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; while displaying the first user interface object and the second user interface object, detecting, via the one or more gaze-tracking sensors, that a gaze of a user of the computer system is directed to a respective portion of the respective user interface; and in response to detecting that the gaze of the user of the computer system is directed to the respective portion of the respective user interface: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a non-transitory computer-readable storage medium is described. The non-transitory computer-readable storage medium stores one or more programs configured to be executed by one or more processors of a computer system that is in communication with one or more gaze-tracking sensors and a display generation component, the one or more programs including instructions for: displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; while displaying the first user interface object and the second user interface object, detecting, via the one or more gaze-tracking sensors, that a gaze of a user of the computer system is directed to a respective portion of the respective user interface; and in response to detecting that the gaze of the user of the computer system is directed to the respective portion of the respective user interface: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a transitory computer-readable storage medium is described. The transitory computer-readable storage medium stores one or more programs configured to be executed by one or more processors of a computer system that is in communication with one or more gaze-tracking sensors and a display generation component, the one or more programs including instructions for displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; while displaying the first user interface object and the second user interface object, detecting, via the one or more gaze-tracking sensors, that a gaze of a user of the computer system is directed to a respective portion of the respective user interface; and in response to detecting that the gaze of the user of the computer system is directed to the respective portion of the respective user interface: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a computer system configured to communicate with one or more gaze-tracking sensors and a display generation component is described. The computer system includes: one or more processors; and memory storing one or more programs configured to be executed by the one or more processors. The one or more programs including instructions for: displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; while displaying the first user interface object and the second user interface object, detecting, via the one or more gaze-tracking sensors, that a gaze of a user of the computer system is directed to a respective portion of the respective user interface; and in response to detecting that the gaze of the user of the computer system is directed to the respective portion of the respective user interface: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a computer system is described. The computer system is configured to communicate with one or more gaze-tracking sensors and a display generation component and includes: means for displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; means, while displaying the first user interface object and the second user interface object, for detecting, via the one or more gaze-tracking sensors, that a gaze of a user of the computer system is directed to a respective portion of the respective user interface; and means, in response to detecting that the gaze of the user of the computer system is directed to the respective portion of the respective user interface, for: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a computer program product is described. The computer program product includes one or more programs configured to be executed by one or more processors of a computer system that is in communication with one or more gaze-tracking sensors and a display generation component. The one or more programs include instructions for: displaying, via the display generation component, a respective user interface, wherein displaying the respective user interface includes displaying: a plurality of edges of the respective user interface that includes a first edge and a second edge, different from the first edge; a first user interface object positioned along the first edge that corresponds to a first operation; and a second user interface object positioned along the second edge that corresponds to a second operation, different from the first operation; while displaying the first user interface object and the second user interface object, detecting, via the one or more gaze-tracking sensors, that a gaze of a user of the computer system is directed to a respective portion of the respective user interface; and in response to detecting that the gaze of the user of the computer system is directed to the respective portion of the respective user interface: in accordance with a determination that the respective portion of the respective user interface corresponds to the first user interface object: performing the first operation; and continuing to display the first user interface object while ceasing to display the second user interface object; in accordance with a determination that the respective portion of the respective user interface corresponds to the second user interface object: performing the second operation; and continuing to display the second user interface object while ceasing to display the first user interface object.

In some embodiments, a method, performed at a computer system that is in communication with a display generation component, is described. The method includes: displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; while displaying the first user interface object in front of the second user interface object, receiving a request to move the second user interface object in front of the first user interface object; and in response to receiving the request to move the second user interface object in front of the first user interface object: initiating a process to move the second user interface object in front of the first user interface object, the process including modifying the visual appearance of the first portion of the first user interface object to include third content that is based on a first combination of the first content and the second content.

In some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; while displaying the first user interface object in front of the second user interface object, receiving a request to move the second user interface object in front of the first user interface object; and in response to receiving the request to move the second user interface object in front of the first user interface object: initiating a process to move the second user interface object in front of the first user interface object, the process including modifying the visual appearance of the first portion of the first user interface object to include third content that is based on a first combination of the first content and the second content.

In some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; while displaying the first user interface object in front of the second user interface object, receiving a request to move the second user interface object in front of the first user interface object; and in response to receiving the request to move the second user interface object in front of the first user interface object: initiating a process to move the second user interface object in front of the first user interface object, the process including modifying the visual appearance of the first portion of the first user interface object to include third content that is based on a first combination of the first content and the second content.

In some embodiments, a computer system configured to communicate with a display generation component is described. The computer system includes: one or more processors; and memory storing one or more programs configured to be executed by the one or more processors. The one or more programs including instructions for: displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; while displaying the first user interface object in front of the second user interface object, receiving a request to move the second user interface object in front of the first user interface object; and in response to receiving the request to move the second user interface object in front of the first user interface object: initiating a process to move the second user interface object in front of the first user interface object, the process including modifying the visual appearance of the first portion of the first user interface object to include third content that is based on a first combination of the first content and the second content.

In some embodiments, a computer system is described. The computer system is configured to communicate with a display generation component and includes: means for displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; means, while displaying the first user interface object in front of the second user interface object, for receiving a request to move the second user interface object in front of the first user interface object; and means, in response to receiving the request to move the second user interface object in front of the first user interface object, for: initiating a process to move the second user interface object in front of the first user interface object, the process including modifying the visual appearance of the first portion of the first user interface object to include third content that is based on a first combination of the first content and the second content.

In some embodiments, a computer program product is described. The computer program product includes one or more programs configured to be executed by one or more processors of a computer system that is in communication with a display generation component. The one or more programs including instructions for displaying, via the display generation component, a respective user interface, wherein displaying the respective user interface includes displaying: a first user interface object, wherein at a least a first portion of the first user interface object is at least partially translucent and includes first content; and a second user interface object, wherein: at a least a first portion of the second user interface object includes second content, different from the first content; and the first user interface object is displayed in front of the second user interface object such that the first portion of the first user interface object overlays the first portion of the second user interface object; while displaying the first user interface object in front of the second user interface object, receiving a request to move the second user interface object in front of the first user interface object; and in response to receiving the request to move the second user interface object in front of the first user interface object: initiating a process to move the second user interface object in front of the first user interface object, the process including modifying the visual appearance of the first portion of the first user interface object to include third content that is based on a first combination of the first content and the second content.

In some embodiments, a method performed at a computer system that is in communication with a display generation component and one or more cameras is described. The method includes: displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; while displaying the camera capture user interface in the first mode, receiving a request to transition the camera capture user interface to a second mode, different from the first mode; and in response to receiving the request to transition the camera capture user interface to the second mode, displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; while displaying the camera capture user interface in the first mode, receiving a request to transition the camera capture user interface to a second mode, different from the first mode; and in response to receiving the request to transition the camera capture user interface to the second mode, displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; while displaying the camera capture user interface in the first mode, receiving a request to transition the camera capture user interface to a second mode, different from the first mode; and in response to receiving the request to transition the camera capture user interface to the second mode, displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a computer system configured to communicate with a display generation component and one or more cameras is described. The computer system includes: one or more processors; and memory storing one or more programs configured to be executed by the one or more processors. The one or more programs including instructions for: displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; while displaying the camera capture user interface in the first mode, receiving a request to transition the camera capture user interface to a second mode, different from the first mode; and in response to receiving the request to transition the camera capture user interface to the second mode, displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a computer system is described. The computer system is configured to communicate with a display generation component and one or more cameras and includes: means for displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; means, while displaying the camera capture user interface in the first mode, for receiving a request to transition the camera capture user interface to a second mode, different from the first mode; and means, in response to receiving the request to transition the camera capture user interface to the second mode, for displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a computer program product is described. The computer program product includes one or more programs configured to be executed by one or more processors of a computer system that is in communication with a display generation component and one or more cameras. The one or more programs including instructions for: displaying, via the display generation component and in a mixed reality environment, a camera capture user interface that is overlaid over a portion of a physical environment that is visible to a user of the computer system, wherein: the camera capture user interface is in a first mode; and the camera capture user interface includes, while in the first mode, a set of one or more framing virtual objects that are viewpoint-locked and that indicate a first sub-portion of the physical environment that will be captured by the one or more cameras upon receiving a first media capture request; while displaying the camera capture user interface in the first mode, receiving a request to transition the camera capture user interface to a second mode, different from the first mode; and in response to receiving the request to transition the camera capture user interface to the second mode, displaying the camera capture user interface in the second mode, wherein: the camera capture user interface includes, in the second mode, a first representation of a field-of-view of at least a first camera of the one or more cameras; and the first representation is overlaid over a second sub-portion of the physical environment that will be captured by the one or more cameras upon receiving a second media capture request.

In some embodiments, a method, performed at a computer system that is in communication with one or more gaze-tracking sensors and a display generation component, is described. The method includes: displaying, via the display generation component, a respective user interface, wherein displaying the respective user interface includes displaying a set of one or more virtual objects that includes a first virtual object displayed at a first position within a displayable area in which the display generation component can display content; while displaying the first virtual object at the first position within the displayable area, detecting, via the one or more gaze-tracking sensors, that a gaze of a user of the computer system is directed to the first virtual object; in response to detecting that the gaze of the user of the computer system is directed to the first virtual object, moving the first virtual object from the first position within the displayable area towards a second position within the displayable area that is different from the first position; while moving the first virtual object towards the second position within the displayable area and before the first virtual object arrives at the second position, detecting, via the one or more gaze-tracking sensors, movement of the gaze; and in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

In some embodiments, a non-transitory computer-readable storage medium is described. The non-transitory computer-readable storage medium stores one or more programs configured to be executed by one or more processors of a computer system that is in communication with one or more gaze-tracking sensors and a display generation component, the one or more programs including instructions for, displaying, via the display generation component, a respective user interface, wherein displaying the respective user interface includes displaying a set of one or more virtual objects that includes a first virtual object displayed at a first position within a displayable area in which the display generation component can display content; while displaying the first virtual object at the first position within the displayable area, detecting, via the one or more gaze-tracking sensors, that a gaze of a user of the computer system is directed to the first virtual object; in response to detecting that the gaze of the user of the computer system is directed to the first virtual object, moving the first virtual object from the first position within the displayable area towards a second position within the displayable area that is different from the first position; while moving the first virtual object towards the second position within the displayable area and before the first virtual object arrives at the second position, detecting, via the one or more gaze-tracking sensors, movement of the gaze; and in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

In some embodiments, a transitory computer-readable storage medium is described. The transitory computer-readable storage medium stores one or more programs configured to be executed by one or more processors of a computer system that is in communication with one or more gaze-tracking sensors and a display generation component, the one or more programs including instructions for: displaying, via the display generation component, a respective user interface, wherein displaying the respective user interface includes displaying a set of one or more virtual objects that includes a first virtual object displayed at a first position within a displayable area in which the display generation component can display content; while displaying the first virtual object at the first position within the displayable area, detecting, via the one or more gaze-tracking sensors, that a gaze of a user of the computer system is directed to the first virtual object; in response to detecting that the gaze of the user of the computer system is directed to the first virtual object, moving the first virtual object from the first position within the displayable area towards a second position within the displayable area that is different from the first position; while moving the first virtual object towards the second position within the displayable area and before the first virtual object arrives at the second position, detecting, via the one or more gaze-tracking sensors, movement of the gaze; and in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

In some embodiments, a computer system configured to communicate with one or more gaze-tracking sensors and a display generation component is described. The computer system includes: one or more processors; and memory storing one or more programs configured to be executed by the one or more processors. The one or more programs including instructions for: displaying, via the display generation component, a respective user interface, wherein displaying the respective user interface includes displaying a set of one or more virtual objects that includes a first virtual object displayed at a first position within a displayable area in which the display generation component can display content; while displaying the first virtual object at the first position within the displayable area, detecting, via the one or more gaze-tracking sensors, that a gaze of a user of the computer system is directed to the first virtual object; in response to detecting that the gaze of the user of the computer system is directed to the first virtual object, moving the first virtual object from the first position within the displayable area towards a second position within the displayable area that is different from the first position; while moving the first virtual object towards the second position within the displayable area and before the first virtual object arrives at the second position, detecting, via the one or more gaze-tracking sensors, movement of the gaze; and in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

In some embodiments, a computer system is described. The computer system is configured to communicate with one or more gaze-tracking sensors and a display generation component and includes: means for displaying, via the display generation component, a respective user interface, wherein displaying the respective user interface includes displaying a set of one or more virtual objects that includes a first virtual object displayed at a first position within a displayable area in which the display generation component can display content; means, while displaying the first virtual object at the first position within the displayable area, for detecting, via the one or more gaze-tracking sensors, that a gaze of a user of the computer system is directed to the first virtual object; means, in response to detecting that the gaze of the user of the computer system is directed to the first virtual object, for moving the first virtual object from the first position within the displayable area towards a second position within the displayable area that is different from the first position; means, while moving the first virtual object towards the second position within the displayable area and before the first virtual object arrives at the second position, for detecting, via the one or more gaze-tracking sensors, movement of the gaze; and means, in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

In some embodiments, a computer program product is described. The computer program product includes one or more programs configured to be executed by one or more processors of a computer system that is in communication with one or more gaze-tracking sensors and a display generation component. The one or more programs include instructions for: displaying, via the display generation component, a respective user interface, wherein displaying the respective user interface includes displaying a set of one or more virtual objects that includes a first virtual object displayed at a first position within a displayable area in which the display generation component can display content; while displaying the first virtual object at the first position within the displayable area, detecting, via the one or more gaze-tracking sensors, that a gaze of a user of the computer system is directed to the first virtual object; in response to detecting that the gaze of the user of the computer system is directed to the first virtual object, moving the first virtual object from the first position within the displayable area towards a second position within the displayable area that is different from the first position; while moving the first virtual object towards the second position within the displayable area and before the first virtual object arrives at the second position, detecting, via the one or more gaze-tracking sensors, movement of the gaze; and in response to detecting the movement of the gaze: in accordance with a determination that the gaze of the user of the computer system continues to be directed to the first virtual object, continuing to move the first virtual object towards the second position; and in accordance with a determination that the gaze of the user of the computer system has ceased to be directed to the first virtual object, ceasing to move the first virtual object towards the second position within the displayable area.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 10 is a flow diagram of a method for repositioning virtual objects, in accordance with various embodiments.

FIGS. 11A-11I illustrate example techniques for transitioning modes of a camera capture user interface, in accordance with some embodiments.

FIG. 14 is a flow diagram of a method for interacting with a graphical user interface using gaze, in accordance with various embodiments.

DESCRIPTION OF EMBODIMENTS

The present disclosure relates to user interfaces for providing an extended reality (XR) experience to a user, in accordance with some embodiments.

Figure 12:
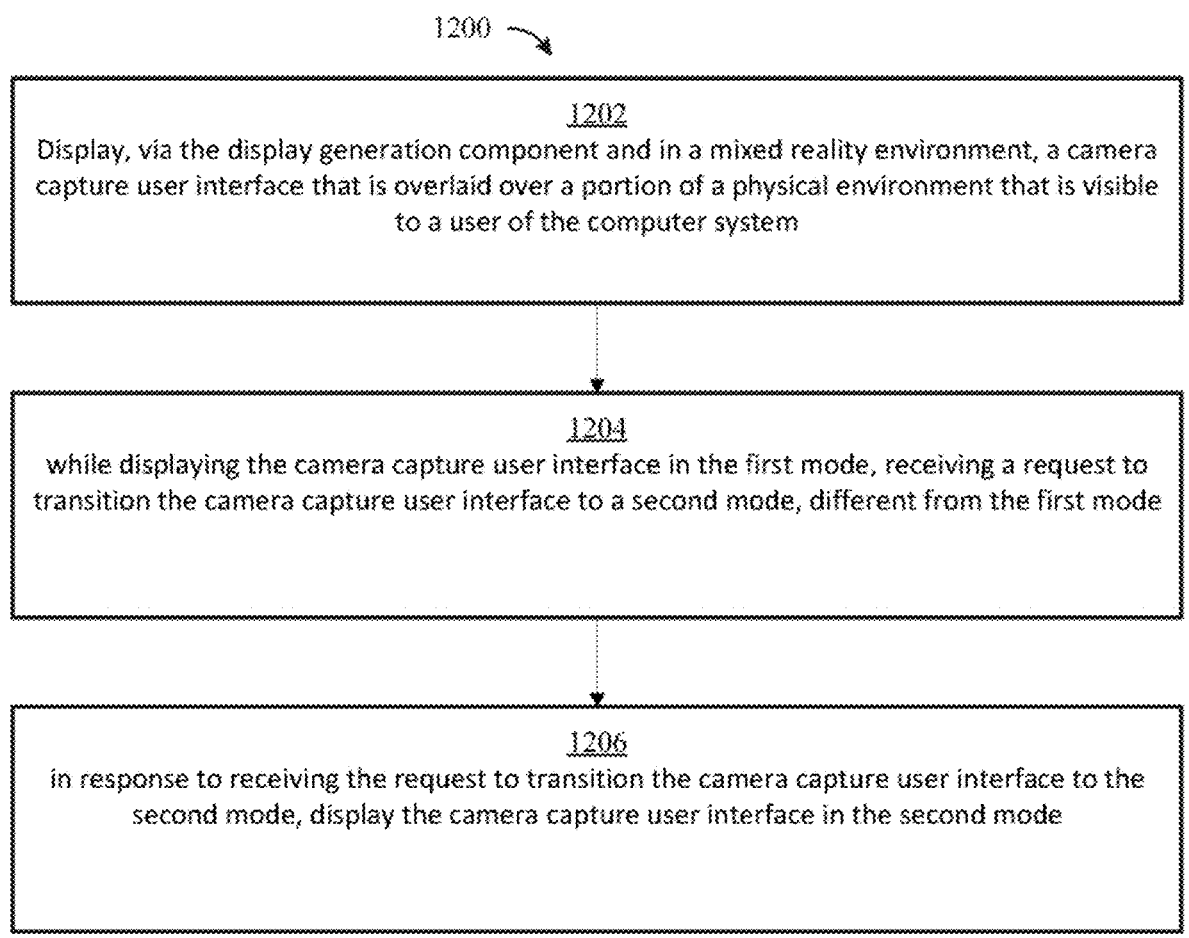
FIG. 12 is a flow diagram of a method for transitioning modes of a camera capture user interface, in accordance with various embodiments.

FIGS. 1-6 provide a description of example computer systems for providing XR experiences to users. FIGS. 7A-7K illustrate example techniques for interacting with a graphical user interface using gaze, in accordance with some embodiments. FIGS. 8A-8B are a flow diagram of a method of interacting with a graphical user interface using gaze, in accordance with various embodiments. The user interfaces in FIGS. 7A-7K are used to illustrate the processes in FIGS. 8A-8B. FIGS. 9A-9E illustrate example techniques for repositioning virtual objects, in accordance with some embodiments. FIG. 10 is a flow diagram of methods of repositioning virtual objects, in accordance with various embodiments. The user interfaces in FIGS. 9A-9E are used to illustrate the processes in FIG. 10. FIGS. 11A-11I illustrate example techniques for transitioning modes of a camera capture user interface, in accordance with some embodiments. FIG. 12 is a flow diagram of a method for transitioning modes of a camera capture user interface, in accordance with various embodiments. The user interfaces in FIGS. 11A-11I are used to illustrate the processes in FIG. 12. FIGS. 13A-13K illustrate example techniques for interacting with a graphical user interface using gaze, in accordance with some embodiments. FIG. 14 is a flow diagram of a method for interacting with a graphical user interface using gaze, in accordance with various embodiments. The user interfaces in FIGS. 13A-13K are used to illustrate the processes in FIG. 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
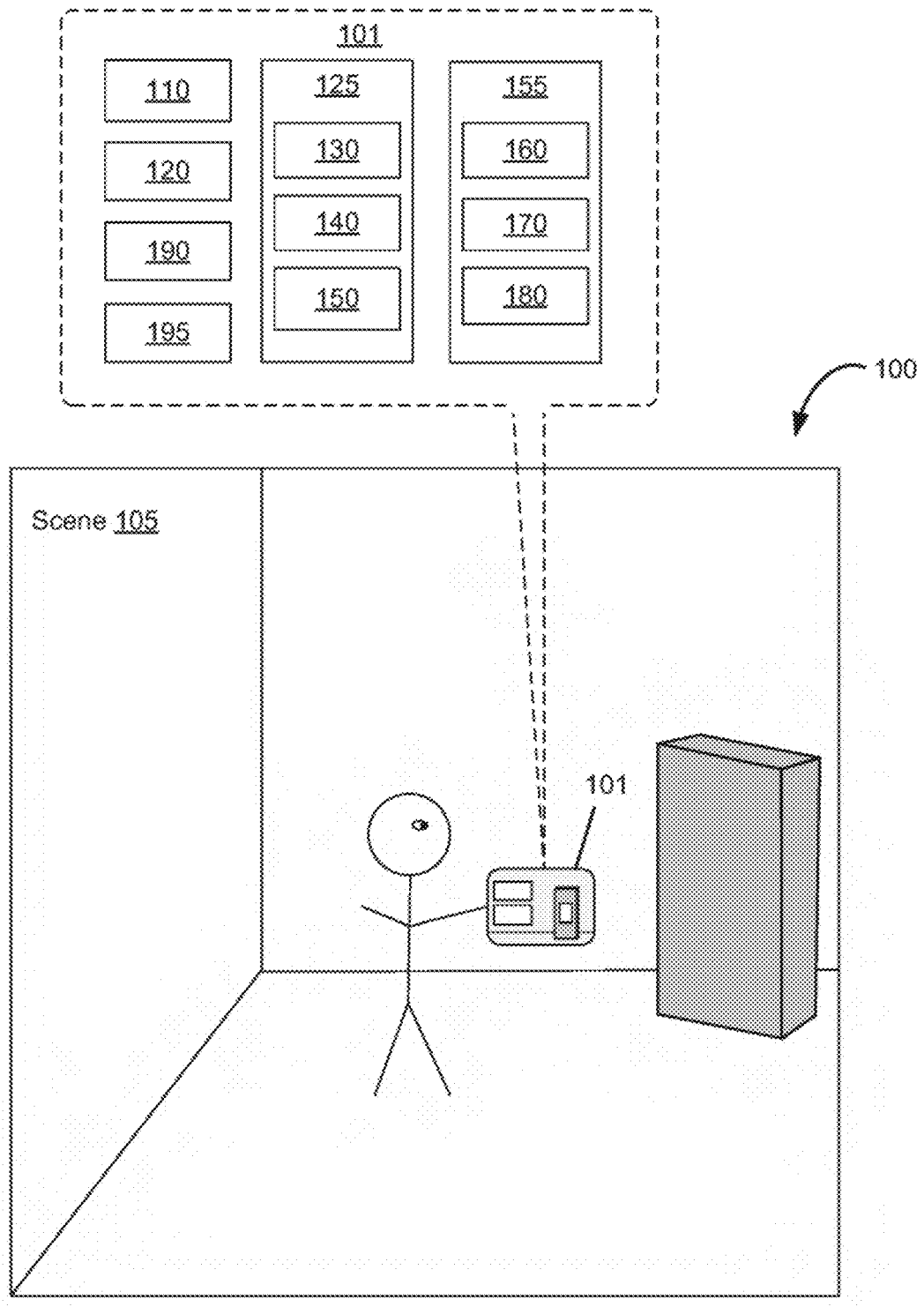
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.).

In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
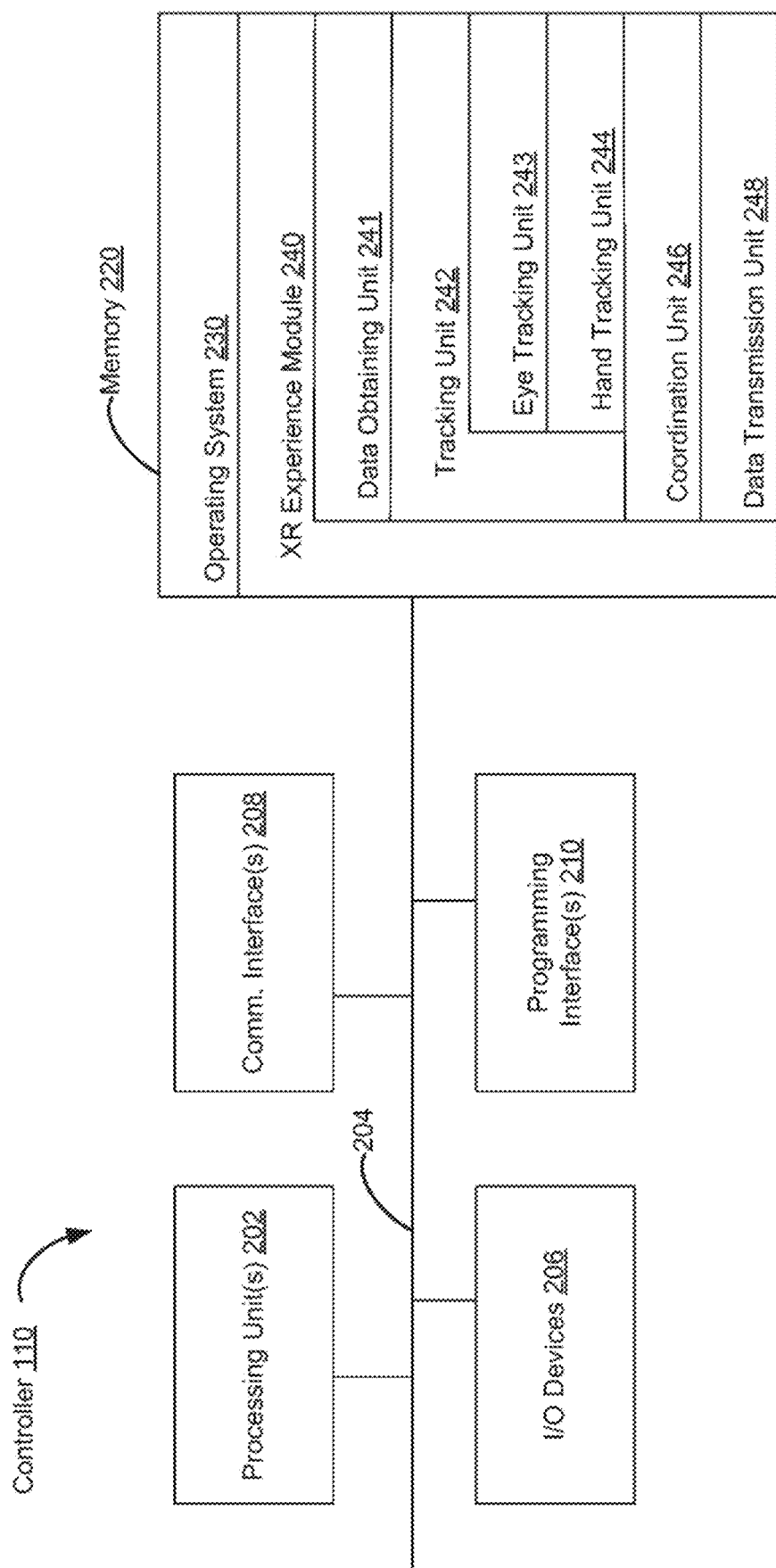
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
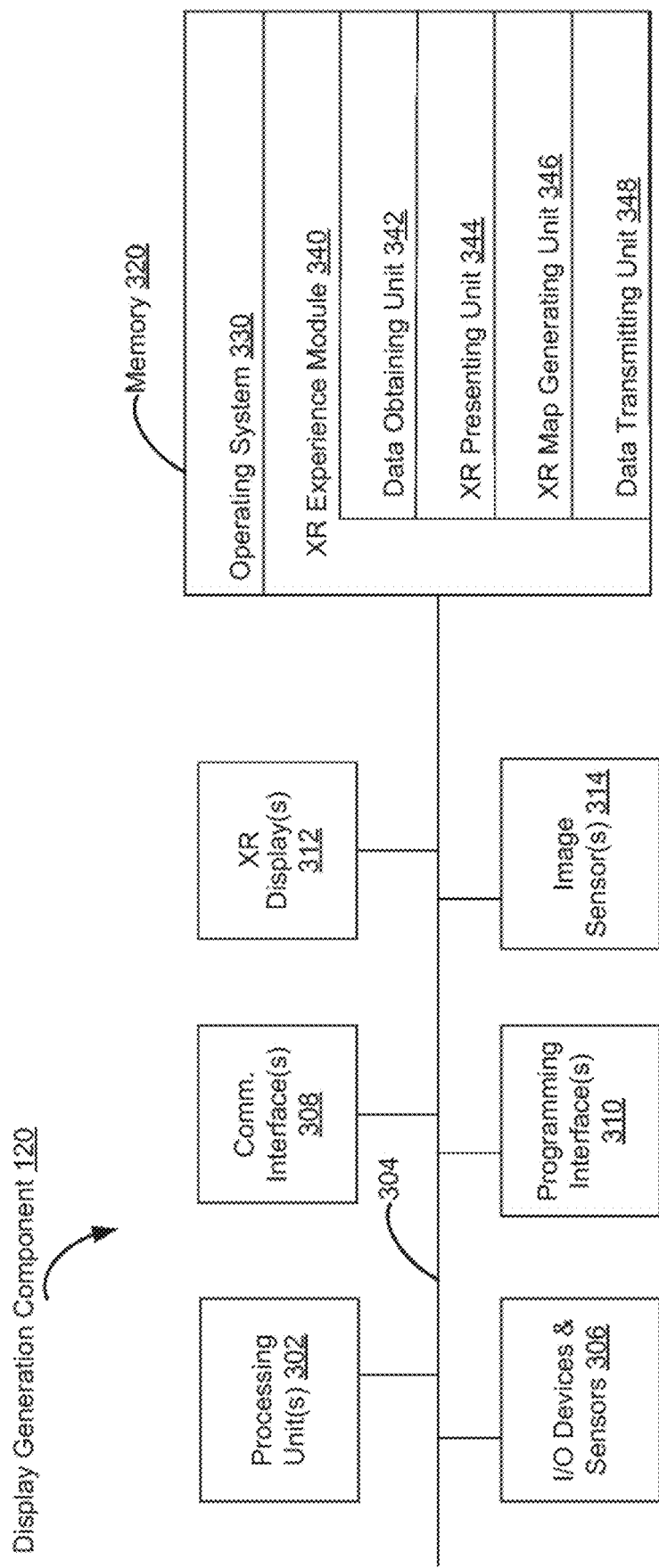
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (M EMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
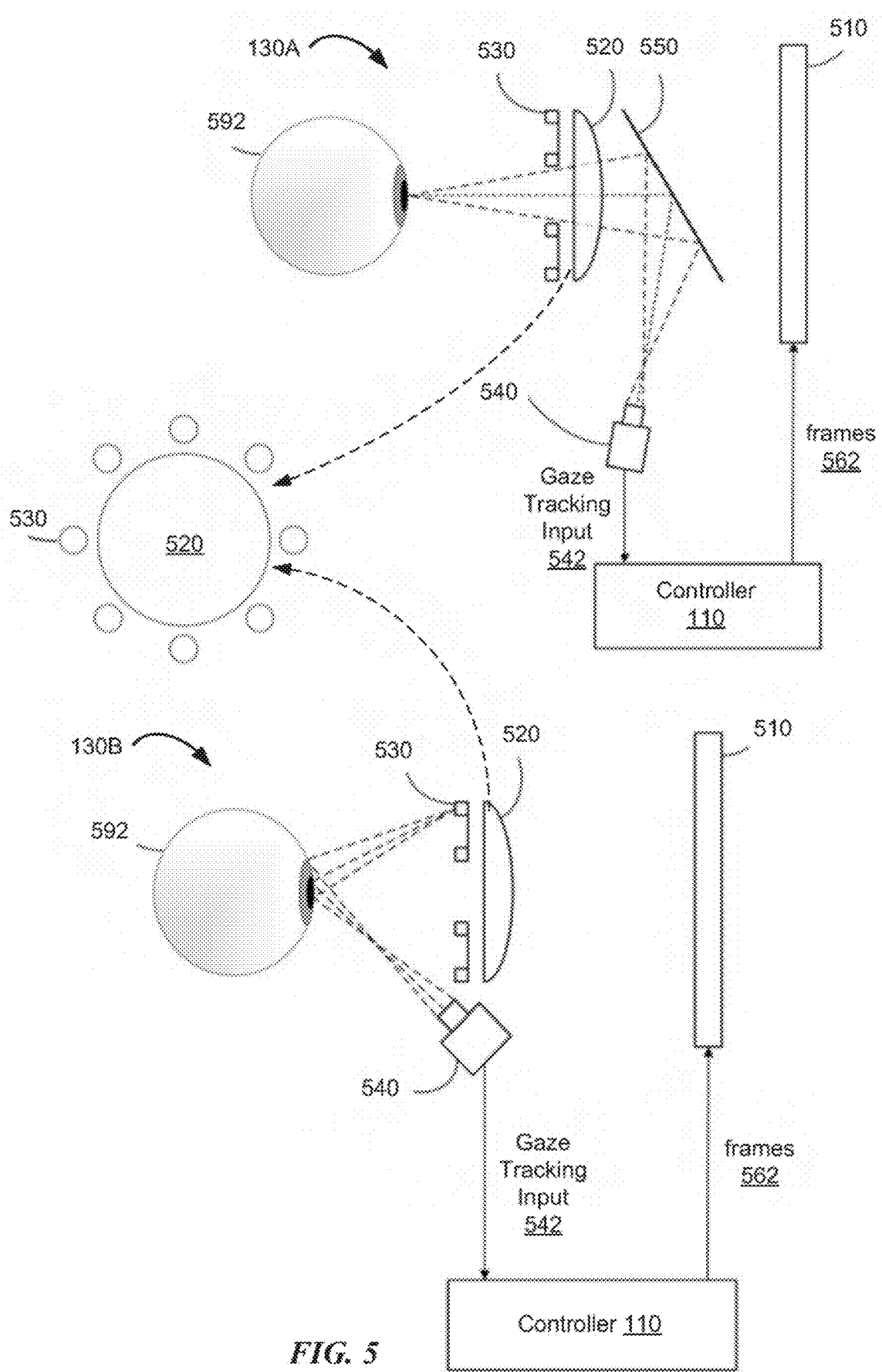
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., JR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected JR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and or augmented virtuality experiences to the user.

Figure 6:
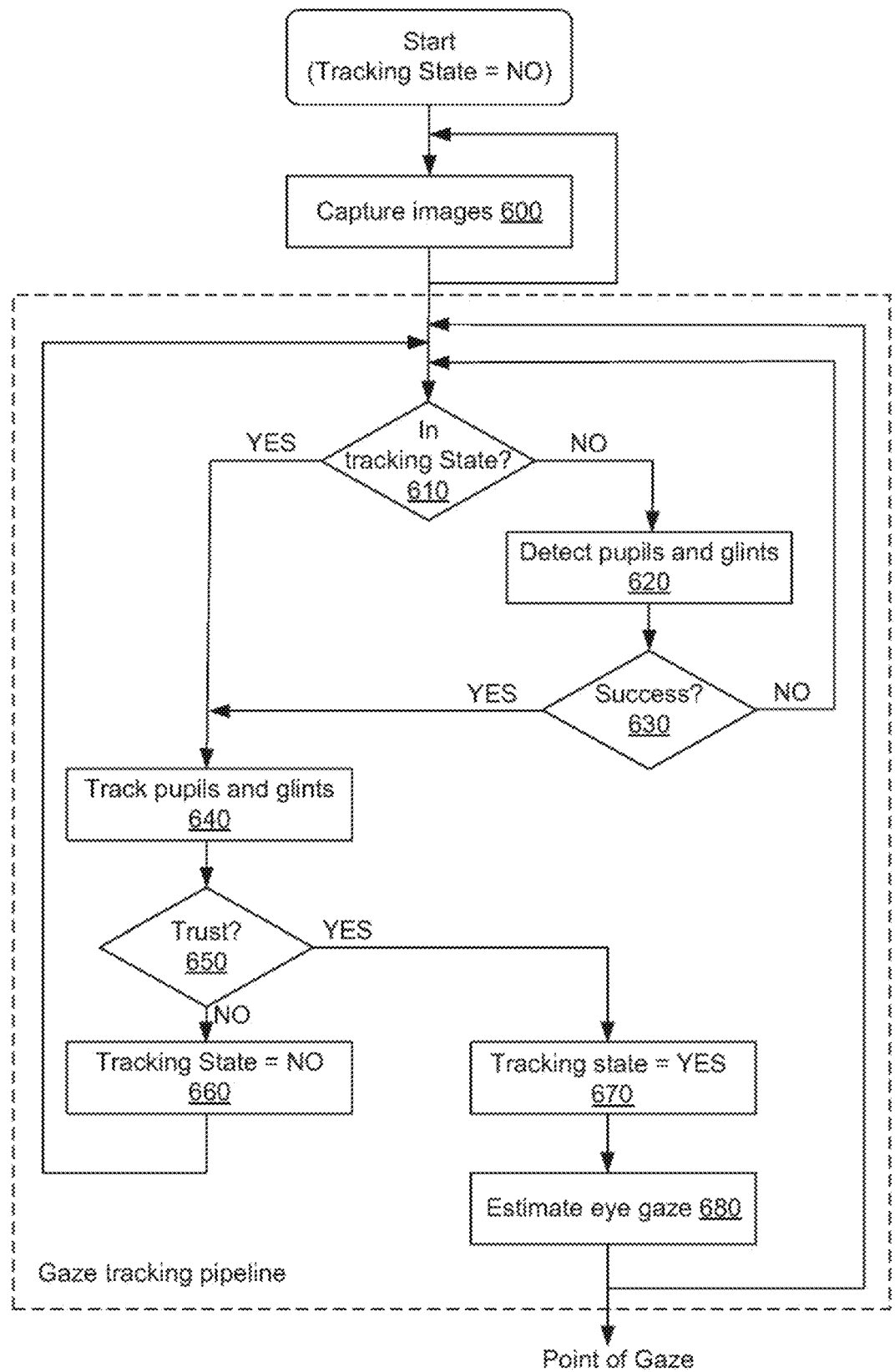
FIG. 6 is a low diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

USER INTERFACES AND ASSOCIATED PROCESSES

Attention is now directed towards embodiments of user interfaces ("UI") and associated processes that may be implemented on a computer system, such as a portable multifunction device or a head-mounted device, in communication with a display generation component, one or more input devices, and (optionally) one or cameras.

FIGS. 7A-7K illustrate examples of techniques for interacting with a graphical user interface using gaze. FIGS. 8A-8B are a flow diagram of an exemplary method 800 for interacting with a graphical user interface using gaze. The user interfaces in FIGS. 7A-7K are used to illustrate the processes described below, including the processes in FIGS. 8A-8B.

Figure 7A:
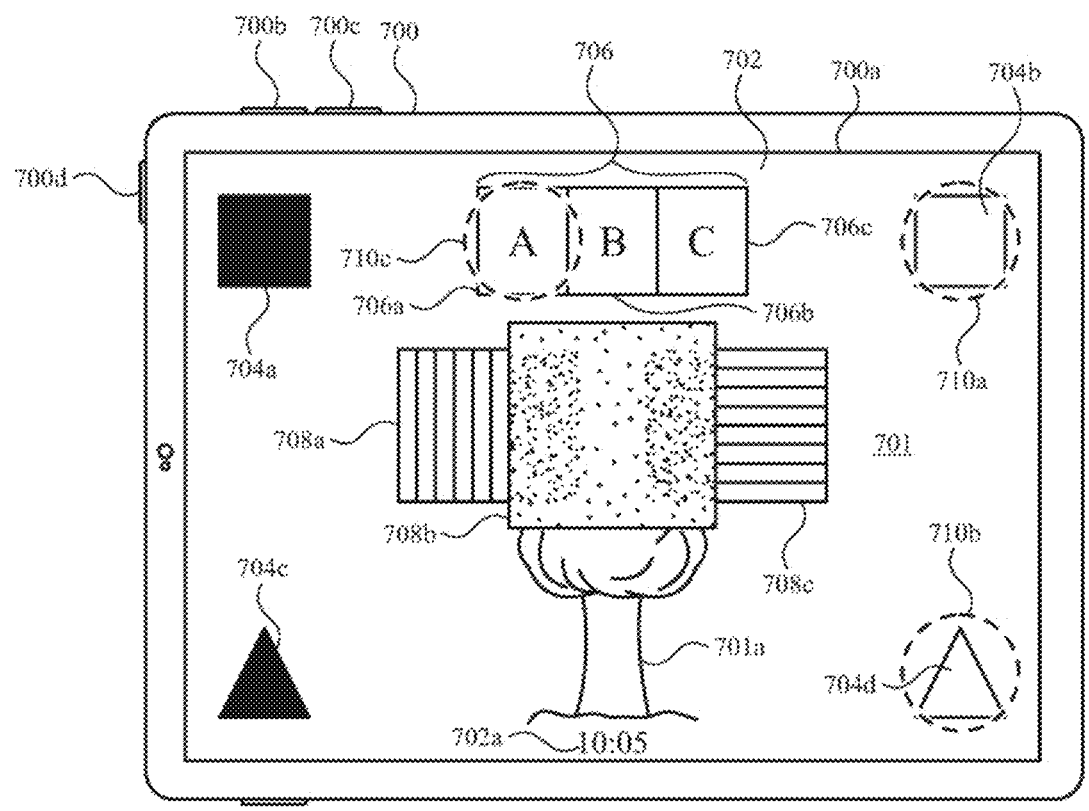
FIGS. 7A-7K illustrate example techniques for interacting with a graphical user interface using gaze, in accordance with some embodiments.
Figure 8A:
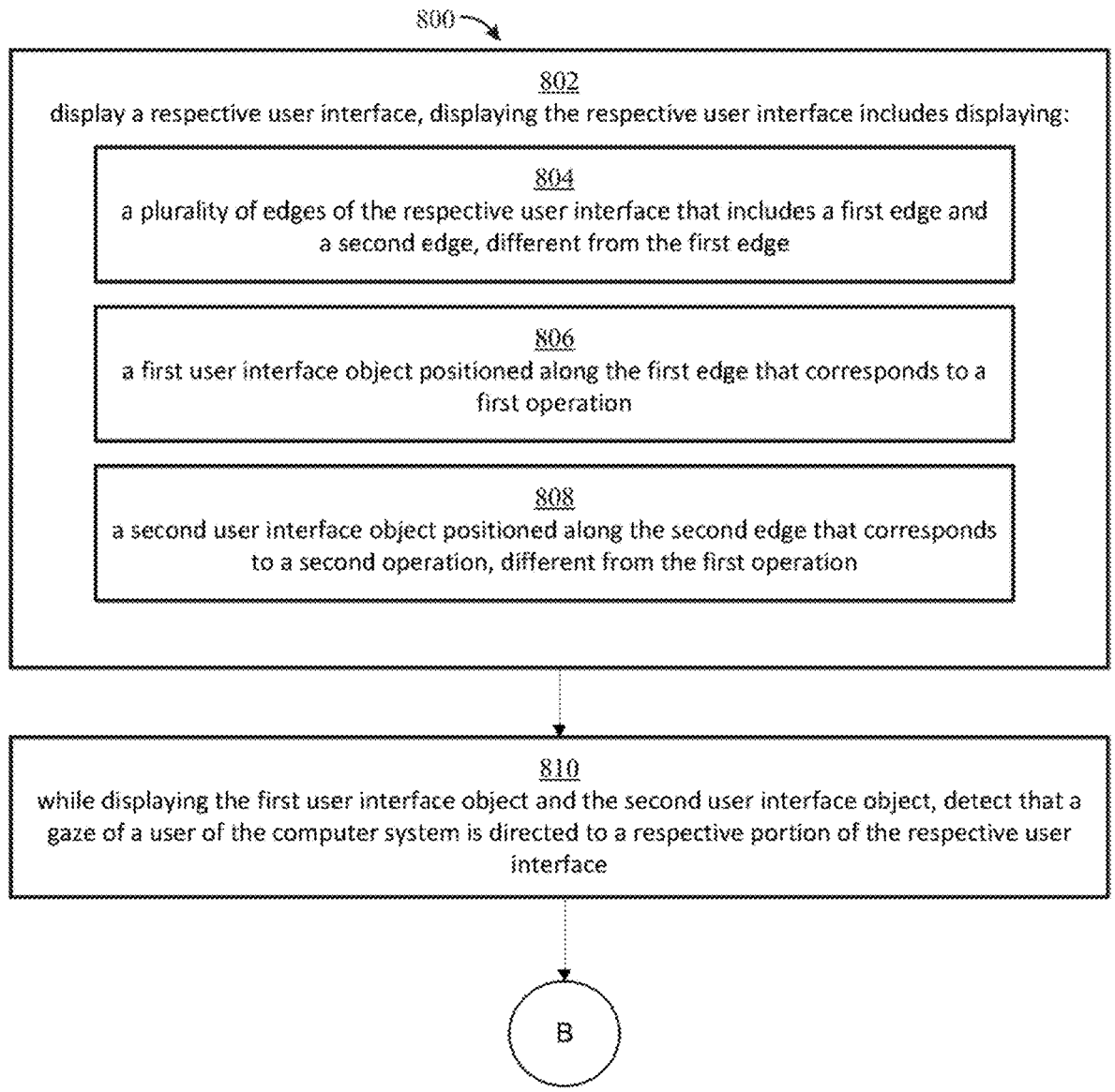
FIGS. 8A-8B are a flow diagram of a method for interacting with graphical user interfaces using gaze, in accordance with various embodiments.
Figure 8B:
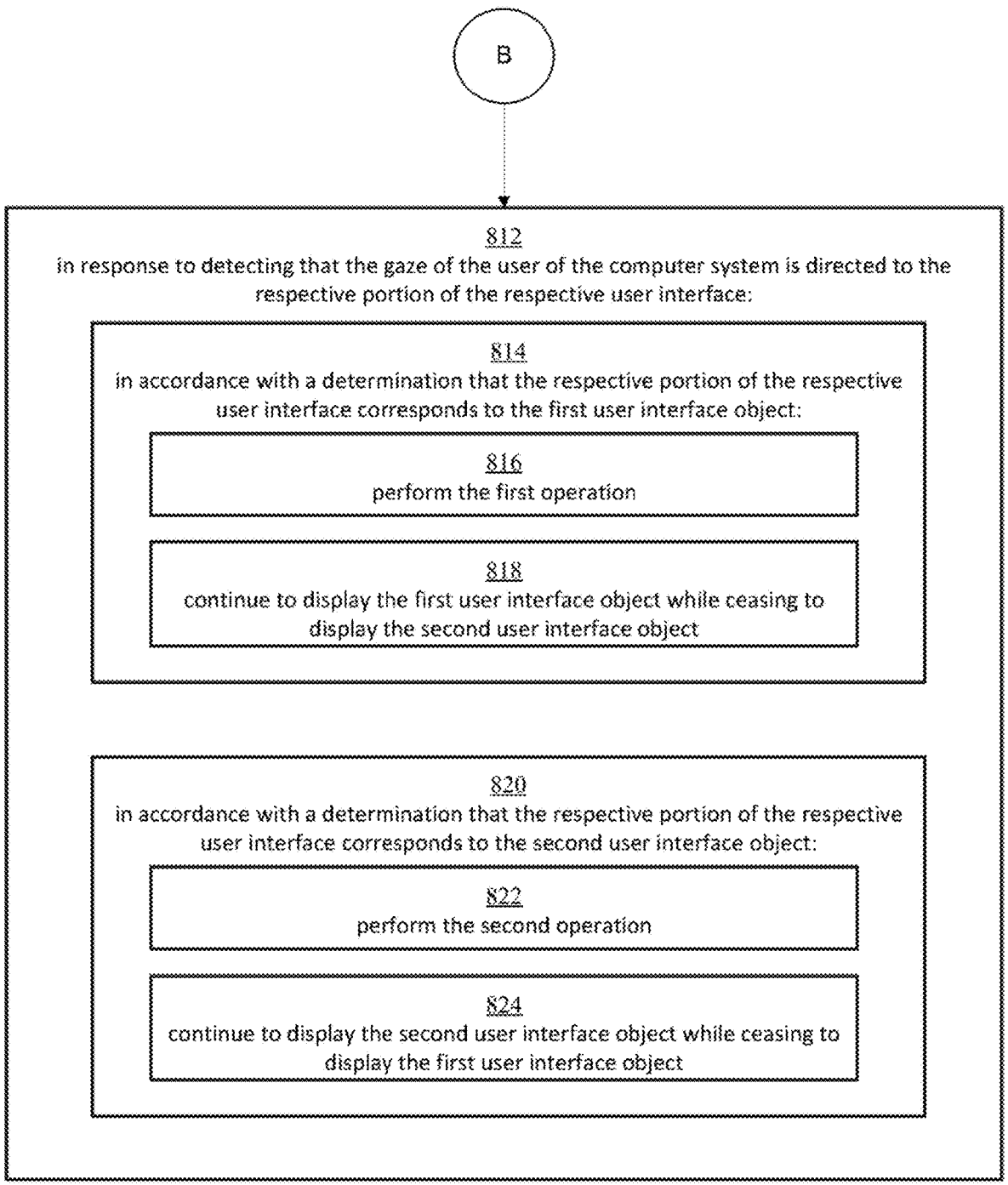

At FIG. 7A, device 700, a tablet computer, displays user interface 702 overlaid over representation of physical environment 701, which includes tree 701a. Device 700 includes display 700a and buttons (e.g., mechanical buttons, solid state buttons, and/or touch-sensitive buttons) 700b, 700c, and 700d. In some embodiments, device 700 includes one or more features of computer system 101, such as eye tracking device 130 and sensors 306, which can include an accelerometer for detecting movement of device 700. In some embodiments, device 700 is a head-mounted system or display (e.g., an HMD) and device 700 detects and/or tracks the direction and/or position of the user's gaze, while operating device 700 that is an HMD. In such embodiments, the position of display 700a generally occupies the majority of the field-of-view of the user and has a fixed orientation relative to the user's head. In such embodiments, a user can control certain operations of device 700 via the position of the user's gaze, without having to make manual contact (e.g., provide touch inputs) to device 700. Control via the user's gaze can be especially useful for an HMD as hardware elements (e.g., buttons or touch-sensitive surfaces) of the HMD may not be visible to the user while wearing the HMD and/or may be difficult to operate due to their position and/or lack of visibility. Moreover, doing so can allow the user to use his or her hands for other purposes (e.g., interacting with the physical environment and/or operating other devices). In some embodiments, while operating an HMD, the gaze of the user is often near the center region of his or her field-of-view (e.g., the user generally looks forward); placing control elements along the edges and/or corners can reduce the occurrence of false positives, as the user gazes at elements of the physical environment that are generally near the center of the user's field-of-view.

At FIG. 7A, user interface 702 includes several virtual objects (e.g., user-interactive virtual objects), including corner virtual objects 704a, 704b, 704c, and 704d, top virtual object 706 that includes top sub-portion virtual objects 706a, 706b, and 706c, center virtual objects 708a, 708b, and 708c, and time 702a. In some embodiments, representation of physical environment 701 is a passthrough representation (e.g., optical or camera-based) of the physical environment and user interface 702 is an XR interface. In some embodiments, corner virtual objects 704a, 704b, 704c, and 704d correspond to various system controls including, but not limited to, a settings menu virtual object, a gaze control mode virtual object, a display sleep mode virtual object, and a center virtual object mode control (e.g., that determines how center virtual objects are arrayed (e.g., as a carousel as seen in FIG. 7A or as a grid as seen in FIG. 7H)). In some embodiments, top sub-portion virtual objects 706a, 706b, and 706c of top virtual object 706 correspond to scalable system controls, such as output volume, display brightness, and/or display contrast. In some embodiments, top sub-portion virtual objects 706a, 706b, and 706c of top virtual object 706 correspond to system information, such as alert/notification status (e.g., whether a do-not-disturb mode is enabled and/or counts of various notification types), battery status, and/or connectivity status. In some embodiments, center virtual objects 708a, 708b, and 708c correspond to one or more applications, such as a camera application, a navigation application, or a workout/fitness application. In some embodiments, center virtual objects 708a, 708b, and 708c correspond to one or more XR experiences during which virtual objects are presented to a user along with a representation of the physical environment, such as a camera XR experience for capturing media while interacting with a physical environment, a navigation XR experience for navigating within a physical environment, or a workout XR experience for working out while presented with a representation of the physical environment. In some embodiments, the appearance (e.g., color, bolding, level of transparency, and/or orientation) of a virtual object of user interface 702 indicates a state of an associated control (e.g., whether audio output is muted or whether gaze-based control is enabled). In some embodiments, one or more of the virtual objects of user interface 702 are viewpoint-locked (e.g., 706 and 704a-c). In some embodiments, one or more of the virtual objects of user interface 702 are viewpoint-locked (e.g., 708a-c). In some embodiments, user interface 702 includes a fewer number or a greater number of corner virtual objects, sub-portion virtual objects, and/or or center virtual objects than what is shown in FIG. 7A. In some embodiments, additional virtual objects are displayed along one or more other edges of the display, beyond just the top.

At FIG. 7A, device 700 detects (e.g., via eye tracking device 130) that the user's gaze is directed to, alternatively or sequentially, corner virtual object 704b, corner virtual object 704d, and top sub-portion virtual object 706a, as indicated by gaze indications 710a, 710b, and 710, respectively. In the present disclosure, gaze indications can or cannot be visually presented as part of the user interface (e.g., device 700 can present or not present a visual indication of the currently detected location of the user's gaze). In some embodiments, detecting that the user's gaze is directed to a virtual object includes determining that the user's gaze has dwelled on the virtual object for a predetermined period of time (e.g., 0.1 seconds, 0.25 seconds, 0.5 seconds, or 1 second). In some embodiments, a user can configure (e.g., via a settings menu) whether a visual indication of the user's gaze is displayed by device 700.

Figure 7B:
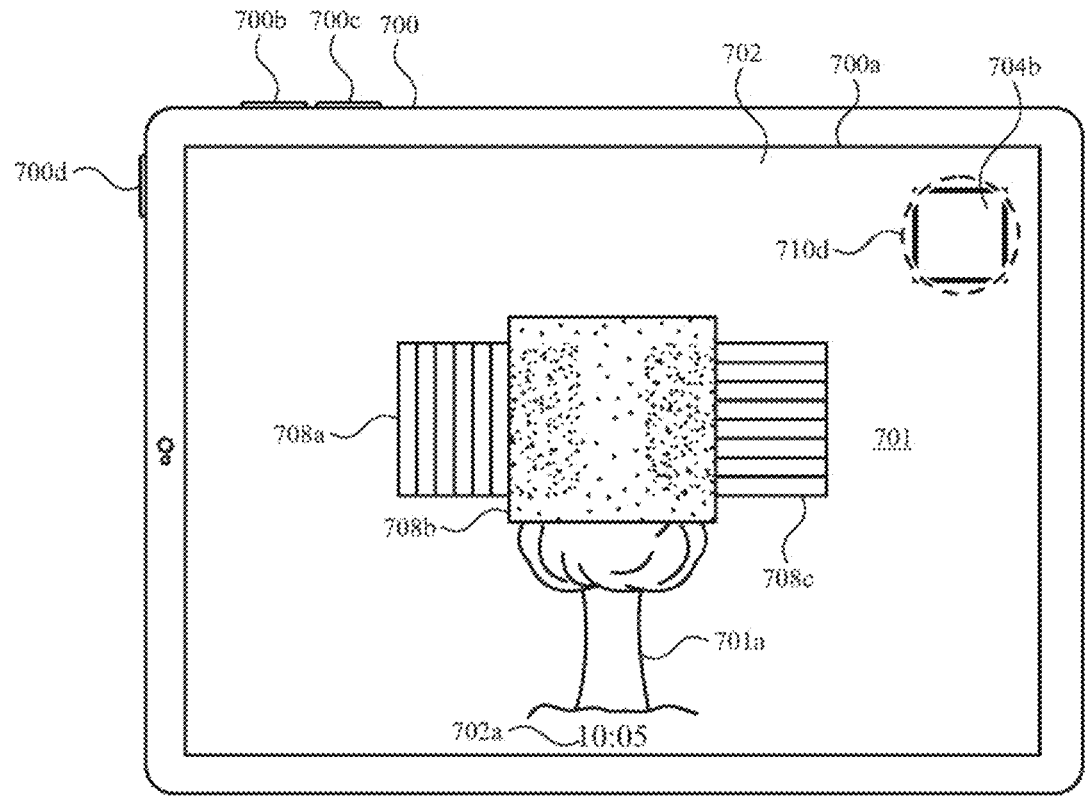

At FIG. 7B, in response to detecting that the user's gaze is directed to corner virtual object 704b, as indicated by gaze indication 710a in FIG. 7A, device 700 ceases to display corner virtual objects 704a, 704c, and 704d and top virtual object 706. In FIG. 7B, center virtual objects 708a-c and time 702a continue to be displayed, but in some embodiments, those virtual objects also cease to be displayed. Device 700 also bolds corner virtual object 704b to indicate that device 700 has detected the user's gaze directed to corner virtual object 704b. In some embodiments, corner virtual object 704b is emphasized in other ways, such as changing color, changing size, or changing shape. In the embodiment of FIGS. 7A-7K, corner virtual object 704b is a system control for toggling whether gaze-based control is enabled for the majority of user interface 702 (e.g., enabled for gaze-only based control), as discussed in more detail below. At FIGS. 7A and 73, gaze-based control is enabled for the majority of user interface 702. At FIG. 73, device 700 continues to detect that the user's gaze is directed to corner virtual object 704b, as indicated by gaze indication 710d. In some embodiments continuing to detect that the user's gaze is directed to a virtual object includes determining that the user's gaze has dwelled on the virtual object for a further predetermined period of time (e.g., 0.1 seconds, 0.25 seconds, 0.5 seconds, or 1 second), after the initial detection (e.g., after the detection indicated by gaze indication 710a of FIG. 7A). In some embodiments, if device 700 detects the user's gaze moving away from corner virtual object 704b while it is in the state shown in FIG. 7B, device 700 returns user interface 702 to the state shown in FIG. 7B; in some embodiments, device 700 does so only after the gaze has moved away from corner virtual object 704b for a predetermined time (e.g., 0.1 seconds, 0.25 seconds, 0.5 seconds, or 1 second), without returning to the virtual object.

Figure 7C:
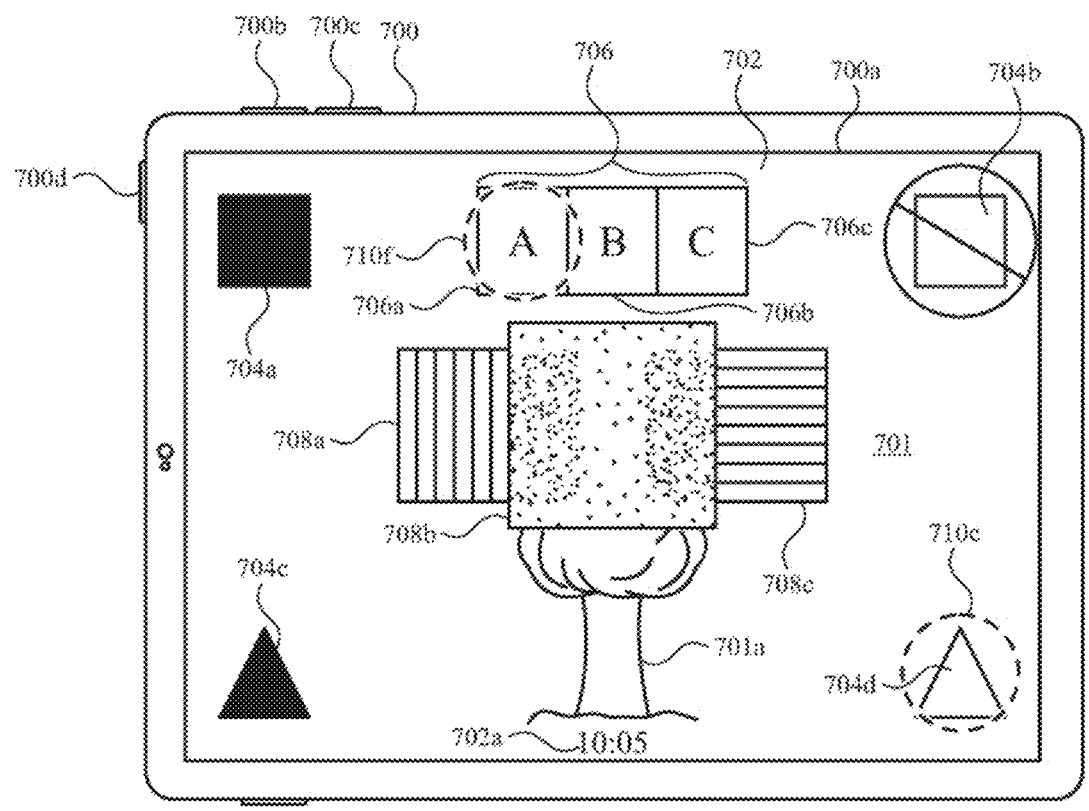

At FIG. 7C, in response to detecting that the user's gaze continues to be directed to corner virtual object 704b, device 700 disables gaze-based control for the majority of user interface 702, modifies the appearance of corner virtual object 702b to indicate that gaze-based control is now disabled for the majority of user interface 702, and redisplays the other virtual objects that ceased to be displayed at FIG. 7B. In the embodiment of FIGS. 7A-7K, when gaze-based control for the majority of user interface 702 is disabled, gaze, alone, cannot be used to activate functions associated with the virtual objects of user interface 702, with the exception of corner virtual object 704b that can be gazed at to reenable gaze-based control for the majority (e.g., the remainder) of user interface 702.

At FIG. 7C, device 700 detects that the user's gaze is directed to, alternatively or sequentially, corner virtual object 704d and top sub-portion virtual object 706a, as indicated by gaze indications 710e and 710f, respectively. At FIG. 7C, because gaze-based control is now disabled for the majority of user interface 702, including corner virtual object 704d and top sub-portion virtual object 706a, device 700 does not perform operations (e.g., the operation discussed with reference to FIGS. 7G and 7H for corner virtual object 704d and/or the operation discussed with reference to FIGS. 7D and 7E for top sub-portion virtual object 706a) that would have been performed had the gaze of the user been directed to those virtual objects while gaze-based control for the majority of user interface 702 is enabled. In some embodiments, when gaze-based control is disabled for the majority of user interface 702, a user can still activate the functions associated with a virtual object (e.g., corner virtual object 704d and top sub-portion virtual object 706i) by directing his or her gaze at a virtual object, in combination with another input (e.g., gaze in combination with actuation of button 700b, 700c, and/or 700d or with performance of an air gesture (e.g., an air pinch)). In some embodiments, disabling gaze-based interactions for a majority of the user interface provides the user with a mode in which the user can gaze for extended periods of time at most of the virtual objects, without activating undesired functions.

Figure 7D:
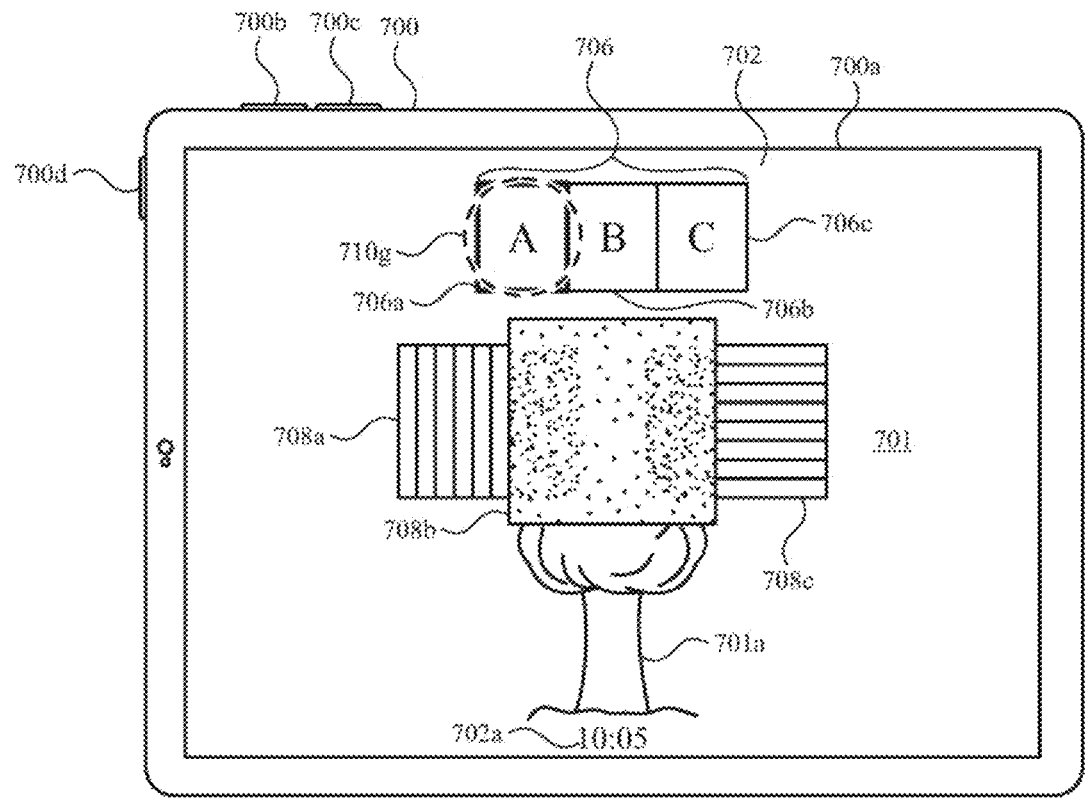

At FIG. 7D, in response to detecting that the user's gaze is directed to top sub-portion virtual object 706a, as indicated by gaze indication 710c in FIG. 7A, device 700 ceases to display corner virtual objects 704a-d. In FIG. 7C, center virtual objects 708a-c and time 702a continue to be displayed, but in some embodiments, those virtual objects also cease to be displayed. Device 700 also bolds top sub-portion virtual object 706a to indicate that device 700 has detected the user's gaze directed to top sub-portion virtual object 706a. In the embodiment of FIGS. 7A-7K, top sub-portion virtual object 706a is associated with battery capacity/level for device 700. In some embodiments, top sub-portion virtual object 706a includes a first set of battery-related information and/or controls when it is in the state shown in FIGS. 7A-7B (e.g., an unexpanded state). At FIG. 7D, device 700 continues to detect that the user's gaze is directed to top sub-portion virtual object 706a, as indicated by gaze indication 710g.

Figure 7E:
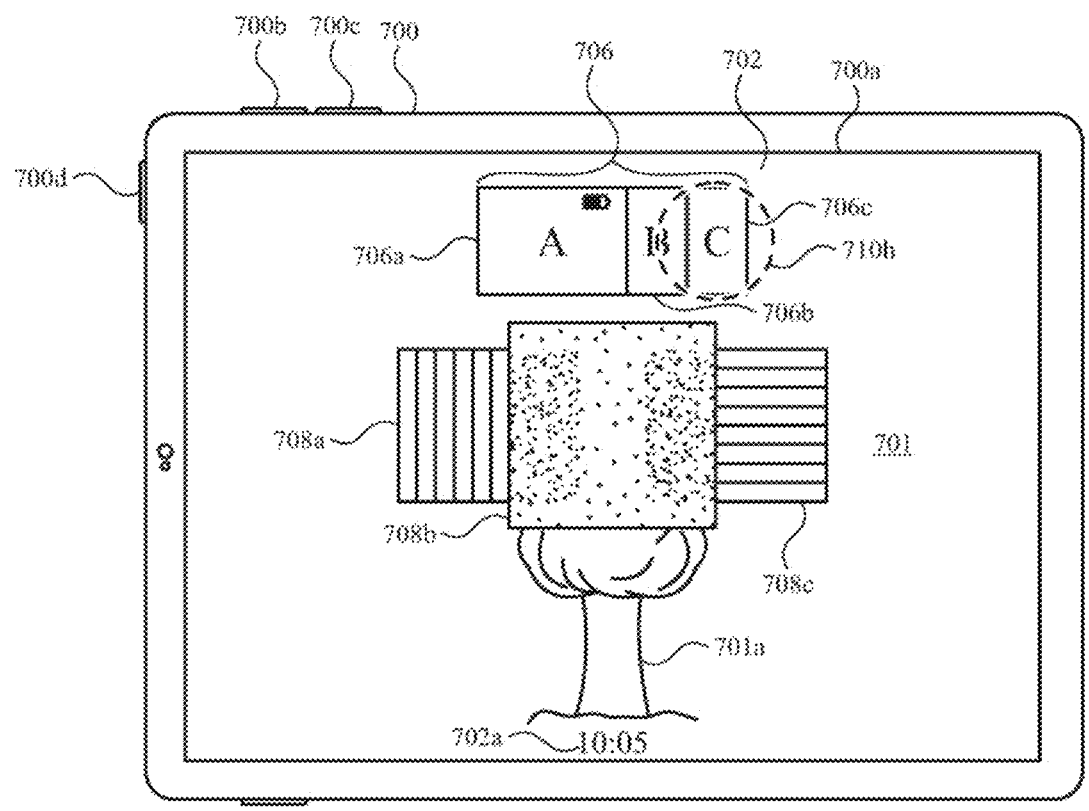

At FIG. 7E, in response detecting that the user's gaze continues to be directed to sub-portion virtual object 706a, device 700 transitions top sub-portion virtual object 706a to an expanded state (e.g., via a predetermined animation) and reduces the size of top sub-portion virtual objects 706b an 706c, such that the overall size of top virtual object 706 remains the same. In some embodiments, top sub-portion virtual object 706a is expanded without reducing the size of top sub-portion virtual objects 706b and 706c. In some embodiments, reducing the size of a top sub-portion virtual object includes ceasing to display one or more controls or information that was in the top sub-portion or ceasing to display the specific top sub-portion, all together. In the expanded state, top sub-portion virtual object 706a includes additional information and/or controls (e.g., additional battery and/or power state information and/or controls for transitioning to or from a power-conservation mode) that was not present when top sub-portion virtual object 706a was in its unexpanded state (e.g., as seen in FIG. 7D). In some embodiments, while top sub-portion virtual object 706a is expanded, if device 700 detects that the user's gaze is no longer directed to top sub-portion virtual object 706a, the object transitions back to the unexpanded state, as seen in FIG. 7D. At FIG. 7E, device 700 detects that the user's gaze is directed to top sub-portion virtual object 706c, while that object is in an unexpanded state, as indicated by gaze indication 710h. In some embodiments, while top sub-portion virtual object 706a is in an expanded state, device 700 expands it a further expanded state to display even more controls or information, if the user's gaze remains directed to top sub-portion virtual object 706a while it is in the expanded state. In the embodiments, of FIGS. 7A-7K, top sub-portion virtual object 706c is associated with audio output volume and includes a set of information related to system volume (e.g., a numerical value of a current volume level).

Figure 7F:
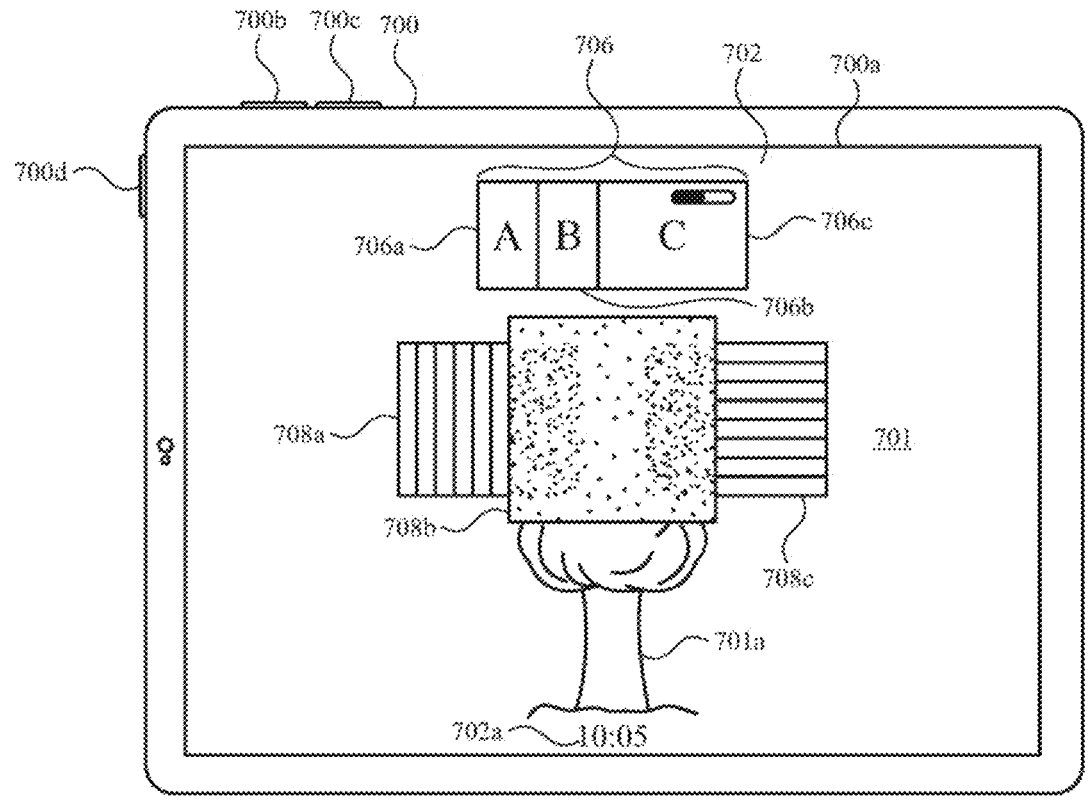

At FIG. 7F, in response to detecting that the user's gaze is directed to top sub-portion virtual object 706c, device 700 transitions top sub-portion virtual object 706c to an expanded state and reduces the size of top sub-portion virtual objects 706a an 706b. In the expanded state, top sub-portion virtual object 706c includes additional information (e.g., a graphical depiction of the volume level relative to a maximum level and/or a mute control) and/or controls that was not present when top sub-portion virtual object 706c was in its unexpanded state (e.g., as seen in FIGS. 7D and 7E). Accordingly, in the embodiments of FIGS. 7A-7K, a user can access additional information or controls in sub-portions of top virtual object 706 without consuming additional display real estate and without obscuring additional portions of representation of physical environment 701.

Figure 7G:
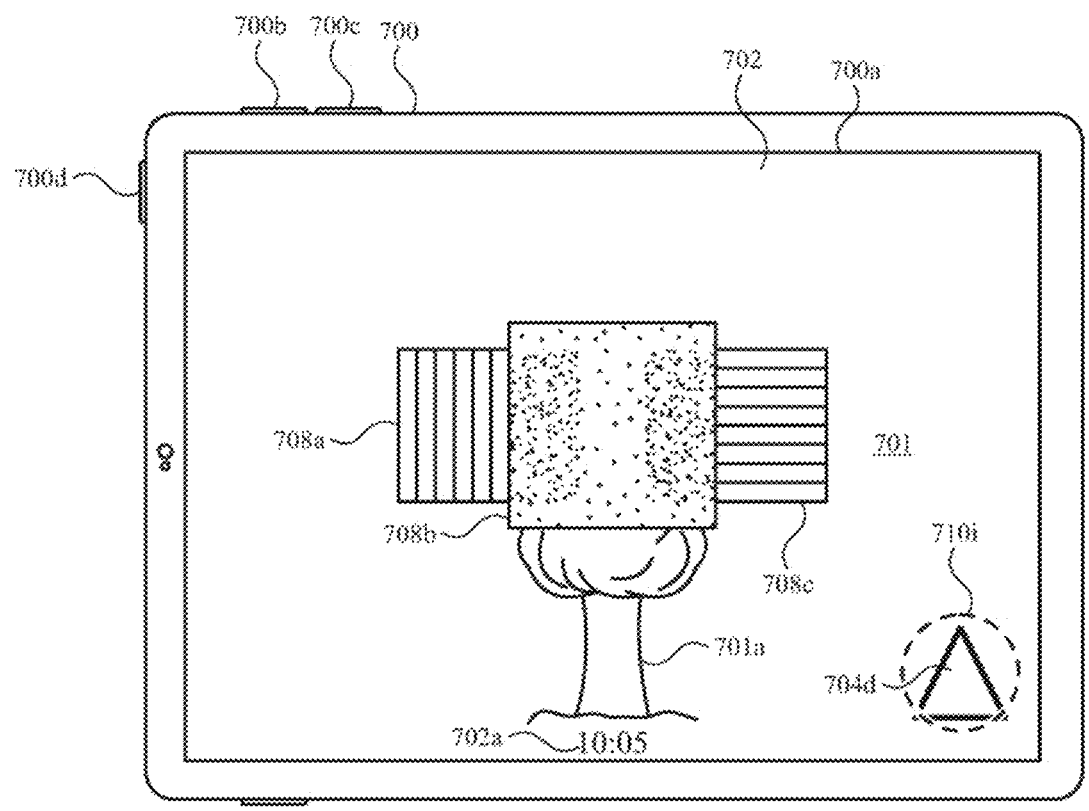
Figure 7H:
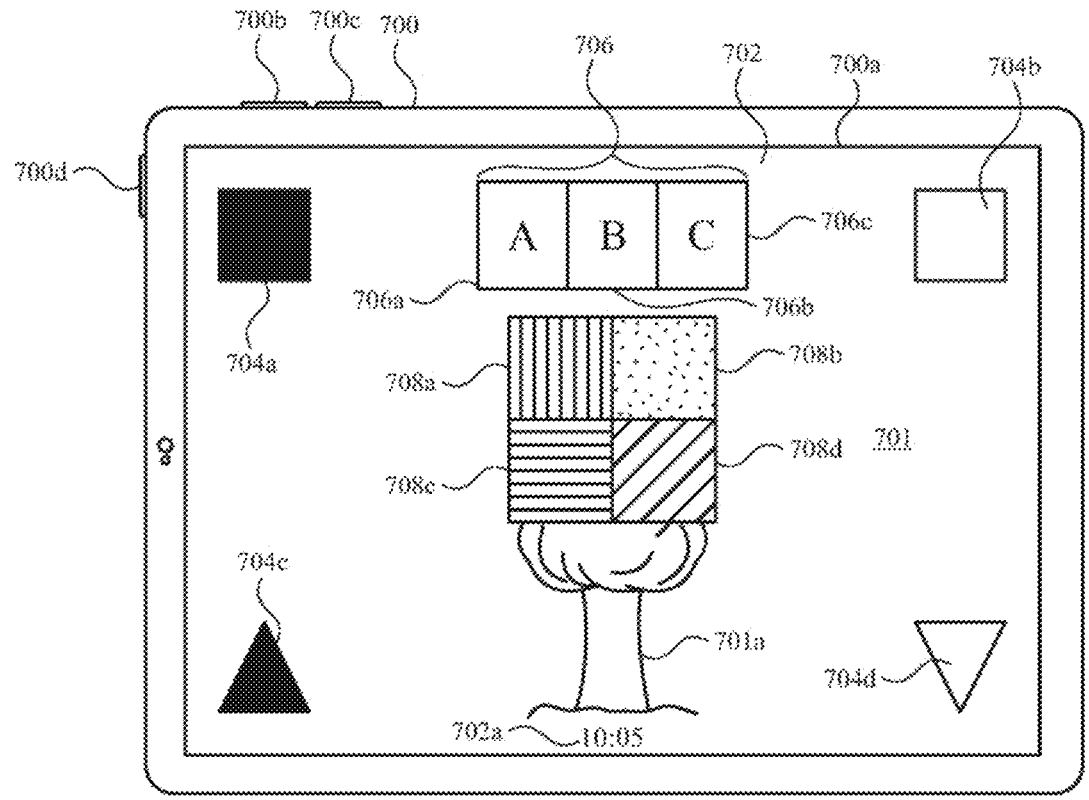

At FIG. 7G, in response to detecting that the user's gaze is directed to corner virtual object 704d, as indicated by gaze indication 710b in FIG. 7A, device 700 ceases to display corner virtual objects 704a, 704b, and 704c and top virtual object 706. In FIG. 7G, center virtual objects 708a-c and time 702a continue to be displayed, but in some embodiments, those virtual objects also cease to be displayed. Device 700 also bolds corner virtual object 704b to indicate that device 700 has detected the user's gaze directed to corner virtual object 704b. In some embodiments, corner virtual object 704b is emphasized in other ways, such as changing color, changing size, or changing shape. At FIG. 7G, device 700 continues to detect that the user's gaze is directed to corner virtual object 704d, as indicated by gaze indication 710d.

At FIG. 7H, in response detecting that the user's gaze continues to be directed to corner virtual object 704d, device 700 changes the layout in which center virtual objects 708a-708c are displayed from a carousel layout to a grid layout, including displaying additional center virtual object 708d, modifies the appearance of corner virtual object 702d to indicate that the grid layout is active, and redisplays the other virtual objects that ceased to be displayed at FIG. 7G.

Figure 7I:
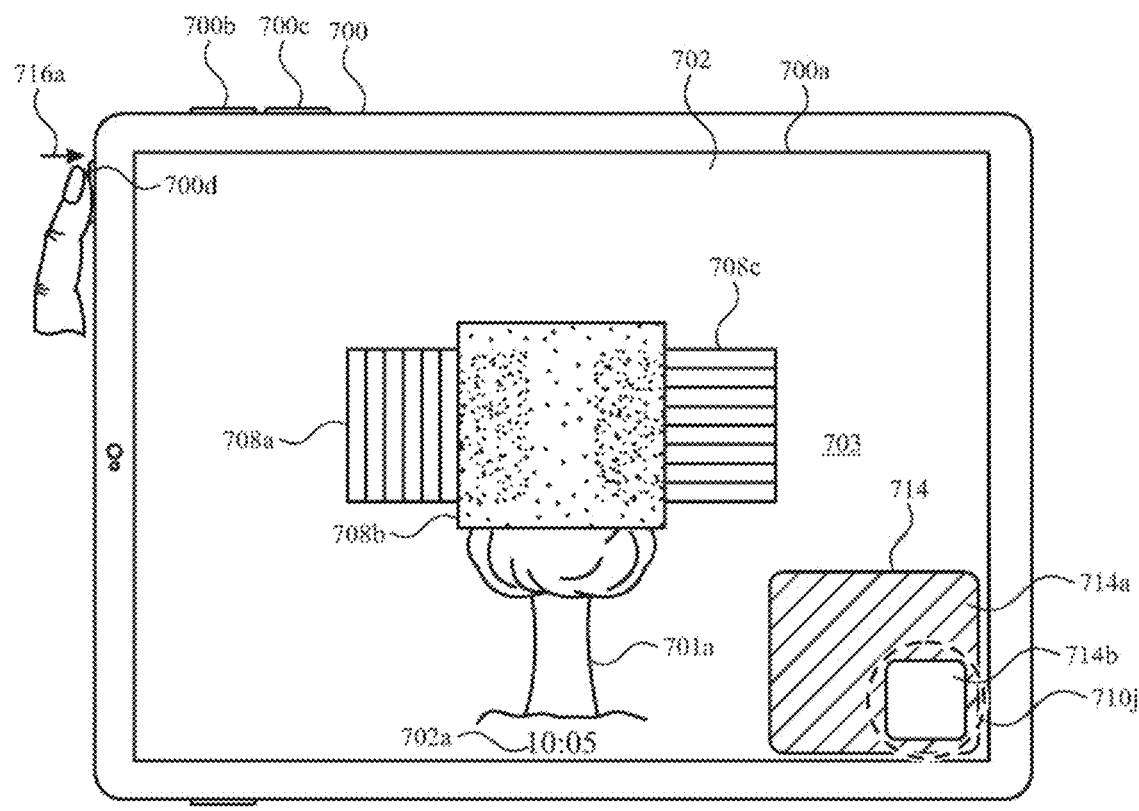

At FIG. 7I, device 700 displays, on display 702, user interface 712 overlaid over representation of physical environment 701. User interface 712 includes center virtual objects 708a-c, as discussed with reference to user interface 702. In some embodiments, user interface 712 includes one or more other features and/or virtual objects of user interface 702, discussed above. User interface 712 includes picture-in-picture ("PiP") virtual object 714 that includes a main portion 714a that includes representation of a user interface generated by a first application and a control virtual object 714b. In some embodiments, PiP virtual object 714 corresponds to a videoconferencing application and main portion 714a includes video content (e.g., a video of a user of an external device) transmitted from an external device that is currently in a videoconferencing session with device 700. In some embodiments, prior to displaying user interface 712 as seen in FIG. 7I, device 700 receives an indication of an incoming videoconferencing request and displays a selectable notification on display 700a; in such embodiments, user interface 712 as seen in FIG. 7I is displayed in response to selecting that notification. In some embodiments, PiP virtual object 714 corresponds to a media player application and main portion 714a includes media (e.g., a movie, a show, or music) being played back at device 700. In some embodiments, while displaying PiP virtual object 714, device 700 presents an XR experience (e.g., via user interface 712), such as a camera XR experience for capturing media while interacting with a physical environment, a navigation XR experience for navigating within a physical environment, or a workout XR experience for working out while presented with a representation of the physical environment. In such embodiments, PiP virtual object 714 can be displayed at a different depth (e.g., is perceived as being at a different distance from the user) than one or more virtual objects of an XR experience. In some embodiments, the XR experience is generated by a different application than the application generating PiP virtual object 714. At FIG. 7I, device 700 detects input 716a, which is an actuation of button 700d, while device 700 is detecting the user's gaze being directed to control virtual object 714b of PiP virtual object 714, as indicated by gaze indication 710j. In some embodiments, input 716a is an air gesture, a touch on a touch-sensitive surface, or a verbal input.

Figure 7J:
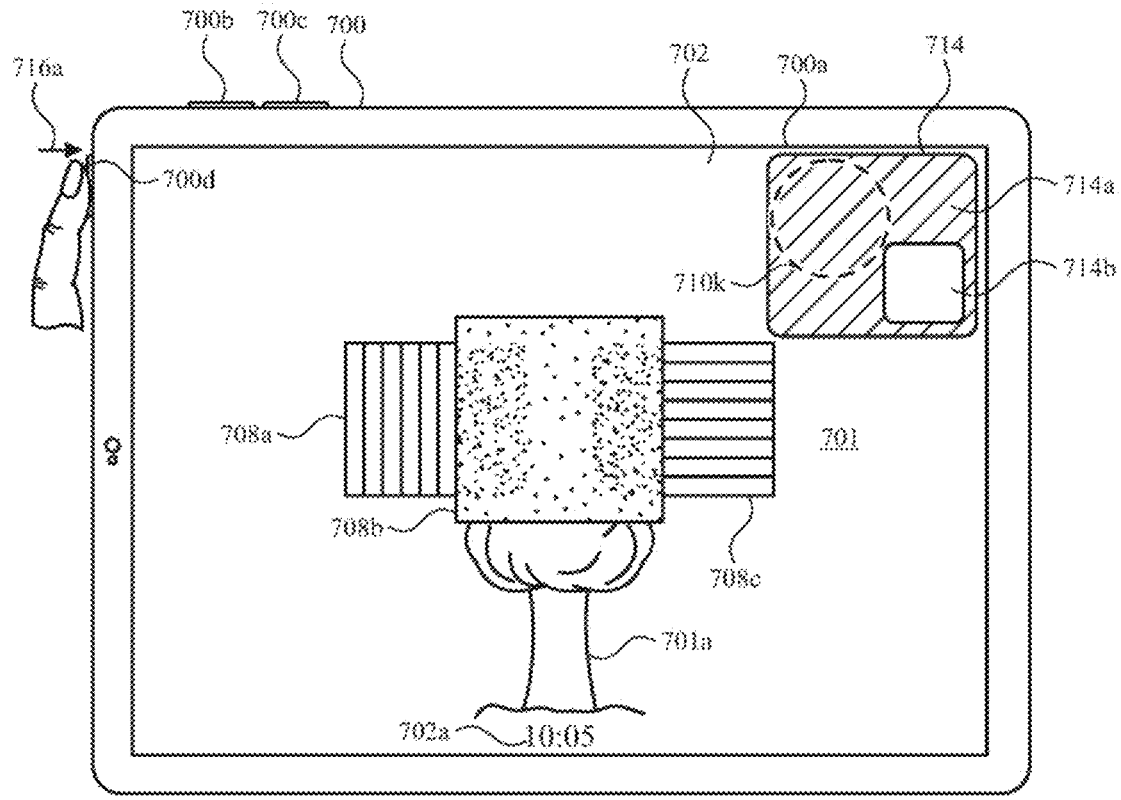

At FIG. 7J, in response to detecting input 716b while device 700 is detecting the user's gaze being directed to control virtual object 714b of PiP virtual object 714, device 700 moves PiP virtual object 714 from the lower righthand corner of display 700a to a predefined location at the upper righthand corner of display 700a. In some embodiments, when device 700 detects the gaze of the user directed to control virtual object 714b without detecting actuation of button 700d (in some embodiments, without detecting another additional input such as an air gesture, a touch on a touch-sensitive surface, or a verbal input), device 700 does not move PiP virtual object 714 (e.g., because the gaze of the user is commonly directed to the vicinity of control virtual object 714b due to the user viewing content within PiP virtual object 714, resulting in a high rate of false positives). In some embodiments, after moving PiP virtual object 714 to the upper righthand corner, if device 700 detects another actuation of button 700d, while device 700 is detecting the user's gaze being directed to control virtual object 714b of PiP virtual object 714, PiP virtual object 714 is moved to a predefined location at the upper lefthand corner of display 700a (in some embodiments, subsequently, to the lower lefthand corner on further actuation). In such embodiments, the user can position PiP virtual object 714 at a desired corner location by cycling through the corners. At FIG. 7J, device 700 detects input 716b, which is an actuation of button 700d, while device 700 is detecting the user's gaze being directed to main portion 714a of PiP virtual object 714, as indicated by gaze indication 710k. In some embodiments, input 716b is an air gesture, a touch on a touch-sensitive surface, or a verbal input.

Figure 7K:
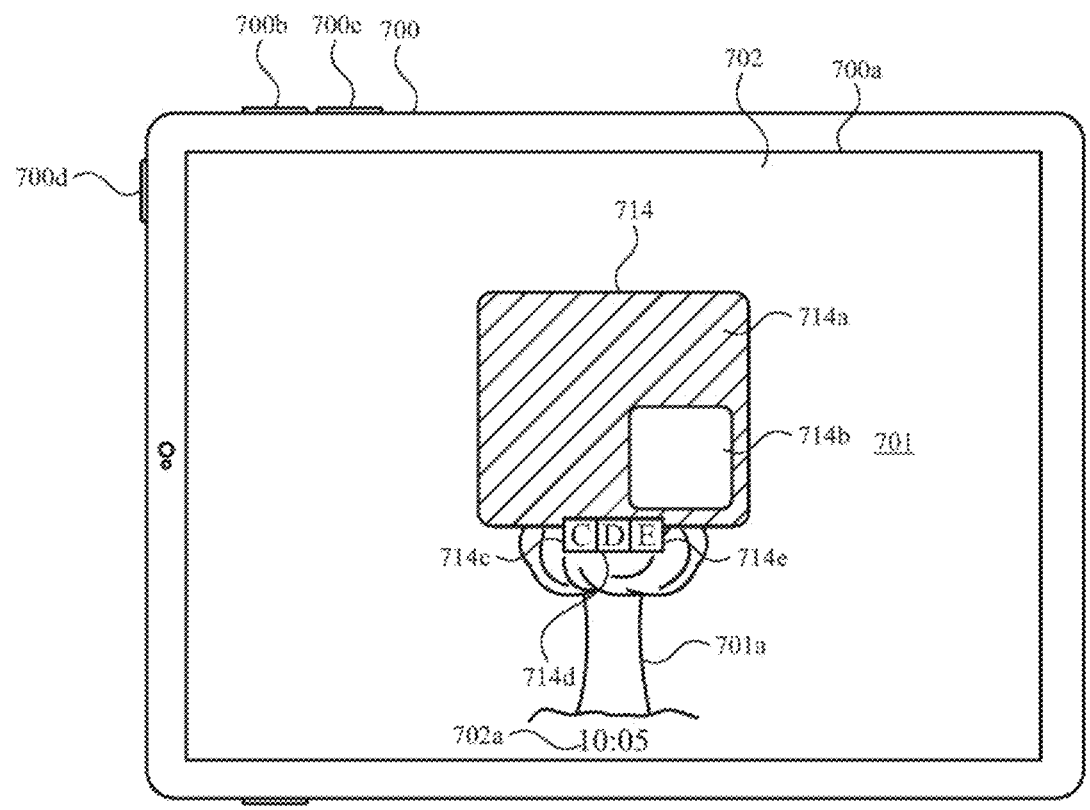

At FIG. 7K, in response to detecting input 716b while device 700 is detecting the user's gaze being directed to main portion 714a of PiP virtual object 714, device 700 expands PiP virtual object 714, displays PiP virtual object 714 at the center of display 700a, and displays additional PiP control virtual objects 714c-e. In some embodiments, PiP control virtual objects 714c-e, when selected (e.g., via gaze, via gaze and a hardware input, or gaze and an air gesture), cause device 700 to perform one or more functions associated with PiP virtual object 714. For example, when PiP virtual object 714 is associated with a videoconferencing application, device 700 can terminate the conference (e.g., and cease to display PiP virtual object 714), add another party to the conference, transmit content corresponding to representation of physical environment 701 to one or more other participants, cease to transmit video and/or audio from device 700, or switch the content of main portion 714a from a view of another participant to a self-view of the user of device 700.

Additional descriptions regarding FIGS. 7A-7K are provided below in reference to method 800 described with respect to FIGS. 7A-7K.

FIGS. 8A-8B are a flow diagram of an exemplary method 800 for interacting with graphical user interfaces using gaze, in accordance with some embodiments. In some embodiments, method 800 is performed at a computer system (e.g., computer system 101 in FIG. 1; a head mounted display; an optical head-mounted display; a personal computer; a smart phone; and/or a tablet computer) that is in communication with one or more gaze-tracking sensors (e.g., an optical and/or IR camera configured to track a direction of gaze of a user of the computer system; eye tracking device 130; and/or sensors 306) and a display generation component (e.g., display generation component 120; a display controller; a touch-sensitive display system; a passthrough display (e.g., integrated and/or connected), a 3D display, a transparent display, a projector, a heads-up display, and/or a head-mounted display). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system (e.g., 700) displays (802), via the display generation component (e.g., 700a), a respective user interface (e.g., 702). In some embodiments, the respective user interface is a set of one or more virtual objects displayed in an extended reality environment. In some embodiments, at least one virtual object of the set of one or more virtual objects is a viewpoint-locked virtual object. Displaying the respective user interface includes displaying: a plurality of edges (804) (e.g., outer edges and/or edges that intersect one or more other edges (e.g., to form a corner of the respective user interface)) (in some embodiments, the plurality of edges define the outer boundaries of the respective user interface) of the respective user interface that includes a first edge (e.g., a first outer edge) and a second edge (e.g., a second outer edge), different from the first edge; a first user interface object (806)(e.g., 706 and/or 704a-d) (e.g., a gaze-selectable object or other affordance) positioned along the first edge (e.g., top edge of 702)(e.g., displayed adjacent to the first outer edge; displayed adjacent to a first corner that is formed by the first outer edge and another outer edge of the plurality of outer edges) that corresponds to a first operation (e.g., operations associated with 706 and/or 704a-d) (e.g., an action to be performed by and/or affecting (e.g., a system control) the computer system; an operation that affects and/or modifies the respective user interface); and a second user interface object (808) (e.g., 706 and/or 704a-d) (a gaze-selectable object or other affordance) positioned along the second edge that corresponds to a second operation (e.g., operations associated with 706 and/or 704a-d), different from the first operation.

The computer system, while displaying the first user interface object and the second user interface object, detects (810), via the one or more gaze-tracking sensors, that a gaze of a user of the computer system is directed to a respective portion of the respective user interface (e.g., 710a-c) (e.g., is directed in a direction that corresponds to the gaze of the user intersecting with the respective portion)(in some embodiments, is directed to the first virtual object for at least a predetermined time period (e.g., 0.25 seconds, 0.5 seconds, or 1 second)).

The computer system, in response to detecting (812) that the gaze of the user of the computer system is directed to the respective portion of the respective user interface and in accordance with a determination (814) that the respective portion of the respective user interface corresponds to (e.g., includes and/or overlaps with) (in some embodiments, a determination that the gaze is directed to the first gaze-selectable control object and/or directed to the first outer edge) the first user interface object (e.g., 704*b*): performs (816) the first operation (e.g., as described at FIG. 7B); and continues (818) to display the first user interface object while ceasing to display the second user interface object (e.g., 706 and/or 704*a, c,* and *d*); in some embodiments, ceasing to display the second gaze-selectable control object while the gaze continues to be directed to the respective portion. In some embodiments, the second gaze-selectable control object is re-displayed once the gaze is no longer directed at the respective portion. In some embodiments, ceasing to display a plurality of gaze-selectable control objects, including the second gaze-selectable object, that are each associated with different outer edges and/or corners of the respective user interface.

The computer system, in response to detecting (812) that the gaze of the user of the computer system is directed to the respective portion of the respective user interface and in accordance with a determination (820) that the respective portion of the respective user interface corresponds to (e.g., includes and/or overlaps with) (in some embodiments, a determination that the gaze is directed to the second gaze-selectable control object and/or directed to the second outer edge) the second user interface object (e.g., 704*d*): performs (822) the second operation (e.g., operation at FIG. 7G); and continues (824) to display the second user interface object while ceasing to display the first user interface object (e.g., 706 and/or 704*a-c*). Providing control objects, which can be activated via the gaze of a user, at the edges of a user interface provides additional control options without cluttering the center region of the UI with additional displayed controls; for gaze-based interactions doing so also reduces the risk of false positives, as the center region of the UI presents a higher likelihood of false positives since the gaze of the user tends to naturally remain near the center. Reducing the risk of false positives for a user input scheme enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Continuing to display the selected user interface object while ceasing to display another user interface object when the computer system detects that the gaze of the user is directed to the selected user interface object provides improved visual feedback as to the detected direction of the user's gaze.

In some embodiments, the respective user interface is an extended reality user interface (e.g., as discussed with reference to FIG. 7A); and displaying the respective user interface includes displaying: a representation of the physical environment (e.g., 701) (e.g., an optical or video pass-through representation); and a third user interface object (e.g., a focus and/or face detection indicator, or a point-of-interest indicator), wherein the third user interface object is an environment-locked virtual object (in some embodiments, 708*a-c* are environment locked, as discussed at FIG. 7A)(e.g., that is locked to a location and/or object in the representation of the physical environment).

In some embodiments, continuing to display the first user interface object while ceasing to display the second user interface object includes visually emphasizing the first user interface object (e.g., 704*b* in FIG. 713) (e.g., bolding, enlarging, highlighting, animating, and/or brightening the first user interface object); and continuing to display the second user interface object while ceasing to display the first user interface object includes visually emphasizing the second user interface object (e.g., 704*d* in FIG. 7G). Visually emphasizing the selected user interface object while ceasing to display another user interface object when the computer system detects that the gaze of the user is directed to the selected user interface object provides improved visual feedback as to the detected direction of the user's gaze.

In some embodiments, performing the first operation includes: expanding the first user interface object (e.g., 706) from an unexpanded state (e.g., a contracted state) to a first expanded state by expanding at least a first portion (e.g., 706*a*) (e.g., a first sub-portion, or a portion that corresponds to one control of a set of controls associated with the first user interface object) of the first user interface object, wherein the first expanded state of the first user interface object includes a first control object (e.g., a selectable object that corresponds to a control option (e.g., a volume control, a brightness control, or another control with a range of possible values)) and first information (e.g., textual and/or graphical information associated with the first control object (e.g., a current volume level, a current brightness level, or another value of a range of possible values)) that were not included in the unexpanded state of the first user interface object (e.g., as discussed with reference to FIG. 7E). Expanding the first user interface object, only when requested, to include a first control object and first information that was not previously present provides additional control options and conserves display real estate and makes it easier to continue to interact with the now-expanded first user interface object, via gaze (e.g., because the gaze target is now larger), without cluttering the UI with additional displayed controls. Doing so also provides improved visual feedback as to the detected direction of the user's gaze.

In some embodiments, the first control object (e.g., 706 and/or 706*a*), when selected, causes the computer system to perform an operation related to display brightness (e.g., adjusting a value of display brightness, and/or causing additional brightness-related options to be displayed); and the first information corresponds to brightness information.

In some embodiments, the first control object (e.g., 706 and/or 706*b*), when selected (e.g., selected by gaze, by performing an air gesture while the object is in focus, by pressing a hardware button while the object is in focus), causes the computer system to perform an operation related to audio output volume (e.g., adjusting a value of output volume); and the first information corresponds to volume information (e.g., current volume level, mute status, audio output source, and/or input source).

In some embodiments, the first control object (e.g., 706 and/or 706*c*), when selected (e.g., selected by gaze, by performing an air gesture while the object is in focus, by pressing a hardware button while the object is in focus), causes the computer system to perform an operation related to an energy storage component (e.g., a battery) of the computer system (e.g., transitioning to a low power mode and/or causing additional battery information to be displayed); and the first information corresponds to energy storage (e.g., battery level, power mode, and/or estimate remaining use time) information.

In some embodiments, the computer system detects, via the one or more gaze-tracking sensors, that the gaze of the user of the computer system is directed to the first control object (e.g., 706 and/or 706*a*) (e.g., is directed in a direction that corresponds to the gaze of the user intersecting with the first control object) (in some embodiments, is directed to the first control object for at least a predetermined time period (e.g., 0.25 seconds, 0.5 seconds, or 1 second)). The computer system, in response to detecting that the gaze of the user of the computer system is directed to the first control object, expands the first control object from a first control object unexpanded state to a first control object expanded state (e.g., as seen in FIGS. 7D and 7E) (e.g., that is larger than the first control object unexpanded state and/or that includes information and/or controls that were not included in the first control object unexpanded state) (in some embodiments, expanding the first control object from a first control object unexpanded state to a first control object expanded state includes ceasing to display an different control object (e.g., an object that is displayed at a location that the first control object is expanded into) that was included in the first user interface prior to detecting that the gaze of the user of the computer system is directed to the first control object). Expanding the first control object, only when requested, conserves display real estate and makes it easier to continue to interact with the now-expanded first control object, via gaze (e.g., because the gaze target is now larger), without cluttering the UI with additional displayed controls. Doing so also provides improved visual feedback as to the detected direction of the user's gaze.

In some embodiments, while the first user interface object (e.g., 706) is displayed with the first control object in the first control object unexpanded state (e.g., 706*c* in FIG. 7E), the first user interface object includes a second control object that is in a second control object expanded state (706*a* in FIG. 7E), and expanding the first control object from the first control object unexpanded state to the first control object expanded state includes contracting the second control object from the second control object expanded state to a second control object unexpanded state (e.g., 706*a* as seen in the transition from FIG. 7E to FIG. 7F) (e.g., that does not include a control and/or information that is included in the second control object expanded state). Collapsing the second control object when expanding the first control object reduces the risk of false positives by reducing the area of the second control object that could trigger a gaze interaction. Doing so also provides improved visual feedback as to the detected direction of the user's gaze.

In some embodiments, the first control object (e.g., 706), while in the first control object expanded state (e.g., 706*a* as described in FIG. 7E), includes a third control object (e.g., a selectable object that corresponds to a control option that is associated with the first control object (e.g., the first control object includes information about volume and the third control object, when selected, causes a volume-related operation to be performed (e.g., the third control object is a volume slider))) that was not included in the first control object, while the first control object was in the first control object unexpanded state. Expanding the first control object, when requested, to include a third control object that was not previously present provides additional control options and conserves display real estate, without cluttering the UI with additional displayed controls when not needed. Doing so also provides improved visual feedback as to the detected direction of the user's gaze.

In some embodiments, the first control object (e.g., 706), while in the first control object expanded state, includes second information (e.g., 706*a* as described in FIG. 7E) (e.g., textual and/or graphical information associated with the first control object and/or the third control object (e.g., a current volume or brightness level and/or battery information)) that was not included in the first control object, while in the first control object unexpanded state. Expanding the first control object, when requested, to include second information that was not previously present provides additional information and conserves display real estate, without cluttering the UI with additional displayed information when not needed. Doing so also provides improved visual feedback as to the detected direction of the user's gaze.

In some embodiments, the first control object (e.g., 704*a* as described at FIG. 7A), when selected (e.g., selected by gaze, by performing an air gesture while the object is in focus, and/or by pressing a hardware button while the object is in focus), causes the display generation component to transition from a first mode (e.g., an active mode) to a second mode (e.g., a sleep mode; an inactive mode; an off mode; and/or a mode in which the display generation ceases to display content, until the second mode is exited). In some embodiments, the first control object is located in a corner of a display area of the display generation component. Providing a control object that can cause the display generation component to transition from the first mode to the second mode provides a gaze-based option to transition the mode of the display. In situations where the second mode is a lower power mode, doing so also reduces power usage and improves battery life of the device.

The first control object (e.g., 704*b*), when selected (e.g., selected by gaze, by performing an air gesture while the object is in focus, and/or by pressing a hardware button while the object is in focus), causes the computer system to disable (e.g., deactivate) a set of one or more functions that are activated by detecting the gaze of the user of the computer system. In some embodiments, the one or more functions can still be activated by a non-gaze-based input (e.g., by an air gesture and/or by a button press). Providing a control object that can cause the computer system to disable (e.g., deactivate) a set of one or more functions that are activated by detecting the gaze of the user of the computer system can reduce false positives, as gaze-based interaction schemes can have a higher chance of false positives as gaze naturally flows from viewing displayed content.

In some embodiments, causing the computer system to disable the set of one or more functions that are activated by detecting the gaze of the user of the computer system includes: disabling a first function (e.g., function of 704*d*) that is activated when the computer system detects that the gaze of the user of the computer system is directed to a first position (e.g., a position at or near the center of the respective user interface) of the respective user interface; and maintaining, as available for activation (e.g., as being available for activation via gaze), a second function (e.g., function of 704*b*) (e.g., a function for reenabling the one or more functions that are activated by detecting the gaze of the user of the computer system) that is activated when the computer system detects that the gaze of the user of the computer system is directed to a second position (e.g., a corner position, or a position that corresponds to the first user interface object) of the respective user interface (e.g., as described with reference to FIG. 7C). Maintaining, as available for activation a particular function, while disabling other gaze-based functions, provides a gaze-based mechanism for activating certain functions, while still reducing false positives for other functions. When the function is one for reactivating disabled gaze-based functions, doing so allows the user to avoid having to resort to non-gazed-based control scheme to reactivate gaze based functions.

In some embodiments, the computer system, in accordance with a determination that the set of one or more functions that are activated by detecting the gaze of the user of the computer system are available for activation, displays an indication (e.g., 704*b* as shown in FIG. 7A) (e.g., a textual and/or graphical indication) that the set of one or more functions that are activated by detecting the gaze of the user of the computer system are available for activation; and in accordance with a determination that the set of one or more functions that are activated by detecting the gaze of the user of the computer system are disabled (e.g., are not available for activation), displays an indication (e.g., 704*b* as shown in FIG. 7C) (e.g., a textual and/or graphical indication) that the set of one or more functions that are activated by detecting the gaze of the user of the computer system are disabled. Displaying an indication of whether the set of one or more functions are available for gaze-based activation provides improved visual feedback and also can reduce user frustration that can result from attempts to use a disabled function.

In some embodiments, the respective user interface further includes a current time indicator (e.g., 702*a*) (e.g., an indication of the current time at the location of the computer system and/or an indicator located along a bottom edge of the user interface). In some embodiments, the first user interface object includes an indication of the current time and/or the first user interface object is located along a bottom edge of the user interface. Displaying a current time indicator provides the user with improved visual feedback as to the current time.

In some embodiments, the respective user interface includes a plurality of application user interface objects (e.g., 708*a-c*) that are displayed in a first spatial arrangement (e.g., a row or three-dimensional carousel arrangement); and the first control object (e.g., 704*d*), when selected (e.g., selected by gaze, by performing an air gesture while the object is in focus, and/or by pressing a hardware button while the object is in focus), causes the plurality of application user interface objects to transition from being displayed in the first spatial arrangement to being displayed in a second spatial arrangement (e.g., a grid or column arrangement), different from the first spatial arrangement.

In some embodiments, the respective user interface further includes a first representation (e.g., 714)(e.g., a picture-in-picture ("PiP") representation of the application that is dynamic)(in some embodiments, the representation is in a corner of the respective user interface and occupies less than 50%, 40%, 30%, 25%, 20%, or 10% of the area of the respective user interface) of an application user interface of a first application (e.g., a teleconference application; a video application). Displaying a first representation of an application user interface of a first application provides improved visual feedback as to the state and/or nature of the application user interface.

In some embodiments, while the first representation (e.g., 714) is displayed at a first location (e.g., as shown in FIG. 7I)(e.g., a position) in the respective user interface, the computer system detects a first input (e.g., 716*a*)(e.g., an air gesture (e.g., performed while the first representation is in focus), a gaze-based input, or a hardware button press) corresponding to the first representation. The computer system, in response to the first input, moves the first representation to a second location in the respective user interface, different from the first location (e.g., as shown in FIG. 7J). In some embodiments, the first representation is displayed in a first corner of the respective user interface and moved to a second corner of the respective user interface. Moving the first representation to a second location in the respective user interface, different from the first location, in response to an input, allows the user to free up space (e.g., at the first location) to make other content visible (e.g., passthrough content and/or other virtual objects) and provides the user with greater control over display locations and content. Providing the user with greater control over display locations and the content displayed therein enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first location is predefined and the second location is predefined (e.g., the first representation moves from a first predefined location to a second predefined location). Moving the first representation to a predefined location reduces the number of inputs needed to perform the move operation, as an input identifying a target location is not required.

In some embodiments, the computer system, while the first representation is in a first representation unexpanded state, detects a second input (e.g., an air gesture (e.g., performed while the first representation is in focus), a gaze-based input, or a hardware button press) corresponding to the first representation. The computer system, in response to detecting the first input, expands the first representation to a first representation expanded state (e.g., 714 as shown in FIG. 7K), wherein the first representation is larger in the first representation expanded state than in the first representation unexpanded state (e.g., 25%, 30%, 40%, 50%, 60%, 100%, or 200% larger). In some embodiments, the first representation, while in the expanded state, includes additional content and/or control objects that are not included in the unexpanded state. Expanding the first representation to a first representation expanded state improves the user's ability to interact with the representation (e.g., via gaze inputs), improving ease-of-use. Improving ease-of-use enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, aspects/operations of methods 800, 1000, 1200, and 1400 may be interchanged, substituted, and/or added between these methods. For example, the techniques for interacting with a graphical user interface using gaze of method 800 can be used to interact with the virtual objects that are repositioned via method 1000. By way of another example, the virtual objects that are repositioned via method 1400 may be initially displayed via the interaction techniques of method 800. For brevity, these details are not repeated here.

FIGS. 9A-9D illustrate examples of techniques for repositioning virtual objects. FIG. 10 is a flow diagram of an exemplary method 800 for repositioning virtual objects. The user interfaces in FIGS. 9A-9D are used to illustrate the processes described below, including the processes in FIG. 10.

Figure 9A:
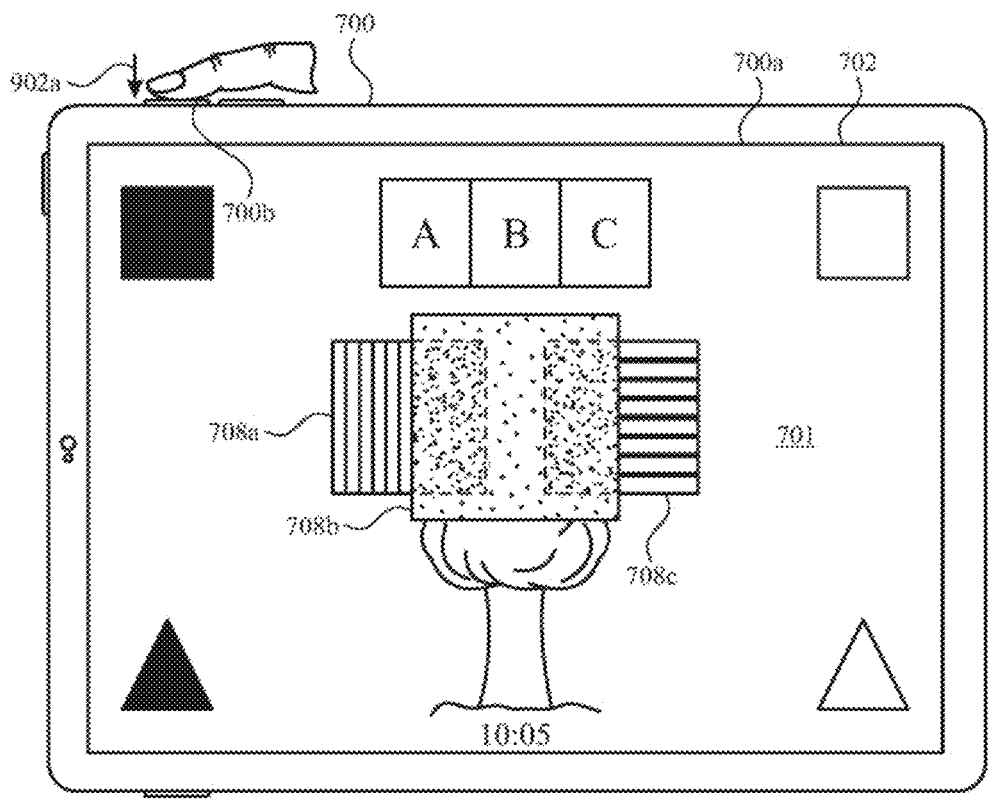
FIGS. 9A-9E illustrate example techniques for repositioning virtual objects, in accordance with some embodiments.

At FIG. 9A, device 700 is displaying, via display 700*a*, user interface 702, which includes various virtual objects that are displayed concurrently with representation of physical environment 701. User interface 702 includes center virtual objects 708a, 708b, and 708c, which are displayed at various depths (e.g., displayed in a manner such that the user of device 700 perceives that the objects are displayed at various depths). In some embodiments, the center virtual objects are arranged as a carousel of objects, with a sequential order (e.g., center virtual objects 708a-708c are part of an ordered sequence). In some embodiments, objects at different depths are displayed with different sizes, different levels of sharpness (e.g., with different levels of bokeh), different degrees of overlap, and/or different levels of blurring to convey the depth of the object (e.g., relative to other objects). In some embodiments, device 700 is an HMD that is capable of presenting different visual information to each eye of the user and the virtual objects are stereoscopic virtual objects with depth being conveyed by the differences in how the objects are presented to each eye of the user. At FIG. 9A, center virtual object 708b is displayed as overlaying center virtual objects 708a and 708c (e.g., center virtual object 708b is displayed at a depth that is closer to the perspective of the user than the depth at which center virtual objects 708a and 708c are displayed). For purposes of discussion and reference, at FIG. 9A, center virtual object 708b is perceived by the user as being displayed at a distance of 1 foot from the user while center virtual objects 708a and 708c are displayed at a distance of 2 feet. In addition to overlapping center virtual objects 708a and 708c, center virtual object 708b is also displayed at a larger size than center virtual objects 708a and 708c, because of the difference in displayed depths. At FIG. 9A, each of the center virtual objects have different content, as depicted by the fill pattern of each object (e.g., center virtual object 708a has vertical stripes, center virtual object 708a is stippled, and center virtual object 708a has horizontal stripes). In some embodiments, the difference in content is also a difference in a color (e.g., a background color or a foreground color); for example, center virtual objects 708a-c are yellow, blue, and red, respectively. In some embodiments, each center virtual object is associated with a different application or a different XR experience and the different content is based on the corresponding application or XR experience. At FIG. 9A, center virtual object 708b (in some embodiments, center virtual objects 708a and 708c, as well) is partially translucent (e.g., as indicated by the increased density of the stippling pattern of center virtual object 708b at the portions where it overlaps the other center virtual objects); however, center virtual object 708b is not transparent at FIG. 9A, so details of the underlying center virtual objects are not visible at the portions of overlap (e.g., dashed lines indicate the borders of center virtual objects 708a and 708c at the portions of overlap, but the exact contours of the those borders would not be visible). In some embodiments, where each center virtual object has a respective color, the area where center virtual object 708b overlaps center virtue object 708a can be displayed with a greater degree of color saturation (e.g., the area of overlap is a darker blue than the non-overlapping portion of center virtual object 708b), but the hue of the area of overlap is not a combination of blue and red (e.g., not a shade of purple) at the area of overlap, while the objects are displayed as seen in FIG. 9A. At FIG. 9A, device 700 detects input 902a, which is an actuation of button 700b that is processed by device 700 as a request to reposition center virtual objects 708a-c to bring center virtual object 708c to the fore. In some embodiments, input 902a is an air gesture, a touch on a touch-sensitive surface, or a verbal input.

Figure 9B:
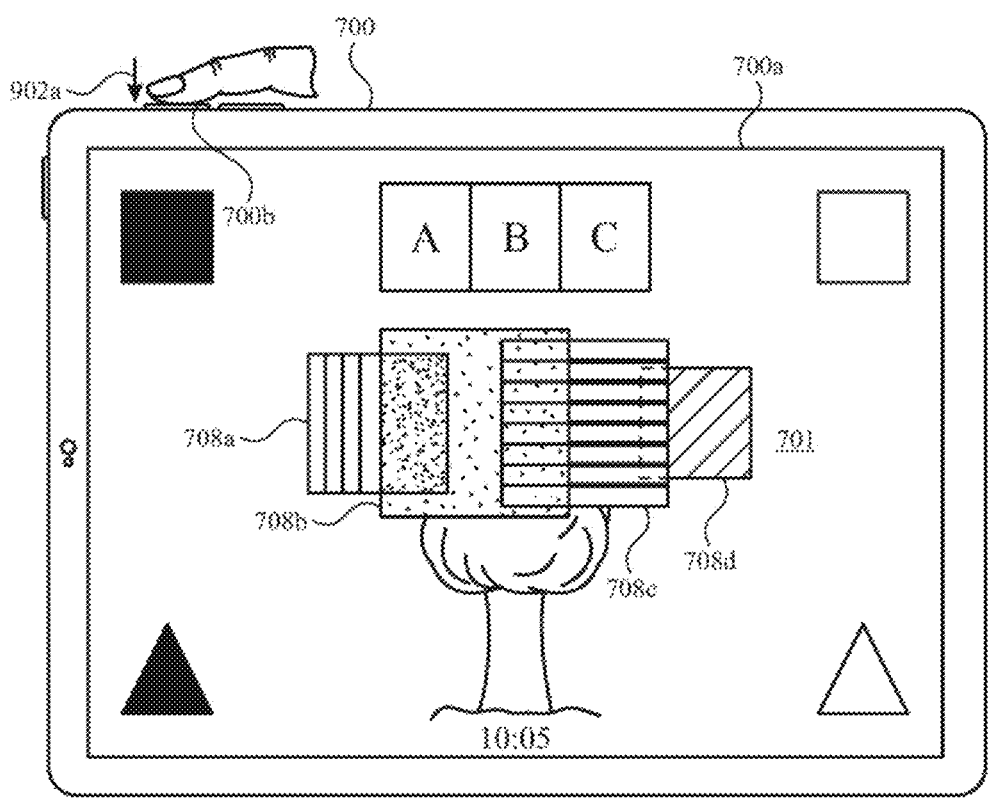

At FIG. 9B, in response to detecting input 902a, device initiates a process for repositioning center virtual objects 708a-c to bring center virtual object 708c to the fore. The process progresses across FIGS. 9B-9E. At FIG. 9B, the process includes each of center virtual objects shifting leftwards in the plane of the display, as can be seen by comparing their relative positions to tree 901a between FIG. 9A and FIG. 9B. At FIG. 9B, the process also includes center virtual objects 708a-c changing depth: center virtual objects 708a and 708b move further away from the perspective of the user (and consequently are displayed at smaller sizes as compared to FIG. 9A), while center virtual object 708c moves closer to the perspective of the user (and consequently is displayed at a larger size relative to how it was displayed in FIG. 9A). At FIG. 93, center virtual object 708a is now displayed at 2.25 feet, center virtual object 708b is displayed at 1.25 feet, center virtual object 708c is displayed at 1.75 feet from the perspective of the user. Device 700 also displays center virtual object 708d, which is displayed at a depth that is furthest away (e.g., at 2.75 feet) from the perspective of the user (of the plurality of objects), compared to the other center virtual objects. In some embodiments, the center virtual objects are arranged as a carousel of objects, with a sequential order (e.g., center virtual objects 708a-708d are part of an ordered sequence), with objects being displayed or ceasing to be displayed as they cross a threshold distance (e.g., 3 feet) from the perspective of the user, as the carousel rotates. At FIG. 93, the area where center virtual object 708b overlaps center virtual object 708a remains essentially unchanged (e.g., center virtual object 708b remains at the same level of semi-translucency in the area of overlap) because the relative distance between the objects remains at 1 foot, as was the case in FIG. 9A. In contrast, the area where center virtual object 708b overlaps center virtual object 708c has begun to change, as the relative distance between the two objects has now decreased to 0.5 feet. At FIG. 9B, the area where center virtual object 708b overlaps center virtual object 708c is now semi-transparent, as some details (e.g., the underlying shape content, and/or color) of center virtual object 708c is now visible through center virtual object 708b, which is indicated by part of the horizontal line pattern of center virtual object 708c being visible at the area of overlap. In FIG. 9B, the appearance of the overlap area is still primarily that of center virtual object 708b (e.g., a background color is a mostly blue shade of indigo).

Figure 9C:
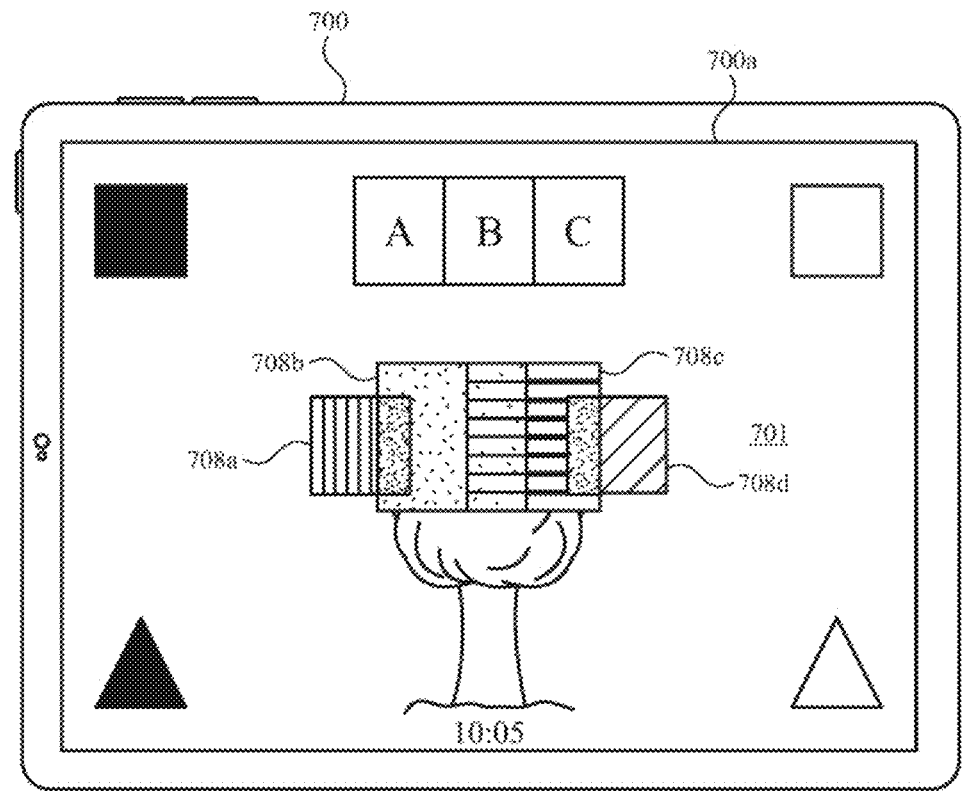

At FIG. 9C, the process for repositioning center virtual objects 708a-c to bring center virtual object 708c to the fore has progressed further, with all of the center virtual objects having shifted further left. Center virtual objects 708b and 708c are now both displayed at a depth of 1.5 feet from the perspective of the user and both objects are at the same distance from the center of display 700a. Center virtual object 708a is now further back at 2.5 feet from the perspective of the user, which is the same depth at which center virtual object 708d is now displayed. As with FIG. 9B, the area where center virtual object 708b overlaps center virtual object 708a remains essentially unchanged (e.g., center virtual object 708b remains at the same level of semi-translucency in the overlap area with center virtual object 708a) because the relative distance between the objects remains at 1 foot, as was the case in FIGS. 9A and 9B. In contrast, the appearance of the area of overlap between center virtual objects 708b and 708c is now a combination (in some embodiments, an equal combination)

of the visual characteristics (e.g., content and/or color) of both objects. For example, the color of the overlapping portions would be purple.

Figure 9D:
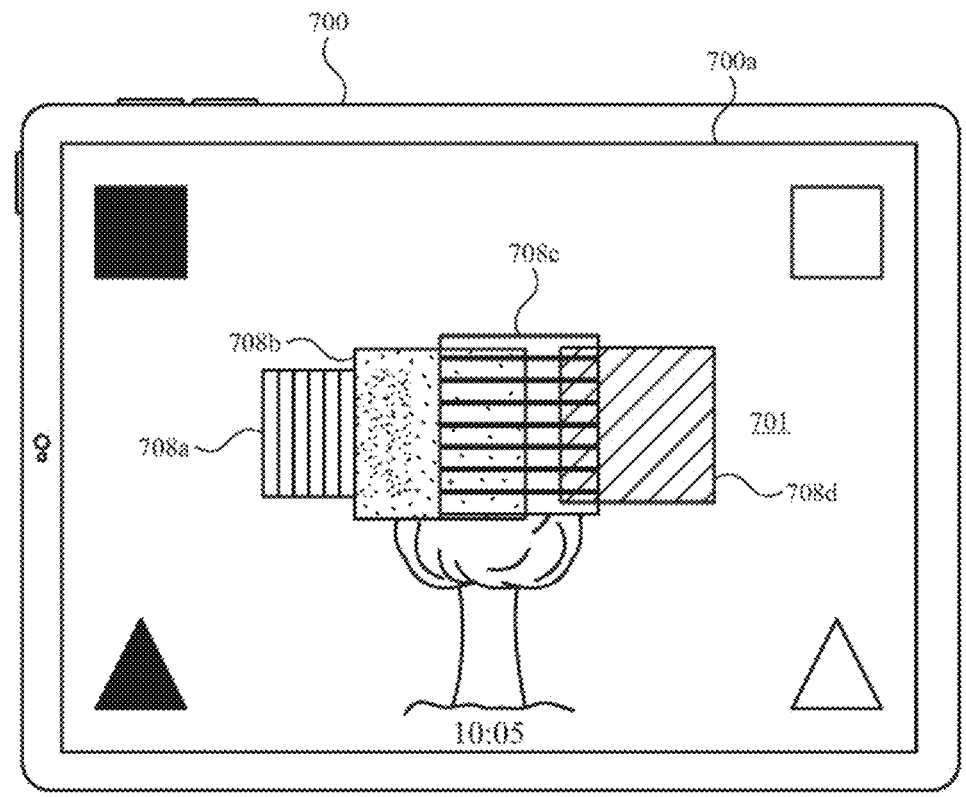

At FIG. 9D, the process for repositioning center virtual objects 708a-c to bring center virtual object 708c to the fore has progressed even further. Center virtual object 708b is now displayed at a distance of 1.75 feet (e.g., the distance at which center virtual object 708c was displayed at FIG. 9B) while center virtual object 708c is now displayed at 1.25 feet (e.g., the distance at which center virtual object 708b was displayed at FIG. 9B). Center virtual object 708c now overlays center virtual object 708b and the area of overlap is now predominately based on the appearance of center virtual object 708c, which is semi-transparent at the area of overlap (e.g., the color would be a mostly red shade of burgundy). Center virtual object 708a is now at 2.75 feet whereas center virtual object 708d is now at 2.25 feet.

Figure 9E:
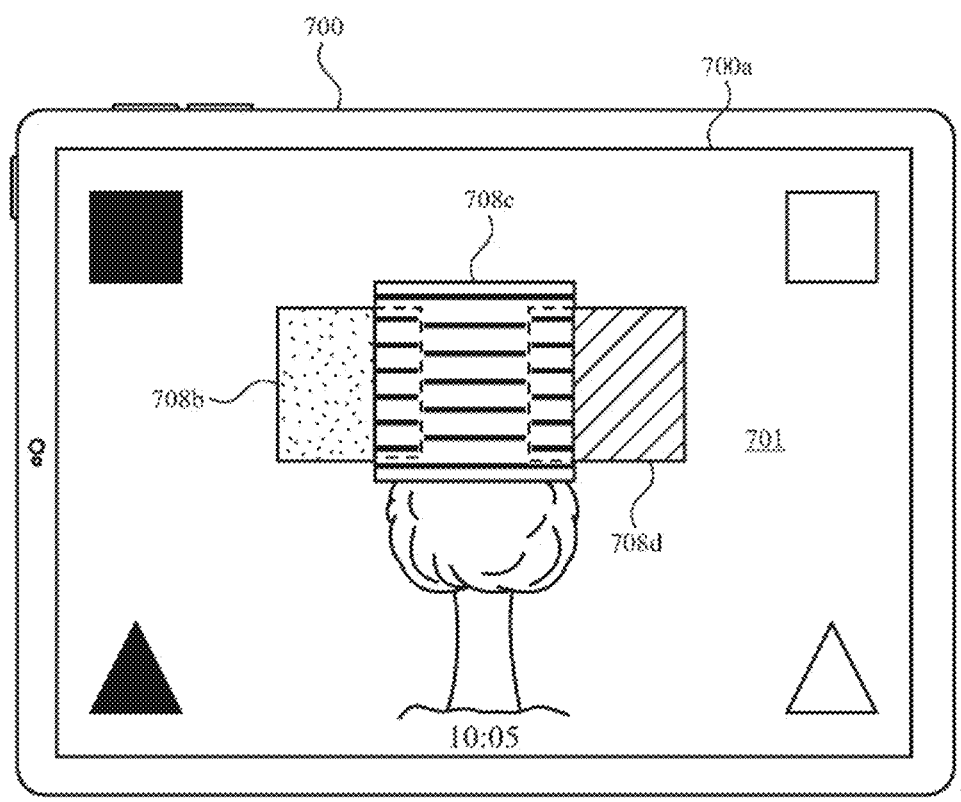

At FIG. 9E, the process for repositioning center virtual objects 708a-c to bring center virtual object 708c to the fore is now complete. Center virtual object 708c is now at the center of the display at a distance of 1 foot from the perspective of the user, with center virtual objects 708b and 708d both at a distance of 2 feet. Center virtual object 708a is no longer displayed, as it transitioned past the threshold distance of 3 feet. At the areas where center virtual object 708c overlap the other objects, center virtual object 708c is partially translucent (e.g., as indicated by the increased density of the horizontal line pattern of center virtual object 708c at the portions where it overlaps the other center virtual objects); however, center virtual object 708c is not transparent at FIG. 9E, so details of the underlying center virtual objects are not visible at the portions of overlap (e.g., dashed lines indicate the borders of center virtual objects 708b and 708d at the portions of overlap, but the exact contours of the those borders would not be visible). In some embodiments, where each center virtual object has a respective color, the area where center virtual object 708c overlaps center virtue object 708b can be displayed with a greater degree of color saturation (e.g., the area of overlap is a darker red than the non-overlapping portion of center virtual object 708c), but the hue of the area of overlap is not a combination of red and blue (e.g., not a shade of purple) at the area of overlap, while the objects are displayed as seen in FIG. 9E. In some embodiments, if device 700 detects another actuation of button 700b, device 700 would initiate a process to reposition the center virtual objects to bring center virtual object 708d to the fore. Conversely, if device 700 detects an actuation of button 700c, device 700 would initiate a process to reposition the center virtual objects to bring center virtual object 708b to the fore, again (e.g., a process that is the reverse of what is shown in FIGS. 9B-9E). Thus, FIGS. 9A-9E illustrate a process for repositioning virtual objects that includes progressively blending/combining the visual characteristics of objects as they shift in relative position and depth. In some embodiments, device 700 is an HMD that presents an XR experience to the user. In such embodiments, virtual objects can be presented to the user at different depths (e.g., via stereoscopic display techniques) and the techniques illustrated in FIGS. 9A-9E can be useful for providing feedback as to the relative depths of virtual objects, as they are being repositioned. In some embodiments when device 700 is an HMD, it can be convenient for the user to provide a user interface model that performs functions on a virtual object that is currently selected and/or in focus, which can be done by positioning the virtual object at certain position in the user interface. The techniques illustrated in FIGS. 9A-9E can be used to reposition objects and to provide visual feedback as to the repositioning, so that a target virtual object can be brought into focus.

Additional descriptions regarding FIGS. 9A-9E are provided below in reference to method 1000 described with respect to FIGS. 9A-9E.

FIG. 10 is a flow diagram of an exemplary method 1000 for repositioning virtual objects, in accordance with some embodiments. In some embodiments, method 1000 is performed at a computer system (e.g., computer system 101 in FIG. 1; a head mounted display; an optical head-mounted display; a personal computer, a smart phone; and/or a tablet computer) that is in communication with a display generation component (e.g., a display controller; a touch-sensitive display system; a passthrough display (e.g., integrated and/or connected), a 3D display, a transparent display, a projector, a heads-up display, and/or a head-mounted display) (e.g., display generation component 120 in FIGS. 1, 3, and 4) (e.g., a heads-up display, a display, a touchscreen, a projector, etc.). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

The computer system (e.g., 700) displays (1002), via the display generation component, a respective user interface (e.g., 702). In some embodiments, the respective user interface is a set of one or more virtual objects displayed in an extended reality environment. In some embodiments, at least one virtual object of the set of one or more virtual objects is a viewpoint-locked virtual object. Displaying the respective user interface includes displaying: a first user interface object (1004) (e.g., 708b), wherein at a least a first portion (e.g., portion overlaying 708c) of the first user interface object is at least partially translucent (e.g., allowing light (e.g., including the color of the light), but not exact details, from objects behind the object to at least partially pass and/or show through the object) and includes first content (e.g., graphical and/or textual content); and In some embodiments, the entirety of the first user interface object is transparent. In some embodiments, the first content extends into additional portion(s) of the first user interface object in addition to being in the first portion. Displaying the respective user interface also includes displaying: a second user interface object (1006) (e.g., 708c), wherein: at a least a first portion (e.g., portion overlaid by 708b) of the second user interface object includes second content, different from the first content; in some embodiments, the entirety of the second user interface object is transparent (in some embodiments, the second content extends into additional portion(s) of the second user interface object in addition to being in the first portion; in some embodiments, the second content is not visible, or fully visible, while the first user interface object remains in front of the second user interface object) and the first user interface object is displayed in front of the second user interface object (e.g., from the perspective of the user of the computer system; is closer along a z-axis that is perpendicular to the plane of the display generation component) such that the first portion of the first user interface object overlays (e.g., is displayed in front of) the first portion of the second user interface object (e.g., as seen in FIG. 9A).

The computer system, while displaying the first user interface object in front of the second user interface object, receives (1008) a request (e.g., 902a)(e.g., via one or more input devices in communication with the computer system)

(in some embodiments, the request is a gesture on a touch sensitive surface; an air gesture performed with a hand of the user of the computer system; actuation of a hardware button or key; and/or a voice command) to move the second user interface object in front of the first user interface object.

The computer system, in response to (1010) receiving the request to move the second user interface object in front of the first user interface object: initiates (1012) a process to move the second user interface object in front of the first user interface object (e.g., process of FIGS. 9B-9E), the process including modifying (e.g., blending) (e.g., before the second user interface object moves in front of the first user interface object) the visual appearance of the first portion of the first user interface object to include third content that is based on a first combination of the first content and the second content (e.g., as seen in FIGS. 9B-9C). In some embodiments, the combination is based on combining and/or compositing the first and second content to form the third content. In some embodiments, the third content includes a portion of the first content (e.g., without including the entirety of the first content) and a portion of the second content. In some embodiments, the process includes moving the second user interface object in front of the first user interface object, such that the first portion of the second user interface object overlays the first portion of the first user interface object. In some embodiments, the first portion of the first user interface object is displayed with the third content when the first user interface object and the second user interface object are displayed at the same depth (e.g., along the z-axis) such that neither object is in front of the other. Modifying the visual appearance of the first portion of the first user interface object to include third content that is based on a first combination of the first content and the second content provides improved visual feedback as to: the relative depths at which the two objects are displayed, the area of overlap between the two objects, the content of both objects at the area of overlap, and the current state of the process to move the second user interface object in front of the first user interface object.

In some embodiments, the first portion of the second user interface object is at least partially translucent (e.g., as discussed with reference to FIG. 9A) (e.g., at least some light and/or color of content that is behind and/or beneath the first portion can pass through (e.g., is visible through) the first portion, but details of shapes and/or content does not pass through). Having the first portion of the second user interface object as being at least partially translucent provides visual feedback as to visual characteristics of any object that is displayed behind the that portion.

In some embodiments, the first content includes a first background color (e.g., blue for 708b) (e.g., blue, green, or yellow). In some embodiments, the first content includes foreground content that is different than the background color. The second content includes a second background color (e.g., red for 708c), different from the first background color (e.g., red, orange, or brown); and the third content includes an intermediate background color (e.g., purple when the first background color is red and the second background color is blue) that is based on a combination of the first background color and the second background color (e.g., as discussed with reference to FIGS. 9B-9D). Providing the third content with an intermediate background color that is based on a combination of the first background color and the second background color provides improved visual feedback as to: the relative depths at which the two objects are displayed, the area of overlap between the two objects, and the current state of the process to move the second user interface object in front of the first user interface object.

In some embodiments, a second portion (e.g., portion of 708b that overlaps 708c) of the first user interface object (e.g., a portion that is the same or different from the first portion of the first user interface object) includes fourth content; a second portion (e.g., portion of 708c that overlaps 708b) of the second user interface object (e.g., a portion that is the same or different from the first portion of the second user interface object) includes fifth content; and the process to move the second user interface object in front of the first user interface object includes: modifying (e.g., as or after the second user interface object moves in front of the first user interface object) the visual appearance of the second portion of the second user interface object to include sixth content that is based on a combination (in some embodiments, the combination includes combining colors, patterns, and/or details (e.g., details of shape) of the fourth and fifth content) of the fourth content and the fifth content (e.g., as seen in FIG. 9D) (e.g., that is different from the first combination of the first content and the second content). In some embodiments, the majority of the combination of the fourth content and the fifth content is based on the fifth content. Modifying the visual appearance of the second portion of the second user interface object to include sixth content that is based on a combination of the fourth content and the fifth content provides improved visual feedback as to: the relative depths at which the two objects are displayed, the area of overlap between the two objects, the content of both objects at the area of overlap, and the current state of the process to move the second user interface object in front of the first user interface object.

In some embodiments, the second portion of the second user interface overlays (e.g., overlaps; is displayed in front of) the second portion of the first user interface object when the second portion of the second user interface object has the visual appearance that includes the sixth content (e.g., as seen in FIGS. 9C and 9D). In some embodiments, other portions of the second user interface object that do not overlay the first user interface object do not include the sixth content.

In some embodiments, while the first user interface object is displayed in front of the second user interface object: a third portion of the first user interface object that includes seventh content overlays a first portion of a third user interface object (e.g., 708a)(e.g., that is different from the first and second user interface objects) that includes eighth content, and the visual appearance of the third portion of the first user interface object is not based on (e.g., is not affected by or that is not the result of a combination of the seventh and eighth contents) the eighth content (e.g., as discussed at FIG. 9A). In some embodiments, the visual appearance of the third portion of the first user interface object is based only on the seventh content.

In some embodiments, the first combination of the first content and the second content includes a first percentage (e.g., a first degree or a first amount) of the first content in the first combination. In some embodiments, the computer system, after modifying the visual appearance of the first portion of the first user interface object to include third content that is based on the first combination of the first content and the second content (e.g., at FIG. 9B), modifies (e.g., further modifying and/or gradually modifying) the visual appearance of the first portion of the first user interface object to include ninth content that is based on a second combination of the first content and the second content, wherein the second combination of the first content and the second content includes a second percentage, different from the first percentage (e.g., a higher percentage and/or a lower percentage), of the first content in the second combination (e.g., as seen in FIG. 9C). In some embodiments, modifying the visual appearance of the first user interface object includes gradually shifting (e.g., decreasing or increasing) the degree of the first content in the combination. Modifying the visual appearance of the first portion of the first user interface object to include ninth content that is based on a second combination of the first content and the second content, wherein the second combination of the first content and the second content includes a second percentage, different from the first percentage, of the first content in the second combination provides improved visual feedback as to: the relative depths at which the two objects are displayed, the area of overlap between the two objects, the content of both objects at the area of overlap, and the current state of the process to move the second user interface object in front of the first user interface object.

In some embodiments, the process to move the second user interface object in front of the first user interface object includes: while changing a depth at which the first user interface object is displayed relative to a depth at which the second user interface object, moving (e.g., gradually moving at a predetermined rate) the first user interface object in a first non-depth direction (e.g., shifting left as seen in FIG. 9B) (e.g., horizontally, diagonally, and/or vertically within a primary plane of display); and while changing the depth at which the first user interface object is displayed relative to the depth at which the second user interface object, moving the second user interface object in a second non-depth direction (e.g., shifting left as seen in FIG. 9B) (e.g., that is the same or different from the first direction).

In some embodiments, the process to move the second user interface object in front of the first user interface object includes: while changing a depth at which the first user interface object is displayed relative to a depth at which the second user interface object, modifying (e.g., gradually modifying at a predetermined rate) a size (e.g., reducing or increasing the size) of the first user interface object (e.g., as seen in the change in size of 708b between FIGS. 9A and 9B); and while changing the depth at which the first user interface object is displayed relative to the depth at which the second user interface object, modifying a size of the second user interface object (e.g., as seen in the change in size of 708c between FIGS. 9A and 9B). In some embodiments, the modification in size of the first user interface object is the inverse (e.g., inversely proportional) to the modification in size of the second user interface object (e.g., the first user interface object is reduced in size while the second user interface object is increased in size). Modifying a size of the second user interface object provides improved visual feedback as to the current state of the process to move the second user interface object in front of the first user interface object.

In some embodiments, the first user interface object corresponds to a first extended reality experience (e.g., as discussed with reference to FIG. 9A) (e.g., an extended reality user interface generated by a first application (e.g., an extended reality media viewer application, an extended reality media capture application; or an extended reality conferencing application))(in some embodiments, an extended reality experience corresponding to FIGS. 11A-11I, FIGS. 13A-13K, method 1200, and/or method 1400); and the second user interface object corresponds to a second extended reality experience, different from the first extended reality experience (e.g., as discussed with reference to FIG. 9A).

In some embodiments, displaying the respective user interface includes displaying a representation of the physical environment (e.g., 701) (e.g., an optical or video pass-through representation); the first user interface object (e.g., 708b) (in some embodiments, the first user interface object is a viewpoint-locked virtual object) overlays (e.g., is displayed in front of and/or on top of) the representation of the physical environment; and the second user interface object (e.g., 708c) (in some embodiments, the second user interface object is a viewpoint-locked virtual object) overlays the representation of the physical environment.

In some embodiments, prior to initiating the process to move the second user interface object in front of the first user interface object, the first user interface object is displayed at a depth that is closer, from a viewpoint of a user of the computer system, to the user than a depth at which the second user interface object is displayed (e.g., as discussed with reference to FIG. 9A)(e.g., the first user interface object appears closer to the user than the second user interface object); and after completing the process to move the second user interface object in front of the first user interface object, the second user interface object is displayed at a depth that is closer, from the viewpoint of the user of the computer system, to the user than a depth at which the first user interface object is displayed (e.g., as discussed with reference to FIG. 9E). Changing the relative depths at which the first and second user interface objects are displayed before and after the completing the movement process provides improved visual feedback as to the process to move the second user interface object in front of the first user interface object.

In some embodiments, prior to initiating the process to move the second user interface object in front of the first user interface object, the second user interface object is displayed with a first amount of blurring (e.g., a zero or non-zero amount of blur); and in some embodiments, prior to initiating the process to move the second user interface object in front of the first user interface object, the first user interface object is displayed without blurring. After completing the process to move the second user interface object in front of the first user interface object, the first user interface object is displayed with a second amount of blurring that is greater than the first amount of blurring (e.g., as discussed with reference to FIGS. 9A and 9E). In some embodiments, after completing the process to move the second user interface object in front of the first user interface object, the second user interface object is displayed without any blurring, with the first amount of blurring, and/or with less than the second amount of blurring. Displaying the first user interface object with a greater amount of blurring as it moves back in a z-axis order provides improved visual feedback as to the relative positions of the first and second user interface objects within z-space.

In some embodiments, displaying the respective user interface includes displaying a plurality of user interface objects in a sequentially ordered arrangement (e.g., the order of 708a-708c); the first user interface object and second user interface object are part of the plurality of user interface objects; and prior to initiating the process to move the second user interface object in front of the first user interface object, the first user interface object is displayed at a depth that is closer, from a viewpoint of the user of the computer system, to the user than user interface objects (e.g., including the second user interface object) that are before or after the first user interface object in the sequentially ordered arrangement (e.g., as seen in FIG. 9A). In some embodiments, after completing the process to move the second user interface object in front of the first user interface object, the second user interface object is displayed at a depth that is closer to the user from a viewpoint of the user of the computer system than user interface objects that are before or after the first user interface object in the sequentially ordered arrangement. Displaying the first user interface object closer to foreground than elements before and after the first user interface object in the sequentially ordered arrangement provides improved visual feedback as the position of the first user interface object in the sequentially ordered arrangement.

In some embodiments, receiving the request to move the second user interface object in front of the first user interface object includes detecting activation (e.g., actuation (e.g., a press, a slide, or a rotation)) of a hardware input mechanism (e.g., 700b) (e.g., a button (e.g., an actuating mechanical button or a solid-state button that detects input pressure (in some embodiments, that provides haptic feedback to indicate detecting pressure/input)), a dial, a slider, or a knob) that is in communication with the computer system. Detecting a request that includes activation of a hardware mechanism provides the user with tactile feedback (e.g., via actuation of the mechanism and/or haptic feedback) that the input was properly received. Providing improved feedback that the input was received enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the request to move the second user interface object in front of the first user interface object includes detecting an air gesture (e.g., as discussed with reference to FIG. 7A and input 902a) (e.g., detecting via one or more input mechanisms (e.g., a camera, a hand-motion sensor) in communication with the computer system). Detecting a request that includes detecting an air gesture provides the user with an input modality that does not require manual contact with a sensor and/or input mechanism of the device, which reduces the risk that the user will fail to provide an input or fail to properly provide an input (e.g., via an error in locating the sensor/input mechanism, for example, while operating an HMD with an input mechanism that is not visible to the user). Reducing the risk of failed inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the request to move the second user interface object in front of the first user interface object includes detecting, via one or more gaze-tracking sensors that are in communication with the computer system, that the gaze of the user of the computer system is directed to a respective portion (e.g., a portion that corresponds to the second user interface object) (e.g., is directed in a direction that corresponds to the gaze of the user intersecting with the respective portion) (in some embodiments, is directed to the respective portion for at least a predetermined time period (e.g., 0.25 seconds, 0.5 seconds, or 1 second)) of the respective user interface (e.g., as discussed with reference to FIG. 7A and input 902a). Detecting a request that includes detecting the gaze of the user provides the user with an input modality that does not require manual contact with a sensor and/or input mechanism of the device, which reduces the risk that the user will fail to provide an input or fail to properly provide an input (e.g., via an error in locating the sensor/input mechanism for example, while operating an HMD with an input mechanism that is not visible to the user). Reducing the risk of failed inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 11A-11I illustrate examples of techniques for transitioning modes of a camera capture user interface. FIG. 12 is a flow diagram of an exemplary method 1200 for transitioning modes of a camera capture user interface. The user interfaces in FIGS. 11A-11H are used to illustrate the processes described below, including the processes in FIG. 12.

At FIG. 11A, user 1101 is using device 700, while the user is in a physical environment 1103. Subject 1105 and lamp 1107 are also situated in physical environment 1103. FIG. 11A includes schematic 1100 that depicts the relative positions of user 1101, subject 1105, and lamp 1107 within environment 1103. Device 700 includes display 700a, buttons 700b-d, sensors 306 (e.g., accelerometer(s) and/or gyroscopes for detecting the position and/or movement of device 700) and a plurality of cameras (e.g., as part of sensors 314), including two or more back facing cameras that are, in FIG. 11A, directed in the direction of subject 1105 and lamp 1107.

At FIG. 11A, device 700 displays user interface 1102 overlaid on representation 1104a of physical environment 1103. In some embodiments, user interface 1102 is displayed in response to selection of a center virtual object of FIG. 7A. Representation 1104a is based on image data captured by one or more of the plurality of cameras of device 700. In some embodiments, representation 1104a is an optical pass-through representation of the physical environment (e.g., one or more portions of device 700 are transparent and physical environment 1103 is visible through those portions). User interface 1102 is an interface of a camera application that can be used to capture media (e.g., photos, stereoscopic photos, videos, and/or stereoscopic videos). User interface 1102 includes several virtual objects (e.g., objects to aid a user in capturing media, to modify one or more settings of the application and/or the cameras, and/or to review captured media), including reticle 1106 (e.g., a framing virtual object to assist a user in framing content for capture), control virtual object 1108 (e.g., for modifying a camera preview mode), control virtual object 1110 (e.g., for modifying a camera capture mode (e.g., photo or video)), shutter button 1112 (e.g., for initiating a media capture process), and face detection indication 1114 (e.g., that indicates ones or more faces detected within representation 1104a). At FIG. 11A, reticle 1106 indicates a region of representation 1104a that would be included in captured media, but does not otherwise modify the appearance of the region within reticle 1106, as compared to the remainder of representation 1104a. In some embodiments, user interface 1102 is an XR interface and presents an XR experience to user 1101. In such embodiments, one or more virtual objects of user interface 1102 can be environment-locked virtual objects (e.g., face detection indication 1114) or viewpoint-locked virtual objects (e.g., shutter button 1112); additionally, one or more virtual objects of user interface 1102 can be displayed at different depths relative to the perspective of the user and to elements of physical environment 1103, as depicted in representation 1104a.

At FIG. 11A, user 1101 is interested in capturing media that includes subject 1105, but user 1101 wishes to have subject 1105 more towards the middle of the resulting captured media. At FIG. 11A, device 700 detects that device 700 is being moved to the left, as indicated by indication 1109a.

At FIG. 11B, in response to detecting that device 700 has being moved to the left, representation 1104a has been updated, with subject 1105 positioned more towards the center of reticle 1106. Schematic 1100 reflects the updated relative positions of user 1101 and device 700 to subject 1105 and lamp 1107. Face detection indication 1114 has also shifted, as it continually tracks the position of detected face(s). At FIG. 11B, device 700 detects input 1111a (e.g., actuation of button 700b), while device 700 detects that the gaze of a user of device 700 is directed to shutter button 1112, as indicated by gaze indication 1113a. Device 700, alternatively, detects input 1111a, while device 700 detects that the gaze of a user of device 700 is directed to control virtual object 1108, as indicated by gaze indication 1113b. In some embodiments, input 1111a is an air gesture, a touch on a touch-sensitive surface, or a verbal input. In some embodiments, detecting that the user's gaze is directed to a virtual object includes determining that the user's gaze has dwelled on the virtual object for a predetermined period of time (e.g., 0.1 seconds, 0.25 seconds, 0.5 seconds, or 1 second).

At FIG. 11C, in response to detecting input 1111a while device 700 detects that the gaze of a user of device 700 is directed to shutter button 1112, device 700 initiates a process for capturing media using the plurality of cameras of device 700. The process includes modifying the appearance of reticle 1106 (e.g., by bolding reticle 1106), to provide feedback to user 1101 that media is being captured.

At FIG. 11D, which is after FIG. 11C in time, the process for capturing media that was initiated by detecting input 1111a has now been completed. Reticle 1106 appears as it did in FIG. 11B and user interface 1102 now includes preview virtual object 1116a, which is a representation of the media item (e.g., a photo) that was captured during the process initiated by input 1111a. The media item that corresponds to preview virtual object 1116 has a field-of-view of physical environment 1103 that is different than what is included within reticle 1106 and that is different than the field-of-view of physical environment 1103 that is presented in representation 1104a, as a whole. In some embodiments, the media item that corresponds to preview virtual object 1116 has a field-of-view that encompasses more of physical environment 1103 than is demarked by reticle 1106 (e.g., reticle 1106 indicates a general area that will be captured); for example, in FIG. 11D, preview virtual object 1116 includes the entirety of lamp 1107, while only a portion of lamp 1107 is within reticle 1116. In some embodiments, the media item that corresponds to preview virtual object 1116 has a field-of-view that encompasses less of physical environment 1103 than is demarked by reticle 1106. Under either embodiment, preview virtual object 1116 provides a user of device 700 with an indication of precisely what content was captured, which the user can review to determine if the captured content is acceptable and, if it is not, to delete the media.

At FIG. 11E, in response to detecting input 1111a while device 700 detects that the gaze of a user of device 700 is directed to control virtual object 1108, as indicated by gaze indication 1113b as shown in FIG. 11B, device 700 modifies the appearance of control virtual object 1108 to indicate that a respective camera preview display mode is now active. While in the respective camera preview display mode, device 700 displays representation 1104b, which is a picture-in-picture ("PiP") representation of physical environment 1103 that is overlaid on a portion of representation 1104a. In some embodiments, selecting control virtual object 1108 while device 700 is in the respective camera preview display mode would revert to camera preview display mode shown in FIGS. 11-11D. In some embodiments, device 700 automatically transitions back to the mode shown in FIGS. 11-11D, after a predetermined period of time has elapsed. In some embodiments, representation 1104a presents image data from a first set of cameras of the plurality of cameras of device 700 and representation 1104b presents image data from a different, second set of cameras of the plurality of cameras of device 700. In some embodiments, the second set of cameras is the set of cameras that is used when capturing media (e.g., in response to input corresponding to shutter button 1112). In some embodiments, representation 1104b includes a field-of-view of physical environment 1103 that is different than what is included within reticle 1106 and that is different than the field-of-view of physical environment 1103 that is presented in representation 1104a, as a whole. In some embodiments in which representation 1104a is an optical passthrough representation of physical environment 1103, representation 1104b is a virtual object (e.g., a viewpoint-locked virtual object) that is overlaid on a portion of optical passthrough representation 1104a; in some embodiments, representation 1104b is semi-translucent or semi-transparent and colors and/or details of the underlying optical passthrough representation can be perceived through representation 1104b. Representation 1104b includes expand control 1104a1. At FIG. 11E, device 700 detects that device 700 is being moved back (e.g., further from subject 1105), as indicated by indication 1109b.

At FIG. 11F, in response to detecting that device 700 has been moved back, representation 1104a has been updated, with subject 1105 now appearing smaller than compared to FIG. 11E. Face detection indication 1114 is now smaller, as the size of the face of subject 1105 is now smaller and because face detection indication 1114 is a stereoscopic virtual object that is displayed at the same depth at which the detected face is displayed. Schematic 1100 reflects the updated relative positions of user 1101 and device 700 to subject 1105 and lamp 1107. At FIG. 11F, device 700 detects that the gaze of a user of device 700 is directed to expand control 1104a1 of representation 1104b, as indicated by gaze indication 1113c.

At FIG. 11G, in response to detecting that the gaze of a user of device 700 is directed to expand control 1104a1 of representation 1104b, device 700 expands representation 1104b to occupy the area demarked by reticle 1106. In some embodiments, device 700 ceases to display reticle 1106 when representation 1104b is expanded. In some embodiments, representation 1104b, when expanded, is smaller or larger than the area demarked by reticle 1106 and/or has a geometry that is different than that of the area demarked by reticle 1106. As seen in FIG. 11G, expanded representation 1104b is semi-translucent or semi-transparent and colors and/or details of the underlying optical passthrough representation can be perceived through representation 1104b; for example, subject 1105 of representation 1104*a* is still visible under expanded representation 1104*b*, though with less details of color and/or shape than in FIG. 11F, prior to expanding representation 1104*b*; the same is true for lamp 1107. At FIG. 11G, the appearance of subject 1105 in enlarged representation 1104*b* (marked as 1105*a*) is sharper and more pronounced than the appearance of subject 1105 in representation 1104*a*, and the same is true for lamp 1107 (marked as 1107*a* in enlarged representation 1104*b*). Enlarged representation 1104*b* includes collapse control virtual object 1104*b*2 that, when selected (e.g., via gaze) causes representation 1104*b* to return to the unenlarged size. In some embodiments, enlarged representation 1104*b* provides a user with a representation from the field-of-view of the second set of cameras that will be used when capturing media (e.g., in response to input corresponding to shutter button 1112). In some embodiments, device 700 automatically redisplays representation 1104*b* in the unenlarged state, after the enlarged representation has been displayed for a period of time. At FIG. 11G, device 700 detects input 1111*b* (e.g., actuation of button 700*b*), while device 700 detects that the gaze of a user of device 700 is directed to shutter button 1112, as indicated by gaze indication 1113*d*. In some embodiments, input 1111*a* is an air gesture, a touch on a touch-sensitive surface, or a verbal input.

At FIG. 11H, in response to detecting input 1111*b* while device 700 detects that the gaze of a user of device 700 is directed to shutter button 1112, device 700 initiates a second process for capturing media using the plurality of cameras of device 700. The process includes modifying the area demarked by reticle 1106 by displaying virtual object 1118 that whites out the area and ceasing, temporarily, to display enlarged representation 1104*b*. As seen in FIG. 11H, virtual object 1118 is semi-translucent or semi-transparent and colors and/or details of the underlying optical passthrough representation can be perceived through representation 1104*b* (e.g., a faded representation of subject 1105 is visible in FIG. 11H).

At FIG. 11I, which is after FIG. 11H in time, the process for capturing media that was initiated by detecting input 1111*b* has now been completed. Representation 1104*a*, enlarged representation 1104*b*, and reticle 1106 appear as they did in FIG. 11G. Device 700 has ceased to display virtual object 1118 and now displays preview virtual object 1116*b*, which is a representation of the media item (e.g., a photo) that was captured during the second process (e.g., initiated by input 1111*b*). In some embodiments, when media is captured using the same second set of cameras that are used to present enlarged representation 1104*b*, preview virtual object 1116*b* includes a representation of the same field-of-view of physical environment 1103 that was represented by enlarged representation 1104*b*, when the media was captured. Thus, the techniques depicted in FIGS. 11A-11I provide a user with multiple camera preview modes to assist the user with composing and capturing media items. In some embodiments in which device 700 is an HMD, especially an HMD with optical passthrough (e.g., via one or more transparent portions of device 700), the techniques depicted in FIGS. 11A-11I provide the user with an option to compose and capture media with a single representation of the physical environment (e.g., 1104*a* as per FIGS. 11B-D) or two representations of the physical environment (e.g., 104*b* as per FIGS. 11E-I), with one of the representations (e.g., 1104*b*) being from the set of cameras that will be used for media capture. In some embodiments, the selected camera preview mode is persistent as between session. For example, if the application generating user interface 1102 is closed or suspended while representation 1104*b* is displayed, representation 1104*b* would be redisplayed on subsequent redisplay of user interface 1102.

Additional descriptions regarding FIGS. 11A-11I are provided below in reference to method 1200 described with respect to FIGS. 11A-11I.

FIG. 12 is a flow diagram of an exemplary method 1200 for transitioning modes of a camera capture user interface, in accordance with some embodiments. In some embodiments, method 1200 is performed at a computer system (e.g., computer system 101 in FIG. 1; a head mounted display; an optical head-mounted display; a personal computer; a smart phone; and/or a tablet computer) that is in communication a display generation component (e.g., display generation component 120; a display controller; a touch-sensitive display system; a passthrough display (e.g., integrated and/or connected), a 3D display, a transparent display, a projector, a heads-up display, and/or a head-mounted display) and one or more cameras. In some embodiments, the one or more cameras are a plurality of cameras with different perspectives (e.g., with partially overlapping fields-of-view) capable of capturing stereographic media (e.g., photos and/or videos). In some embodiments, method 1200 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system (e.g., 700) displays (1202), via the display generation component (e.g., 700*a*) and in a mixed reality environment (e.g., 1102 and 1104*a*, combined), a camera capture user interface (e.g., 1102) that is overlaid over a portion of a physical environment (e.g., 1103) (e.g., visible through a transparent portion of the computer system and/or visible as a pass-through representation generated by the computer system) that is visible to a user of the computer system (e.g., 101)(e.g., when operating the computer system), wherein: the camera capture user interface is in a first mode (e.g., as in FIGS. 11A-11D) (a display mode; a camera capture user interface configuration and/or layout mode); the camera capture user interface includes, while in the first mode, a set of one or more framing virtual objects (e.g., 1106) (e.g., hollow geometric shape (e.g., a hollow rectangle); a plurality of unconnected corners that define a rectangular area) that are viewpoint-locked and that indicate a first sub-portion of the physical environment that will be captured by the one or more cameras upon receiving a first media capture request (e.g., input 1111*a*) (e.g., a request to capture a still image and/or video while in the first mode); in some embodiments, the captured media includes at least the sub-portion of the physical environment (e.g., the first sub-portion and a second sub-portion are captured). In some embodiments, the set of one or more framing virtual objects does not block a substantial amount of the first sub-portion (e.g., a majority of the first sub-portion (e.g., 80%, 85%, 90%, or 95%) is not overlaid by and/or not obscured by the set of one or more framing virtual objects).

The computer system, while displaying the camera capture user interface in the first mode, receives (1204) a request (e.g., 1113*b*) (e.g., via one or more input devices in communication with the computer system) (in some embodiments, the request is a gesture on a touch sensitive surface; an air gesture performed with a hand of the user of the computer system; actuation of a hardware button or key;

a gaze-based input; and/or a voice command) (in some embodiments, the request is a plurality of inputs (e.g., a first input followed by a second input)) to transition the camera capture user interface to a second mode (e.g., as in FIGS. 11G-11I), different from the first mode.

The computer system, in response to receiving the request to transition the camera capture user interface to the second mode, displays (1206) the camera capture user interface in the second mode (e.g., FIG. 11G). In some embodiments, the camera capture user interface in the second mode does not include the set of one or more framing elements. The camera capture user interface includes, in the second mode, a first representation of a field-of-view (e.g., 1104*b*) (e.g., a portion of or the entirety of the field-of-view) of at least a first camera of the one or more cameras; and in some embodiments, the first representation is a representation of an area where the fields-of-view of multiple cameras overlap. In some embodiments, the first representation is a live camera feed. The first representation is overlaid (e.g., displayed on top of) over a second sub-portion (in some embodiments, the first and second sub-portions are the same) of the physical environment (e.g., portion inside 1106) that will be captured by the one or more cameras upon receiving a second media capture request (e.g., 1111*b*) (e.g., a request to capture a still image and/or video while in the second mode). In some embodiments, the first representation is translucent and/or semi-transparent such that aspects of the sub-portion of the physical environment are visible through the first representation. In some embodiments, the captured media includes at least the second sub-portion of the physical environment (e.g., the second sub-portion and another sub-portion are captured). In some embodiments, the first representation is viewpoint-locked. Displaying a respective user interface that can operate in two different modes that provide different camera capture composition visual aids that indicate different sub-portions of the physical environment provides the user with multiple ways to compose a media capture event. Doing so enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, doing so reduces the risk that a transient media capture opportunity (e.g., an opportunity to capture a transient event/composition) will be mis-captured.

In some embodiments, the computer system, while displaying the camera capture user interface in the first mode, receives the first media capture request (e.g., 1111*a*). The computer system, in response to receiving the first media capture request, captures, via the one or more cameras, first media (e.g., still and/or video media; spatial/stereoscopic media; or two-dimensional or three-dimensional media) that includes content corresponding to at least the first sub-portion of the physical environment (e.g., media corresponding to 1116*a*).

In some embodiments, the first media includes content corresponding to at least a third sub-portion of the physical environment that corresponds to a region of the physical environment that is outside of the one or more framing virtual objects (e.g., as discussed with reference to 1116*a*) (e.g., the set of one or more framing virtual objects did not indicate (e.g., the set of one or more framing virtual objects delineated an area of the physical environment that did not include the third sub-portion (e.g., the third sub-portion was outside the set of one or more framing virtual objects)) that the third sub-portion of the physical environment would be captured by the one or more cameras upon receiving the first media request, or the set of one or more framing virtual objects indicated that the third sub-portion of the physical environment would be captured based on the proximity of the third-sub portion of the physical environment to the one or more framing elements). Capturing an additional third sub-portion of the physical environment outside of the set of one or more framing elements reduces the risk that content that was intended for capture was not captured and/or mis-captured due to errors in operating the computer system and/or due to unanticipated movement of the computer system and/or the composition or subject. Doing so enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, doing so reduces the risk that a transient media capture opportunity (e.g., an opportunity to capture a transient event/composition) will be mis-captured.

In some embodiments, the computer system, while displaying the camera capture user interface in the second mode, receiving the second media capture request (e.g., 1111*b*). The computer system, in response to receiving the second media capture request, capturing, via the one or more cameras, second media (e.g., still and/or video media; spatial/stereoscopic media; or two-dimensional or three-dimensional media) that includes content corresponding to at least the second sub-portion of the physical environment (e.g., media corresponding to 1116*b*).

In some embodiments, the second media does not include content corresponding to any sub-portions of the physical environment that were not represented in the first representation (e.g., as discussed with reference to 1116*b*)(e.g., the first representation is a true indication/preview of the content that will be included in media captured while in the second mode). Providing a first representation that is a true indication/preview of the content that will be included in media captured while in the second mode provides the user with a visual composition aid that accurately reflects the content that will be captured, which assists the user in framing a desired capture event. Doing so enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, doing so reduces the risk that a transient media capture opportunity (e.g., an opportunity to capture a transient event/composition) will be mis-captured.

In some embodiments, the computer system, while displaying the first representation and in accordance with a determination that a first set of one or more criteria are met, wherein the first set of one or more criteria includes a criterion that is met when the first representation has been displayed for a first predetermined period of time (in some embodiments, the first set of one or more criteria includes a criterion that is met when a capture request has not been received during the first predetermined period of time), ceases to display the first representation (e.g., as discussed with reference to FIG. 11E) (in some embodiments, and transitioning the camera capture user interface to the first mode). Ceasing to display the first representation when the first set of one or more criteria are met performs the operation when a set of conditions has been met without requiring further user input. Doing so also reduces power consumption by reducing a displayed element.

In some embodiments, the computer system, while displaying the first representation and in accordance with a determination that a second set of one or more criteria are met, wherein the second set of one or more criteria includes a criterion that is met when the first representation has been displayed for a second predetermined period of time (in some embodiments, the second set of one or more criteria includes a criterion that is met when a capture request has not been received during the second predetermined period of time), reduces a size of the first representation from a first size to a second size that is smaller than the first size (e.g., as discussed with reference to FIG. 11G). In some embodiments, reducing the size includes displaying the reduced size first representation at a predetermined location (e.g., within the viewpoint of a user of the computer system and/or relative to one or more other elements of the camera capture user interface). Reducing the size of the first representation when the second set of one or more criteria are met performs the operation when a set of conditions has been met without requiring further user input. Doing so also reduces power consumption by reducing a displayed sized of an element.

In some embodiments, the computer system, while displaying the first representation at the second size, receives a request (e.g., a gaze-based request, actuation of hardware input mechanism while the first representation is in focus, a touch input, and/or a voice command) to expand the size of the first representation; and in response to the request to expand the size of the first representation, expanding the size of the first representation from the second size to a third size that is larger than the second size (e.g., as seen in FIGS. 11F-11G) (in some embodiments, the third size is the first size; in some embodiments, the third size is a predetermined size).

In some embodiments, while displaying the first representation at the second size, the camera capture user interface includes a first selectable virtual object (e.g., 11104b1) (e.g., an expand affordance that is displayed on or adjacent to the first representation); and the request to expand the size of the first representation includes an input (e.g., 1113c) (e.g., a gesture on a touch sensitive surface; an air gesture performed with a hand of the user of the computer system; actuation of a hardware button or key; a gaze-based input; and/or a voice command) corresponding to the first selectable virtual object.

In some embodiments, the computer system, while displaying the first representation at the third size, modifies a visual appearance of at least the second sub-portion of the physical environment (e.g., as seen in FIG. 11G) (e.g., obscuring, dimming, applying a mask over the portion, and/or applying a tinting layer) (in some embodiments, at least some visual details of the second sub-portion remain visible). In some embodiments, the second sub-portion corresponds to the portion of the camera capture user interface at which the first representation is displayed; in some embodiments, the second sub-portion includes the first sub-portion or overlaps the first sub-portion. Modifying a visual appearance of at least the second sub-portion of the physical environment when the first representation is enlarged performs an operation when a set of conditions has been met without requiring further user input. Doing so also improves the visibility of the first representation by reducing potentially interference from visual elements (e.g., bright light) of the physical environment.

In some embodiments, the computer system, while displaying the set of one or more framing virtual objects, receives a third media capture request (e.g., a gesture on a touch sensitive surface; an air gesture performed with a hand of the user of the computer system; actuation of a hardware button or key; a gaze-based input; and/or a voice command). The computer system, in response to receiving the third media capture request: captures, via the one or more cameras, third media (e.g., still and/or video media; spatial/stereoscopic media; or two-dimensional or three-dimensional media); and displays an animation that includes modifying the visual appearance of at least a portion of the set of one or more framing virtual objects (e.g., as seen in FIGS. 11C and 11H)(e.g., an animation that includes blurring a region that includes and/or is adjacent to the set of one or more framing virtual objects; or an animation of the set of one or more framing virtual objects changing in size). Displaying an animation that includes modifying the visual appearance of at least a portion of the set of one or more framing virtual objects upon capture provides improved visual feedback as to the capture event.

In some embodiments, the first representation includes a representation of the first sub-portion of the physical environment and a fourth sub-portion of the physical environment; and the set of one or more framing virtual objects did not indicate (e.g., the set of one or more framing virtual objects delineated an area of the physical environment that did not include the fourth sub-portion (e.g., the third sub-portion was outside the set of one or more framing virtual objects)) that the fourth sub-portion of the physical environment would be captured by the one or more cameras upon receiving the first media request (e.g., the first representation includes one or more portions of the physical environment that are not indicated by the set of one or more framing virtual objects). In some embodiments, the field-of-view represented in the first representation is wider than the field-of-view (e.g., of the one or more cameras) that is indicated by the set of one or more framing virtual objects. Including an additional fourth sub-portion of the physical environment outside of the set of one or more framing elements in the first representation provides the user with different composition aids that encompass different portions of the physical environment enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, doing so reduces the risk that a transient media capture opportunity (e.g., an opportunity to capture a transient event/composition) will be mis-captured.

In some embodiments, displaying the camera capture user interface (e.g., while in the first mode or the second mode) includes: in accordance with a determination that a set of one or more tracking criteria are met, wherein the set of one or more tracking criteria includes a criterion that is met when a determination is made that the portion of the physical environment includes an object of a first type (e.g., a face, a hand, and/or a person), displaying a set of one or more tracking elements (e.g., 1114), wherein: set of one or more tracking elements are displayed at a location in the camera capture user interface that is based on the location of the object of the first type in the physical environment (e.g., as seen in FIGS. 11A and 11F); and the location in camera capture user interface (e.g., location in the z-axis, x-axis, and/or y-axis) at which the set of one or more tracking elements are displayed shifts as the location of the object of the first type in the physical environment shifts (e.g., as seen in FIGS. 11A, 11B, and 11F). In some embodiments, the displayed size of the set of one or more tracking elements is based on the detected size of the object of the first type (e.g., such that the size of the set of one or more tracking elements changes as the size of the object of the first type changes (e.g., due to movement of the object closer to or further away from the computer system)). Displaying the set of one or more tracking elements when the set of one or more tracking criteria are met performs an operation when a set of conditions has been met without requiring further user input. Doing so also provides improved visual feedback as to objects detected in the physical environment and aids the user in composing media capture events that include the objects of the first type.

In some embodiments, the set of one or more tracking elements is a set of one or more environment-locked virtual objects that are locked to (e.g., the location at which the set of one or more tracking elements are displayed shifts as the object to which they are locked shifts (in some embodiments, the portion of the physical environment is represented with stereoscopic depth and the set of one or more tracking elements are displayed as shifting with respect to distance from the user (e.g., shifts in z-space) within the viewpoint of the user and/or within the physical environment), as the object to which they are locked shift in distance with respect to the user) the object of the first type (e.g., face of a subject within the viewpoint of the user). Displaying the set of one or more tracking elements as environment-locked objects provides improved visual feedback as to the position of the object of the first type and performs an operation (e.g., moving the displayed position of the tracking elements as the objects shifts position) when a set of conditions has been met without requiring further user input.

In some embodiments, the first representation is a live feed (e.g., a representation that is continuously updated based on the field-of-view of the first camera; an instantaneously/contemporaneously live or a delayed live feed) of the field-of-view of at least the first camera of the one or more cameras (e.g., FIGS. 11A, 11B, and 11F).

In some embodiments, the computer system, while the first representation is displayed at a fourth size, receives a request to modify a size of the first representation. The computer system, in response to the request to modify the size of the first representation: in accordance with a determination that the request to modify the size of the first representation is a request to expand the size of the first representation (in some embodiments, and in accordance with a determination that the fourth size is the sixth size (e.g., the first representation is currently at a reduced size)), expands the size of the first representation from the fourth size to a fifth size that is larger than the fourth size (e.g., as seen in FIGS. 11F-11G); and in accordance with a determination that the request to modify the size of the first representation is a request to reduce the size of the first representation (in some embodiments, and in accordance with a determination that the fourth size is the fifth size (e.g., the first representation is currently at an enlarged size)), reduces the size of the first representation from the fourth size to a sixth size that is smaller than the fourth size (e.g., as discussed with reference to 1104b2).

In some embodiments, the computer system, while displaying the first representation (e.g., while in the second mode), receiving a fourth media capture request (e.g., a gesture on a touch sensitive surface; an air gesture performed with a hand of the user of the computer system; actuation of a hardware button or key; a gaze-based input; and/or a voice command); and in response to receiving the fourth media capture request: captures, via the one or more cameras, third media (e.g., still and/or video media; spatial/stereoscopic media; or two-dimensional or three-dimensional media); and displays an animation that includes modifying the visual appearance of at least a portion of the first representation (e.g., as seen in FIG. 11H and as discussed with reference to 1118)(e.g., an animation that includes brightening (e.g., whiting out) a region that includes and/or is adjacent to the first representation). Displaying an animation that includes modifying the visual appearance of at least a portion of the first representation upon capture provides improved visual feedback as to the capture event.

In some embodiments, the computer system, while displaying the first representation (e.g., while in the second mode), modifying a visual appearance of at least the second sub-portion of the physical environment (e.g., as seen in FIG. 11G) (e.g., obscuring, dimming, applying a mask over the portion, and/or applying a tinting layer over the portion) (in some embodiments, at least some visual details of the second sub-portion remain visible). In some embodiments, the second sub-portion corresponds to the portion of the camera capture user interface at which the first representation is displayed; in some embodiments, the second sub-portion includes the first sub-portion or overlaps the first sub-portion. Modifying a visual appearance of at least the second sub-portion of the physical environment performs an operation when a set of conditions has been met without requiring further user input. Doing so also improves the visibility of the first representation by reducing potentially interference from visual elements (e.g., bright light) of the physical environment.

In some embodiments, the first media capture request is a request to capture stereoscopic media; and the second media capture request is a request to capture stereoscopic media. In some embodiments, spatial media includes spatial visual media (also referred to as stereoscopic media) and/or spatial audio. In some embodiments, a spatial capture is a capture of spatial media. In some embodiments, spatial visual media is media (e.g., a still spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos.

In some embodiments, displaying the camera capture user interface includes displaying a first instance of the camera capture user interface. In some embodiments, the computer system, after ceasing to display the first instance of the camera capture user interface (e.g., after closing a capture application that generates the camera capture user interface), receives a request to display a second instance of the camera capture user interface (e.g., a request to launch the capture application). The computer system, in response to receiving the request to display a second instance of the camera capture user interface, displaying, via the display generation component, the second instance of the camera capture user interface, wherein displaying the second instance of the camera capture user interface includes: in accordance with a determination that a preceding (e.g., immediately preceding) instance of the camera capture user interface (e.g., the first instance of the camera capture user interface) was in the first mode when the preceding instance of the camera capture user interface ceased to be displayed, displaying the second instance of the camera capture user interface in the first mode; and in accordance with a determination that the preceding instance of the camera capture user interface was in the second mode when the preceding instance of the camera capture user interface ceased to be displayed, displaying the second instance of the camera capture user interface in the second mode (e.g., as discussed with reference to FIG. 11I). In some embodiments, the computer system the mode state of the camera capture user interface is persistent between sessions of displaying the interface. Having the mode of the respective user interface being persistent reducing the number of inputs needed to configure the respective user interface to a likely preferred mode of the user and also an operation (e.g., configuring the respective user interface to the previously used mode) when a set of conditions has been met without requiring further user input.

FIGS. 13A-13K illustrate examples of techniques for interacting with a graphical user interface using gaze. FIG. 14 is a flow diagram of an exemplary method 1400 for interacting with a graphical user interface using gaze. The user interfaces in FIGS. 13A-13K are used to illustrate the processes described below, including the processes in FIG. 14.

Figure 13A:
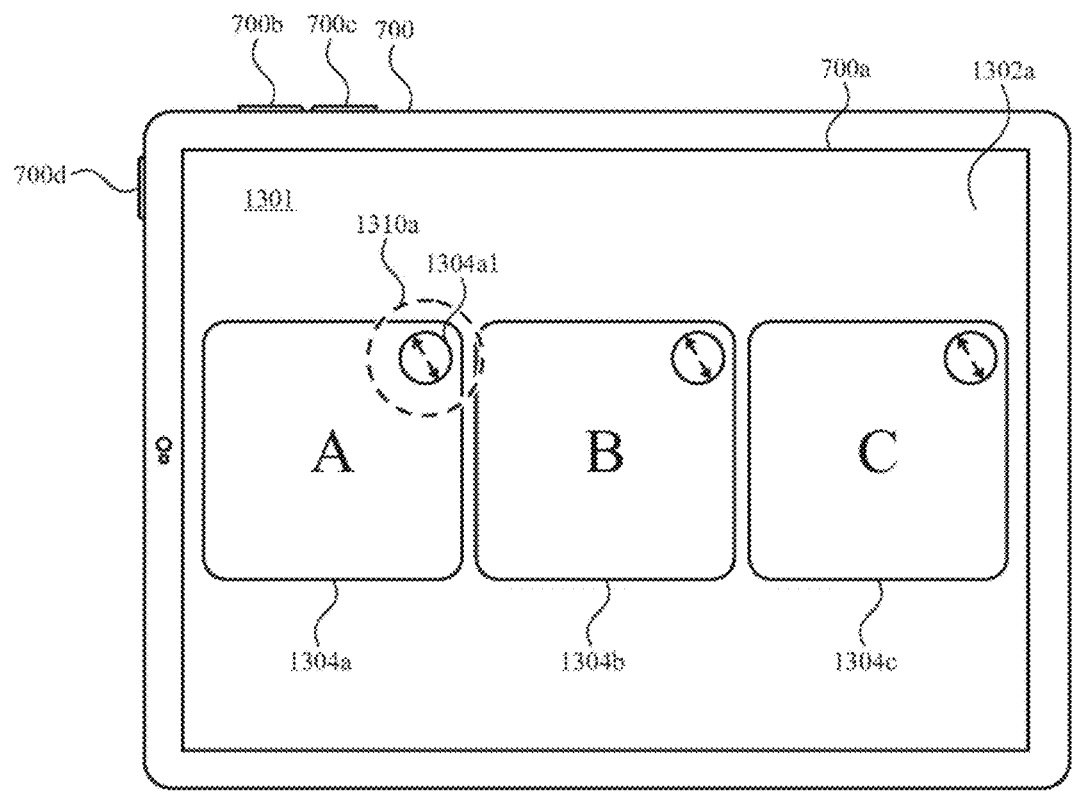
FIGS. 13A-13K illustrate example techniques for interacting with a graphical user interface using gaze, in accordance with some embodiments.

At FIG. 13A, device 700 displays, on display 700a, user interface 1302a that includes background 1301. User interface 1302a includes container virtual objects 1304a-c. In some embodiments, the container virtual objects are folders that organize one or more files and or other digital items. In some embodiments, the container virtual objects are albums that organize one or more media items (e.g., photos, videos, and/or audio media). For example, container virtual object 1304a can be an album of photos and videos taken in the year 2020, container virtual object 1304b can be an album of favorite photos and videos, and so forth. At FIG. 13A, each container virtual object includes an expand control, such as expand control 1304a1 of container virtual object 1304a. In some embodiments, background 1301 is a representation of a physical environment and user interface 1302a is an XR user interface that presents virtual objects, such as the container virtual objects, overlaid on portions of the representation of the physical environment. In such embodiments, one or more virtual objects of user interface 1302a are viewpoint-locked virtual objects and/or environment-locked virtual objects. At FIG. 13A, device 700 detects (e.g., via eye tracking device 130 and/or sensors 306) that the gaze of a user of device 700 is directed to expand control 1304a1 of container virtual object 1304a, as indicated by gaze indication 1310a. In some embodiments, detecting that the user's gaze is directed to a virtual object includes determining that the user's gaze has dwelled on the virtual object for a predetermined period of time (e.g., 0.1 seconds, 0.25 seconds, 0.5 seconds, or 1 second).

Figure 13B:
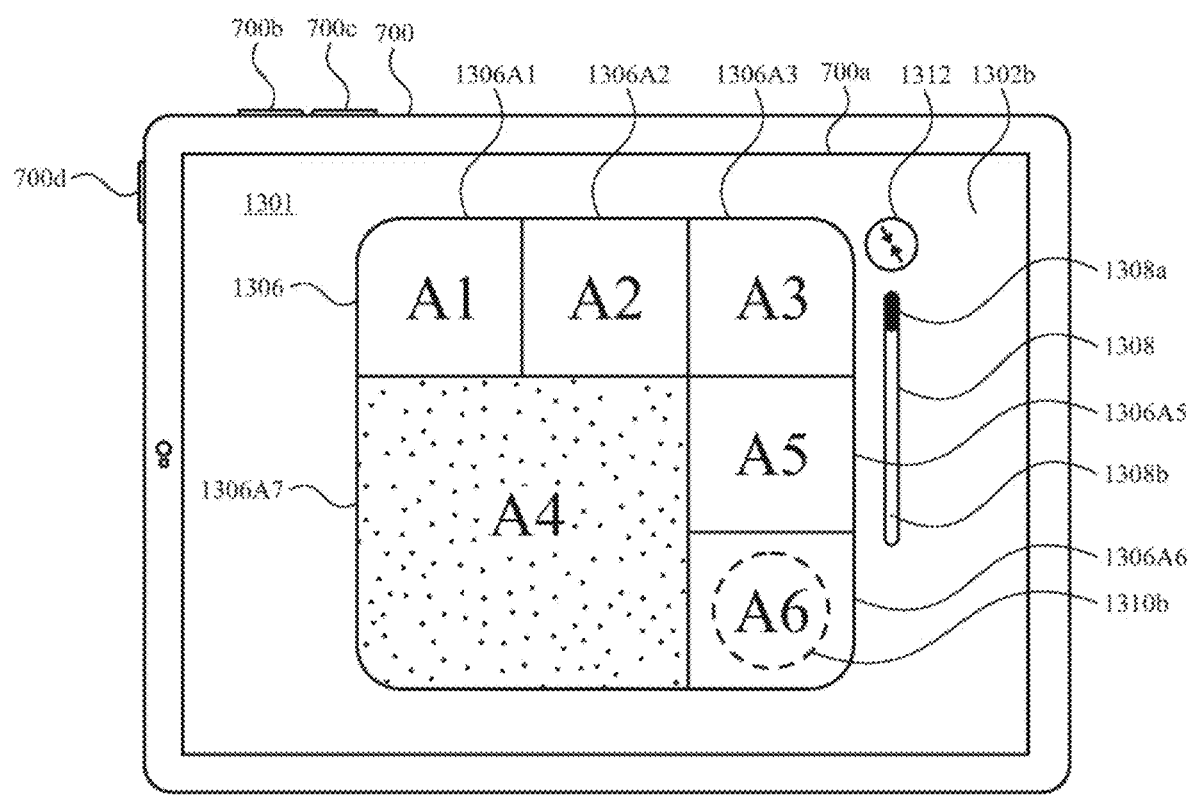

At FIG. 13B, in response to detecting that the gaze of a user of device 700 is directed to expand control 1304a1 of container virtual object 1304a, device 700 displays user interface 1302b, which is also displayed on background 1301. In some embodiments, user interface 1302a and user interface 1302b are user interfaces of the same application (e.g., a media viewer and/or manager application). User interface 1302b includes media viewer virtual object 1306 that presents an ordered set of media item representations that, in FIG. 13B, includes representations 1306A1-1306A6. In some embodiments, representations 1306A1-1306A6 are representations of XR experiences and/or applications that can be executed on device 700. User interface 1302b also includes scrollbar 1308, which includes moveable thumb 1308a inside trough 1308b. The media collection of container virtual object 1304a includes additional media items besides those represented by 1306A1-1306A6 and scrollbar 1308 can be used to rapidly navigate within the collection. At FIG. 13B, thumb 1308a is at the top of trough 1308b, indicating that representations 1306A1-1306A6 correspond to the first media items (e.g., first in an ordered set) in the media collection of container virtual object 1304a. User interface 1302b also includes collapse control 1312, that when selected, causes user interface 1302a to be re-displayed. At FIG. 13B, representations 1306A1-A3 and A5-A6 are presented in a first visual manner while representation 1306A4 is presented in a second visual manner, different from the first visual manner. For example, representations 1306A1-A3 and A5-A6 are presented at a first size while representation 1306A4 is presented at a second, larger size. In some embodiments, representation 1306A4 is presented with a stereoscopic effect, an animated effected, and/or a filter effect that is not applied to representations 1306A1-A3. In some embodiments, representations 1306A I-A3 are presented with a stereoscopic effect, an animated effected, and/or a filter effect that is not applied to representation 1306A4. In some embodiments, representation 1306A4 is presented with the different, second visual manner based on a characteristic of the media item of representation 1306A4 (e.g., the item is a most recent item, the item is a stereoscopic media item, and/or the item is a favorited item) or based on the position of the media item within the ordered set (e.g., every $4^{th}$ media item is presented with the second visual manner). In some embodiments, only a predetermined number (e.g., 1, 2, or 3) of representations are presented with the second visual manner, at any given time, in user interface 1302b. At FIG. 13B, device 700 detects that the gaze of a user of device 700 is directed to representation 1306A6, as indicated by gaze indication 1310b, which is interpreted as a request to move representation 1306A6 to a predetermined position (e.g., a horizontally-centered position) within media viewer virtual object 1306.

Figure 13C:
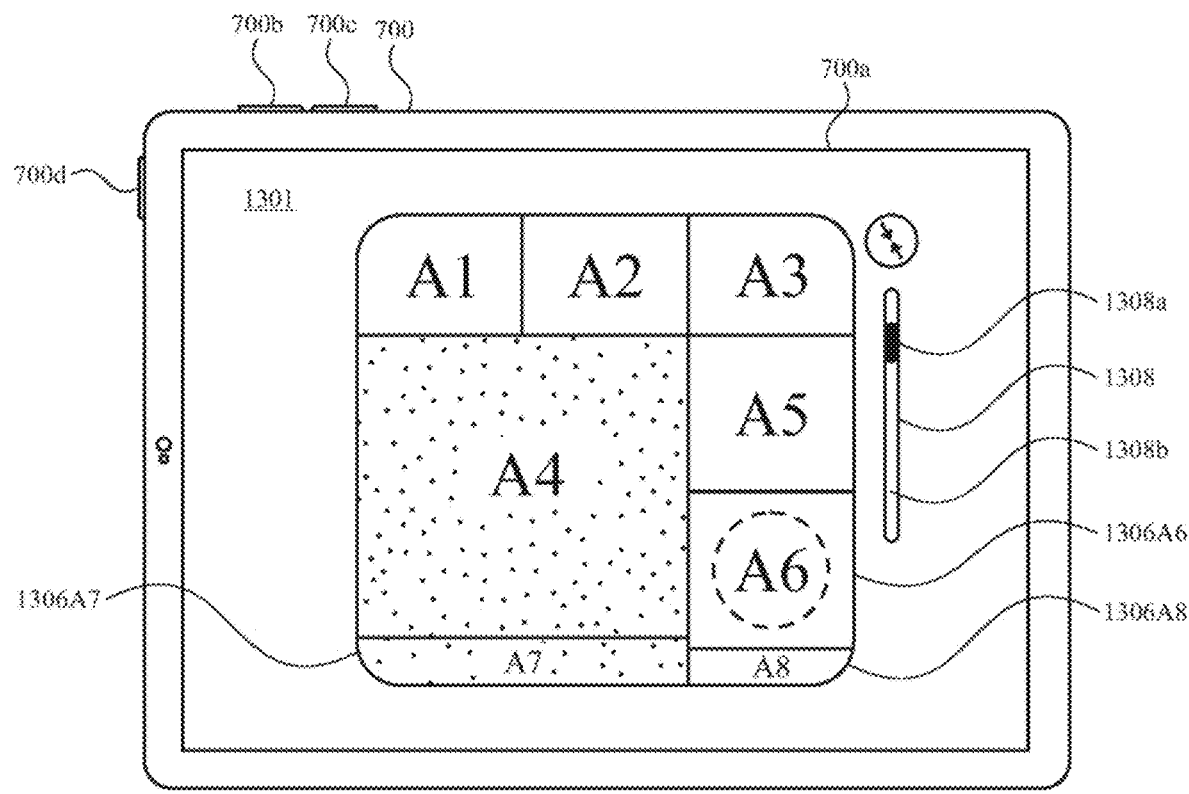

At FIG. 13C, in response to detecting that the gaze of a user of device 700 is directed to representation 1306A6, device 700 begins to shift the representations displayed within media viewer virtual object 1306 upwards (e.g., the relative positioning of the media items remains consistent, as the representations shift), bringing representation 1306A6 closer to being horizontally-centered and updates the position of thumb 1308a of scrollbar 1308 to reflect the shift. In some embodiments, device 700 shifts the representations in media viewer virtual object 1306 at a predetermined speed, while device 700 continues to detect the user's gaze directed to a given representation, until that representation arrives at the predetermined position. At FIG. 13C, the set of representations have shifted so that representation 1306A6 is closer to being horizontally-centered, but representation 1306A6 is not yet horizontally-centered. At FIG. 13C, device 700 detects that the gaze of a user of device 700 continues to be directed to representation 1306A6, as indicated by gaze indication 1310c.

Figure 13D:
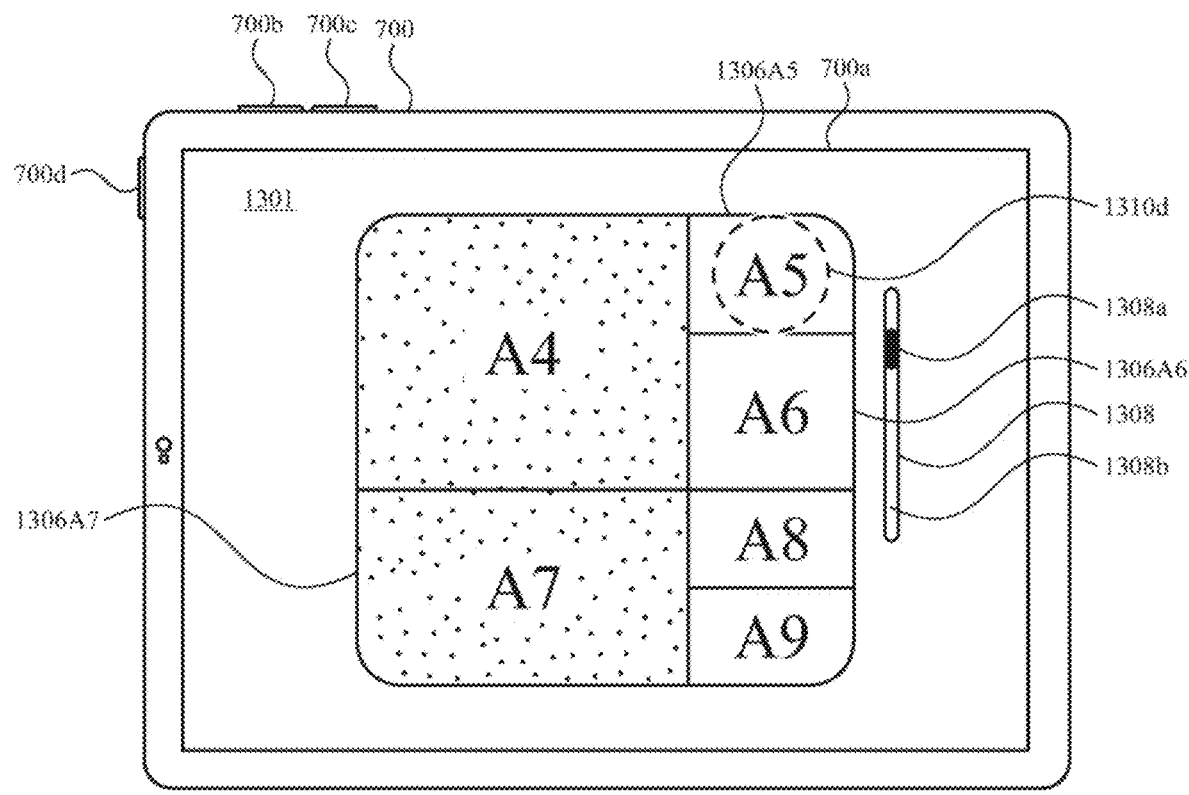

At FIG. 13D, in response to detecting that the gaze of a user of device 700 continues to be directed to representation 1306A6, device 700 shifted the representations displayed within media viewer virtual object 1306 upwards, bringing representation 1306A6 to the horizontally-centered position and updates the position of thumb 1308a of scrollbar 1308 to reflect the further shift. In some embodiments, had device 700 detected that the gaze of the user was no longer directed to representation 1306A6 while at FIG. 13C, device 700 would have stopped shifting the representations displayed within media viewer virtual object 1306. In some embodiments, once representation 1306A6 is displayed at the horizontally-centered position, device 700 would cease to shift the representations displayed within media viewer virtual object 1306, even if device 700 continues to detect that the gaze of a user of device 700 is directed to representation 1306A6. At FIG. 13D, device 700 detects that the gaze of a user of device 700 is now directed to representation 1306A6, as indicated by gaze indication 1310d, which is interpreted as a request to move representation 1306A5 to the predetermined position (e.g., a horizontally-centered position) within media viewer virtual object 1306.

Figure 13E:
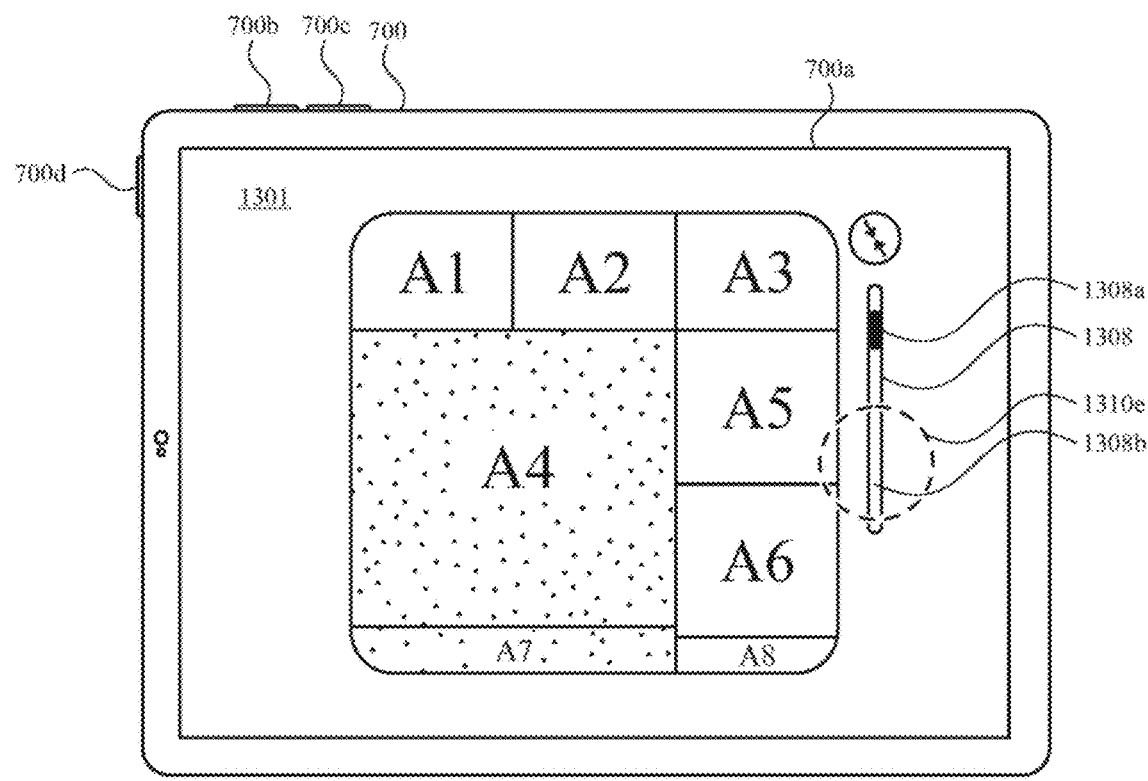

At FIG. 13E, in response to detecting that the gaze of a user of device 700 is directed to representation 1306A5, device 700 begins to shift the representations displayed within media viewer virtual object 1306 downwards, bringing representation 1306A5 closer to being horizontally-centered and updates the position of thumb 1308a of scrollbar 1308 to reflect the shift. At FIG. 13E, device 700 detects that the user's gaze is no longer directed to representation 1306A5 and therefore does not continue shifting the representations displayed within media viewer virtual object 1306 downwards. Thus, as seen in FIGS. 13B-13E, a user can cause device 700 to shift a target representation to a horizontally-centered position, by directing their gaze to the target representation. Using these techniques a user can scroll through a collection of media items, without having to access manual controls, and with different levels of precision and speed. In embodiments in which device 700 is an HMD, the user is able to avoid having to access manual controls that may not be visible while operating device 700 and also frees his or her hands to interact with the environment or other devices. At FIG. 13E, device 700 detects that the gaze of a user of device 700 is now directed to a portion of trough 1308b that is substantially below the current position of thumb 1308a, as indicated by gaze indication 1310e, which is interpreted as a request to navigate to a position within the media collection of container virtual object 1304a that corresponds to that position of trough 1308b.

Figure 13F:
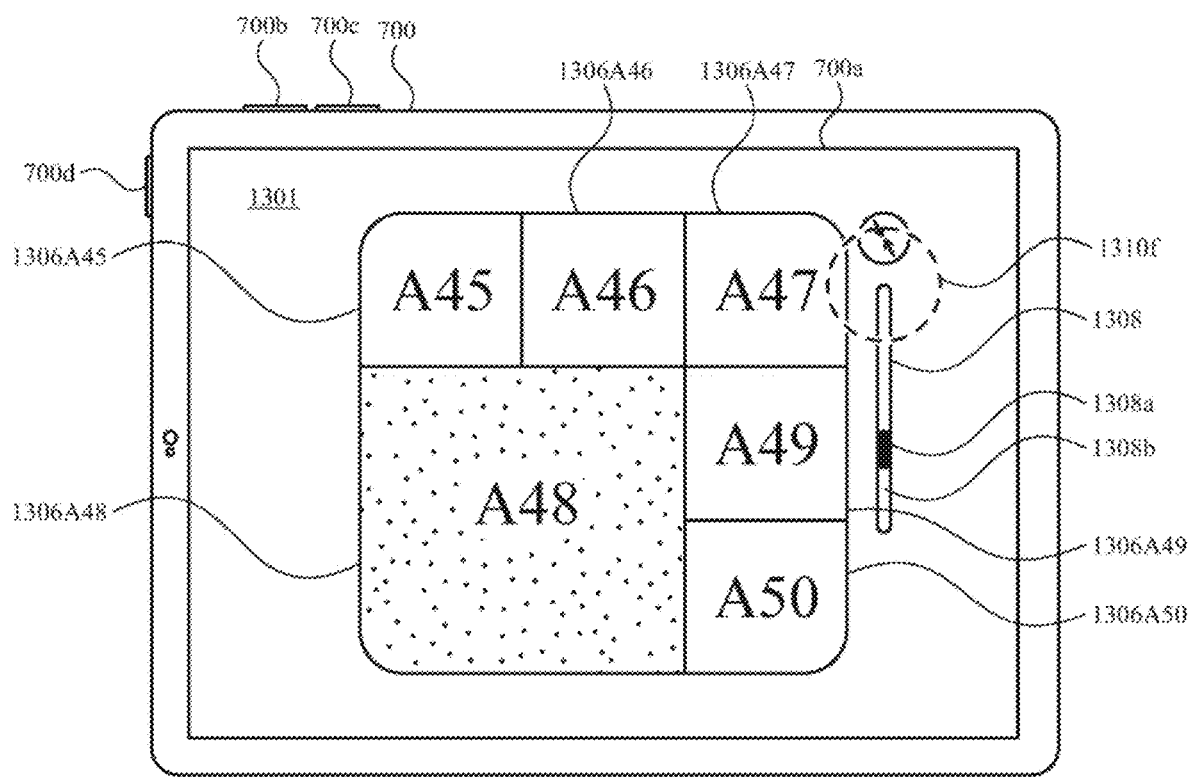
Figure 13G:
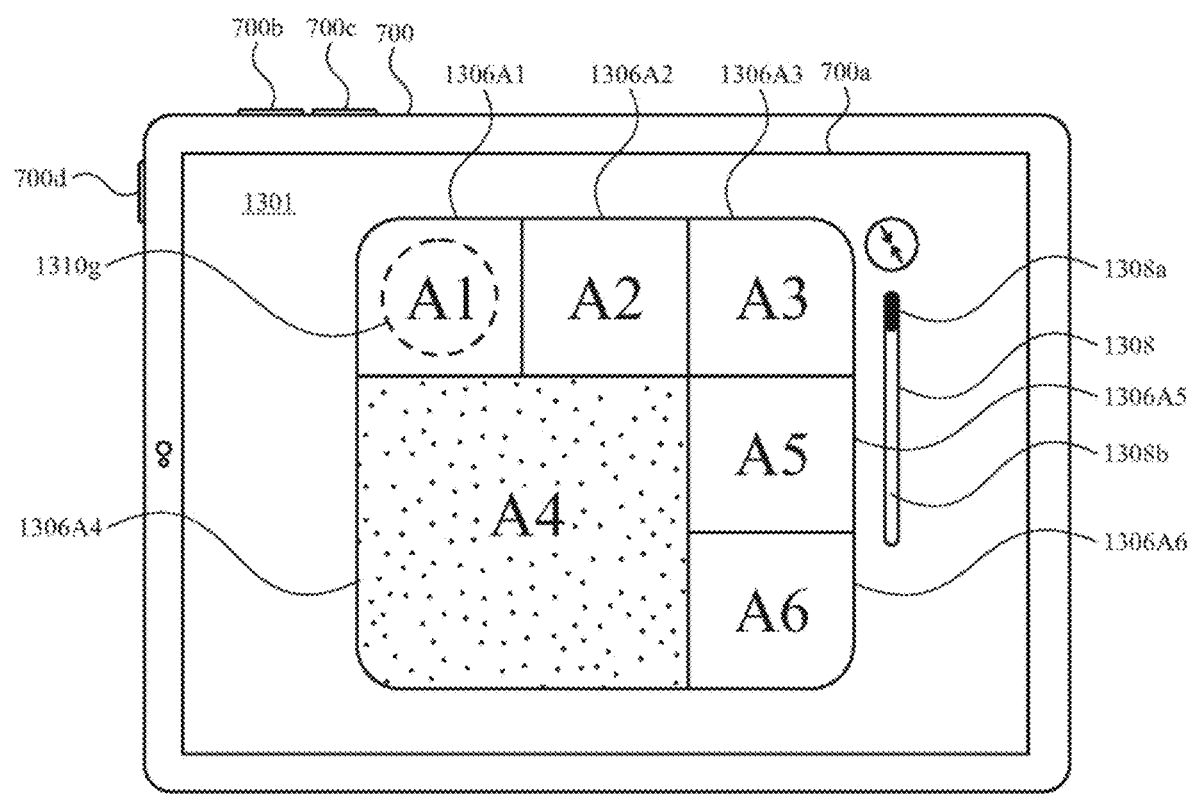

At FIG. 13F, in response to detecting that the gaze of a user of device 700 is directed to the portion of trough 1308b indicated by gaze indication 1310e, device 700 displays representations 1306A45-1306A50 which are further along in the ordered set of the media collection of container virtual object 1304a. In some embodiments, device 700 immediately transitions to display of representations 1306A45-1306A50. In some embodiments, device 700 displays an animation of the representations displayed within media viewer virtual object 1306 shifting at a rapid speed (e.g., a speed that is faster than the speed of the shifts of FIGS. 13B-13E) until representations 1306A45-1306A50 are displayed. Device 700 also updates the position of thumb 1308a to reflect the current position within the media collection of container virtual object 1304a. Thus, a user can gaze at scrollbar 1308 to make more rapid and/or more dramatic shifts within the media collection of container virtual object 1304a while gazing directly at specific representations to make finer and/or slower shifts. At FIG. 13F, device 700 detects that the gaze of a user of device 700 is directed to the top portion of trough 1308b, as indicated by gaze indication 1310f, which is interpreted as a request to navigate to the beginning of the media collection of container virtual object 1304a that corresponds to the top of trough 1308b.

At FIG. 13O, in response to detecting that the gaze of a user of device 700 is directed to the portion of trough 1308b indicated by gaze indication 1310f, device 700 redisplays representations 1306Aa-1306A6, which are at the beginning of the ordered set of representations of the media collection of container virtual object 1304a. Device 700 also updates the position of thumb 1308a to indicate the shift. At FIG. 13G, device 700 detects that the gaze of a user of device 700 is directed to representation 1306A1, as indicated by gaze indication 1310g, which is interpreted as a request to move representation 1306A1 to the predetermined position (e.g., a horizontally-centered position or a position that is within a threshold distance of being horizontally-centered) within media viewer virtual object 1306.

Figure 13H:
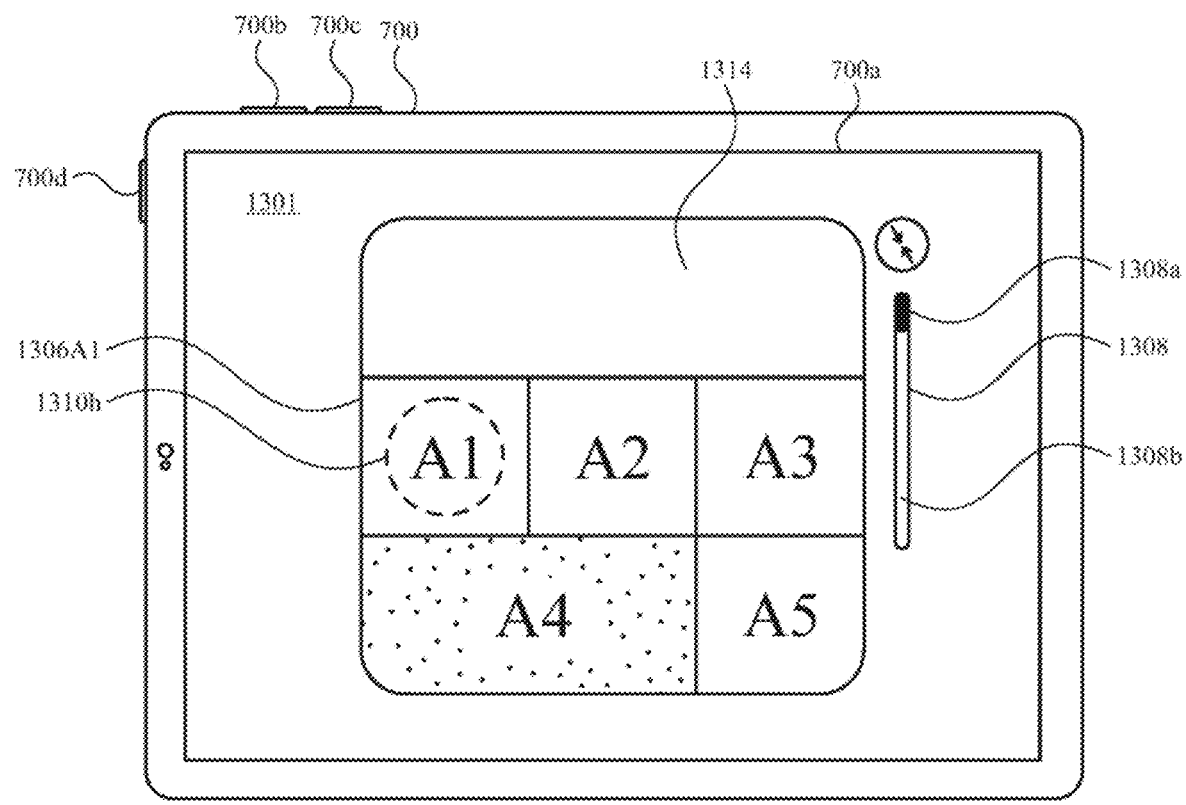

At FIG. 13H, in response to detecting that the gaze of a user of device 700 is directed to representation 1306A1, device 700 has shifted the representations displayed within media viewer virtual object 1306 downwards, bringing representation 1306A1 to the horizontally-centered position. Device 700 also displays blank region 1314, which is an area beyond the edge of the ordered arrangement of representations of media collection of container virtual object 1304a. In some embodiments, doing so provides to the user a visual indication that an end of the collection has been reached and also provides feedback that the gaze of the user was detected by device 700. In some embodiments, device 700 shortens the length of thumb 1308a to indicate that a lesser portion of the representations of the media collection of container virtual object 1304a is currently being displayed (e.g., as compared to what is displayed in FIG. 13G). At FIG. 13G, device 700 detects that the gaze of a user of device 700 continues to be directed to representation 1306A1, as indicated by gaze indication 1310h.

Figure 13I:
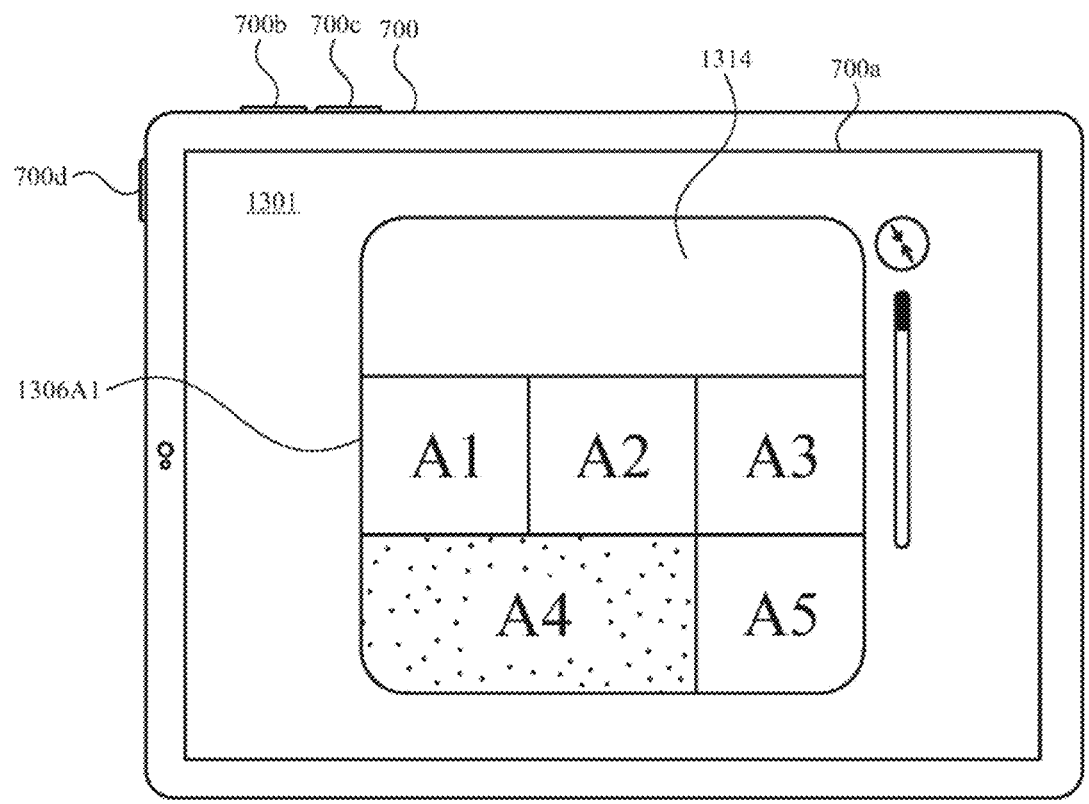

At FIG. 13I, in response to detecting that the gaze of a user of device 700 continues to be directed to representation 1306A1, device 700 maintains display of representation 1306A1 at the horizontally-centered position and maintains display of blank region 1314. At FIG. 13I, device 700 detects that the gaze of a user of device 700 is no longer directed to representation 1306A1 (e.g., to any of the representations in media viewer virtual object 1306).

Figure 13J:
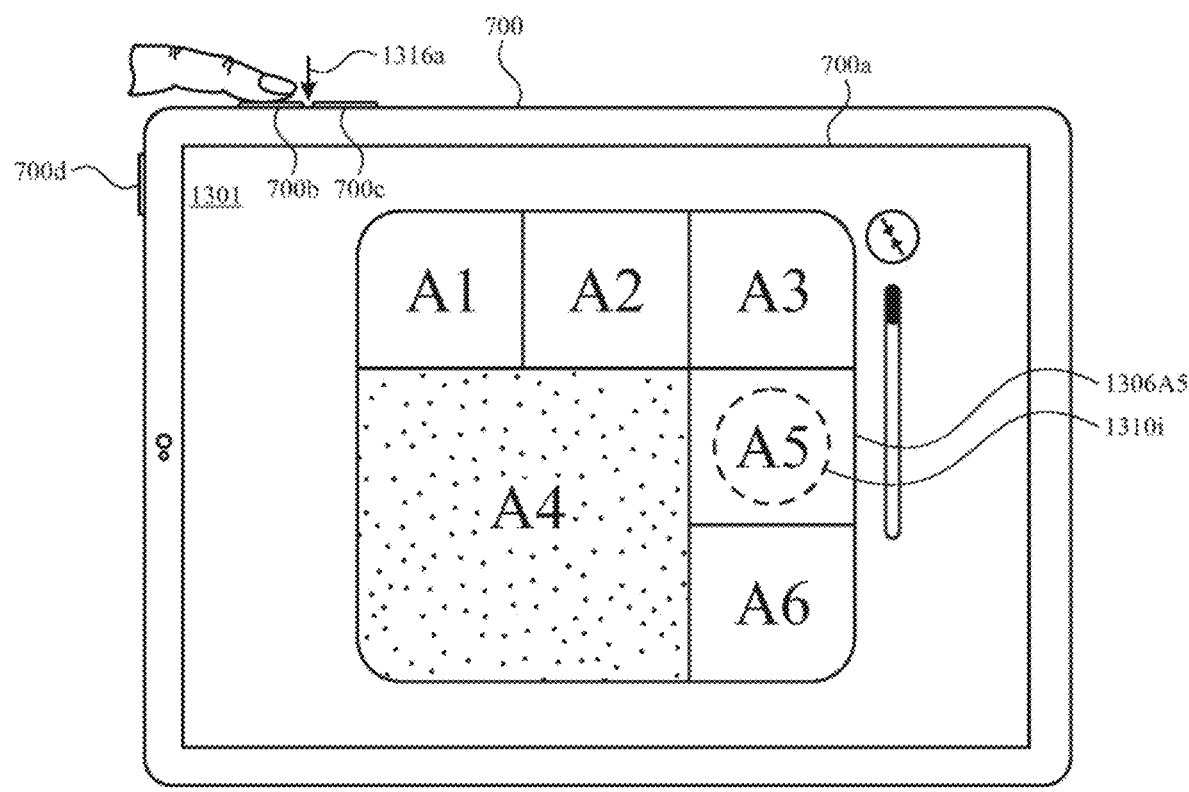

At FIG. 13J, in response to detecting that the gaze of a user of device 700 is no longer directed to representation 1306A1, device 700 shifts the representations displayed in media viewer virtual object 1306 upwards, so that the top edges of representations 1306A1-A3 are at the top edge of media viewer virtual object 1306, thereby causing blank region 1314 to no longer be displayed. In some embodiments, this effect is referred to as a bounce-back or rubber-band effect and doing so optimizes use of the display area, when device 700 determines that the user is no longer requesting that representation 1306A1 be displayed at the predetermined horizontally-centered position. At FIG. 13J, device 700 detects input 1316a (e.g., actuation of button

700*b*), while device 700 detects that the gaze of a user of device 700 is directed to representation 1306A5, as indicated by gaze indication 1310*i*. In some embodiments, input 1316*a* is an air gesture, a touch on a touch-sensitive surface, or a verbal input.

Figure 13K:
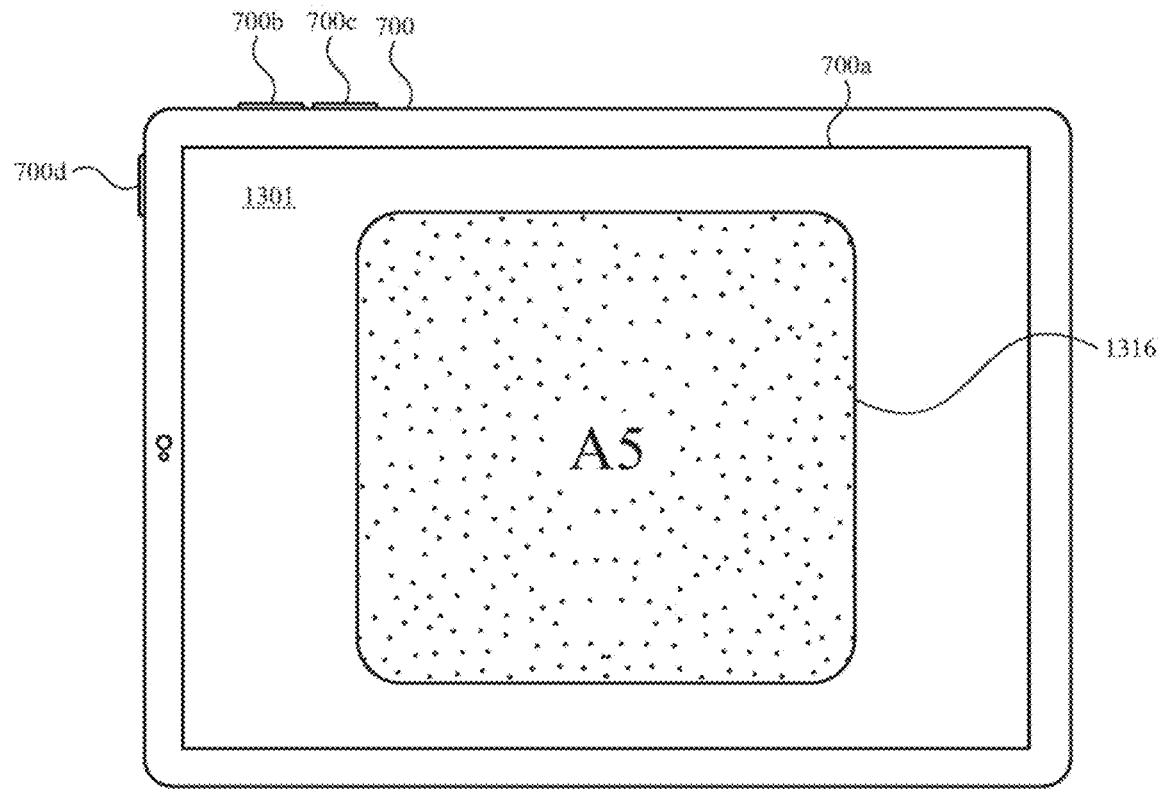

At FIG. 13K, in response to detecting input 1316*a* while device 700 detects that the gaze of a user of device 700 is directed to representation 1306A5, device 700 displays enlarged view 1316 of representation 1306A5. In some embodiments, in addition to being larger than representation 1306A5, enlarged view 1316 is displayed with a stereoscopic effect, an animated effected, and/or a filter effect that is not applied to representation 1306A5 (e.g., representation 1306A5 is displayed as a two-dimensional object and enlarged view 1316 is displayed as a three-dimensional object). In some embodiments, an additional input (e.g., 1316*a*), beyond gaze, is required to enlarge a representation because the user's gaze commonly dwells on representations while browsing the representations in media viewer virtual object 1306, without the user having an intent to display an enlarged view. In some embodiments, the techniques discussed with reference to FIGS. 13A-13K provide a user with a user interface and control scheme for navigating through collections of items (e.g., media items) without having to use manual controls to shift to a representation/item of interest.

Additional descriptions regarding FIGS. 13A-13K are provided below in reference to method 1400 described with respect to FIGS. 13A-13K.

FIG. 14 is a flow diagram of an exemplary method 1400 for interacting with graphical user interfaces using gaze, in accordance with some embodiments. In some embodiments, method 1400 is performed at a computer system (e.g., computer system 101 in FIG. 1; a head mounted display; an optical head-mounted display; a personal computer; a smart phone; and/or a tablet computer) that is in communication with one or more gaze-tracking sensors (e.g., an optical and/or IR camera configured to track a direction of gaze of a user of the computer system; eye tracking device 130; and/or sensors 306) and a display generation component (e.g., display generation component 120; a display controller; a touch-sensitive display system; a passthrough display (e.g., integrated and/or connected), a 3D display, a transparent display, a projector, a heads-up display, and/or a head-mounted display). In some embodiments, method 1400 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system (e.g., 700) displays (1402), via the display generation component (e.g., 700*a*), a respective user interface (e.g., 1302*b*), wherein displaying the respective user interface includes displaying a set of one or more virtual objects (e.g., 1306A1-A6) that includes a first virtual object (e.g., 1306A6) (e.g., a media item (e.g., a photograph or a representation of a video); an icon; and/or a text box) displayed at a first position (in some embodiments, a first position in the respective user interface; in some embodiments, a position along one edge of the displayable area) within a displayable area (e.g., the area of 700*a* and/or 1306)(e.g., the displayable area of a display screen, the area that a projector can project content) in which the display generation component can display content.

The computer system, while displaying the first virtual object at the first position within the displayable area, detects (1404), via the one or more gaze-tracking sensors, that a gaze of a user of the computer system is directed to the first virtual object (e.g., as indicated by 1310*b*) (e.g., is directed in a direction that corresponds to the gaze of the user intersecting with the first virtual object) (in some embodiments, is directed to the first virtual object for at least a predetermined time period (e.g., 0.01, 0.05, 0.1, 0.2, 0.25 seconds, 0.5 seconds, or 1 second)).

The computer system, in response to detecting that the gaze of the user of the computer system is directed to the first virtual object, moves (1406) the first virtual object from the first position within the displayable area towards a second position (e.g., the horizontally-centered position discussed at FIG. 13C) (e.g., a predetermined position) (in some embodiments, the second position is the center of the displayable area) within the displayable area that is different from the first position (e.g., as seen in FIG. 13C).

The computer system, while moving the first virtual object towards the second position within the displayable area and before the first virtual object arrives at the second position, detects (1408), via the one or more gaze-tracking sensors, movement of the gaze.

The computer system, in response (1410) to detecting the movement of the gaze: in accordance with a determination that the gaze of the user of the computer system continues to be directed to the first virtual object (1412)(e.g., the gaze of the user is tracking the first virtual object as it moves), continuing to move the first virtual object towards the second position (e.g., as discussed with reference to FIG. 13D); and in accordance with a determination that the gaze of the user of the computer system has ceased to be directed (e.g., is no longer directed) to the first virtual object (1414), ceasing to move the first virtual object towards the second position within the displayable area (e.g., as discussed with reference to 1306A6 at FIG. 13C) (in some embodiments, ceasing movement of the first virtual object within the displayable area). Moving the first virtual object from the first position within the displayable area towards a second position based on gaze brings an object that the user is currently focused on (e.g., as indicated by gaze) to a predetermined second location in the displayable area (e.g., an area that is more central in the displayable area). Doing so also provides improved visual feedback as to the current detected location of the user's gaze.

In some embodiments, The computer system, prior to detecting the movement of the gaze and while moving the first virtual object towards the second position and before the first virtual object arrives at the second position: in accordance with a determination that the gaze of the user of the computer system is substantially stationary and continues to be directed to the first virtual object (e.g., the gaze of the user is tracking the first virtual object as it moves), continues to move the first virtual object towards the second position (e.g., as discussed with reference to 1306A6 at FIG. 13D). In some embodiments, in accordance with a determination that the gaze of the user of the computer system has ceased to be directed (e.g., is no longer directed) to the first virtual object, ceasing to move the first virtual object towards the second position within the displayable area (in some embodiments, ceasing movement of the first virtual object within the displayable area). Continue to move the first virtual object from the first position within the displayable area towards a second position based on gaze continuing to be directed to the first virtual object brings an object that the user is currently focused on (e.g., as indicated by gaze) to a predetermined second location in the displayable area (e.g., an area that is more central in the displayable area). Doing so also provides improved visual feedback as to the current detected location of the user's gaze.

In some embodiments, the set of one or more virtual objects includes a second virtual object (e.g., 1306A5); prior to detecting that the gaze of the user of the computer system is directed to the first virtual object and prior to moving the first virtual object from the first position within the displayable area towards the second position, the first virtual object and the second virtual object are arranged in a first predetermined spatial relationship (e.g., a grid wherein the first virtual object and the second virtual objects are at predetermined positions relative to each other); and moving the first virtual object from the first position within the displayable area towards the second position includes moving the second virtual object such that the first virtual object and the second virtual object remain in the first predetermined spatial relationship (e.g., as seen in FIG. 13C) (e.g., during and after the movement). Moving the first virtual object in a manner that maintains the first predetermined spatial relationship between the first virtual object and the second virtual object assists the user in tracking the objects, by preserving an existing spatial relationship, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second position within the displayable area is a substantially central position along at least one axis (e.g., an x-axis, y-axis, or z-axis) of the displayable area (e.g., as discussed with reference to FIGS. 13C-13D). In some embodiments, the second position is not a substantially central position on at least one other axis of the displayable area (e.g., the second position is centered on the x-axis, but not the y-axis, or vice versa). In some embodiments, the moving the first virtual object occurs at a first predetermined speed (e.g., a speed that is not based on the direction of the gaze of the user). Moving the first virtual object from the first position within the displayable area towards a central position based on gaze brings an object that the user is currently focused on brings that object into a more central portion of the displayable area, making it easier for the user to interact with the object. Doing so also provides improved visual feedback as to the current detected location of the user's gaze.

In some embodiments, the computer system, ater detecting that the gaze of the user of the computer system is directed to the first virtual object and after moving the first virtual object from the first position within the displayable area towards the second position, detects, via the one or more gaze-tracking sensors, that the gaze of the user of the computer system has moved from being directed to the first virtual object to being directed to (e.g., is directed in a direction that corresponds to the gaze of the user intersecting with the third virtual object) (in some embodiments, is directed to the third virtual object for at least a predetermined time period (e.g., $_{0.01, 0.05, 0.1, 0.2, 0.25}$ seconds, 0.5 seconds, or 1 second)) a third virtual object (e.g., 1306A5 in FIG. 13D) that is displayed at a third position within the displayable area. The computer system, in response to detecting that the gaze of the user of the computer system has moved from being directed to the first virtual object to being directed to the third virtual object, moves the third virtual object from the third position within the displayable area towards a fourth position (e.g., a predetermined position) (in some embodiments, the fourth position is the center of the displayable area) within the displayable area that is different from the third position (e.g., as seen in FIG. 13E).

In some embodiments, displaying the respective user interface includes displaying an interactive navigation virtual object (e.g., 1308) (e.g., a scrollbar, a scrubber, an index bar, or a document or interface map) that, when selected via a first input (e.g., via a gesture on a touch sensitive surface; an air gesture performed with a hand of the user of the computer system; actuation of a hardware button or key; a gaze-based input; and/or a voice command), causes the computer system to navigate to a location within the respective user interface (e.g., move the set of one or more virtual objects) that is based on a characteristic (e.g., a movement speed of the first input (e.g., the first input includes a movement component (e.g., a swipe, a hold-and-drag)); a location of the first input within the interactive scroll virtual object (e.g., a click at a position along the trough/track of a scrollbar), a direction of the first input, and/or a duration of the input (e.g., a gaze that is maintained at a position for a duration of time)) of the first input (e.g., as seen in FIGS. 13E-13F). Displaying an interactive navigation virtual object that allows for navigation through the respective user interface based on a characteristic of an input provides the user with a input mechanism/scheme for (potentially) rapidly navigating through the respective user interface, which enhances the operability of the device and makes the user-device interface more efficient, thereby reducing power usage and improves battery life of the device by enabling the user to use the device more quickly and efficiently.

In some embodiments, detecting that the gaze of the user of the computer system is directed to the first virtual object includes detecting that the gaze of the user of the computer system has been directed to the first virtual object for more than a first predetermined period of time (e.g., 0.01, 0.05, 0.1, 0.2, 0.25 seconds, 0.5 seconds, or 1 second) (e.g., as discussed with reference to FIG. 13A).

In some embodiments, detecting that the gaze of the user of the computer system is directed to the first virtual object includes detecting that an air gesture of a first type (e.g., an air pinch, an air tap, or an air double tap) was detected while the gaze of the user of the computer system was directed to the first virtual object.

In some embodiments, the computer system receives a request to enlarge the first virtual object (e.g., 1310i and 1316a). The computer system, in response to receiving the request to enlarge the first virtual object, enlarges (in some embodiments, and ceasing to display other objects of the set of one or more virtual objects) the first virtual object from a first size to a second size, larger than the first size, wherein: the first virtual object is displayed as a three-dimensional object when displayed at the second size (in some embodiments, the first virtual object is a stereoscopic object when displayed at the second size (e.g., the display generation component presents the object differently to the user's right eye than it is presented to the user's left eye)); and the first virtual object is displayed as a two-dimensional object when displayed at the first size (in some embodiments, the first visual object is a non-stereoscopic object when displayed at the first size) (e.g., as discussed with reference to 1316 and FIG. 13K). Displaying the first virtual object as a three-dimensional object when it is expanded (e.g., at the second size) provide improved visual feedback as to the received request to enlarge the first virtual object.

In some embodiments, the set of one or more virtual objects includes: a fourth virtual object that corresponds to a first two-dimensional media item (e.g., 1306A1) (e.g., a photo or a video); a fifth virtual object that corresponds to a second two-dimensional media item (e.g., 1306A2); a sixth virtual object that corresponds to a first three-dimensional media item (e.g., 1306A4) (e.g., a stereoscopic photo or stereoscopic video); and a seventh virtual object that corresponds to a second three-dimensional media item (e.g., 1306A7). The fourth virtual object and the fifth virtual object are both displayed with a first type of visual appearance (e.g., a visual treatment; a display style or theme (e.g., color, pattern, brightness level)). In some embodiments, all virtual objects that correspond to 2D media items are displayed using the same visual appearance/treatment. The sixth virtual object and the seventh virtual object are both displayed with a second type of visual appearance that is different from the first type of visual appearance (e.g., different in size, difference in brightness or contrast, difference in a lighting effect (e.g., a glow effect), differences in presence or absence of a border or an appearance of the border, and/or different in shape). In some embodiments, all virtual objects that correspond to 3D media items are displayed using the same visual appearance/treatment. Displaying virtual objects that correspond to three-dimensional media items with a different visual appearance than virtual objects that correspond to two-dimensional media items provides improved visual feedback as to the nature of the media items.

In some embodiments, the computer system, after moving the first virtual object from the first position within the displayable area towards the second position and while the first virtual object is at the second position, detects, via the one or more gaze-tracking sensors, that the gaze of a user of the computer system is directed to the first virtual object (e.g., 1306A5 in FIG. 13I)(e.g., continues to be directed to the first virtual object). The computer system, in response to detecting that the gaze of a user of the computer system is directed to the first virtual object while the first virtual object is at the second position, maintains the first virtual object at the second position (e.g., as discussed with reference to FIG. 13I) (e.g., forgoing moving the first virtual object to a position other than the second position). Maintaining the first virtual object at the second position once it completes its movement allows the user to continue to interact (e.g., view) the first virtual object without having to track a moving object, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Doing so also provides improved visual feedback as to the position of the object relative to the second position.

In some embodiments, the computer system, in response to detecting that the gaze of the user of the computer system is directed to the first virtual object, displays an eighth virtual object (e.g., 1306A7) (in some embodiments, displaying an animation of the eight virtual object transitioning into the displayable area), wherein the eighth virtual object was not displayed while the first virtual object was displayed at the first position. In some embodiments, the first virtual object and the eighth virtual object are part of plurality of virtual objects arranged in a predetermined spatial arrangement, wherein only a sub-portion of the plurality of virtual objects are displayed at a given time.

In some embodiments, the computer system, while the gaze of the user of the computer system is directed to the first virtual object, detects a first input (e.g., 1316*a*), wherein the first input is selected from the group consisting of an air gesture (in some embodiments, an air gestured detected via one or more sensors of an external electronic device (e.g., a smart watch or a smart phone) that is in communication with the computer system), actuation of a hardware input mechanism that is in communication with the computer system (e.g., an external or integrated button, dial, or switch), and continuing to detect the gaze of the user of the computer system as being directed to the first virtual object for more than a second predetermined period of time (e.g., 0.01, 0.05, 0.1, 0.2, 0.25 seconds, 0.5 seconds, or 1 second). The computer system, in response to detecting the first input while the gaze of the user of the computer system is directed to the first virtual object, performing a first operation (e.g., as seen in FIG. 13K) (e.g., enlarging the object, focusing on/selecting the object, and/or modifying an appearance of the object) on the first virtual object.

In some embodiments, the set of one or more virtual objects are arranged in a first predetermined spatial arrangement (e.g., a grid, a pattern, and/or a shape) that has a first edge (e.g., an edge that defines one border of the arrangement); and moving the first virtual object from the first position within the displayable area towards the second position includes moving the first predetermined spatial arrangement in a first direction to display the first edge and an area beyond the first edge (e.g., 1314). In some embodiments, the computer system, while displaying the first edge and the area beyond the first edge: in accordance with a determination that the gaze of the user of the computer system continues to be directed to the first virtual object, continuing to display the first edge and the area beyond the first edge (e.g., as seen in FIG. 13I); and in accordance with a determination that the gaze of the user of the computer system is no longer directed to the first virtual object, moving the arrangement in a second direction, opposite the first direction, so that the area beyond the first edge is no longer displayed (e.g., as seen in FIG. 13J). Displaying the first edge and an area beyond the first edge while gaze is maintained and ceasing to display the area beyond the first edge once gaze is no longer maintained performs an operation when a set of conditions has been met without requiring further user input. Doing so also provides improved visual feedback as to the position in the display of the first predetermined spatial arrangement and of the first virtual object within the first predetermined spatial arrangement and improved visual feedback that confirms that the computer system is recognizing that the gaze of the user (e.g., an input) remains directed to the first virtual object.

In some embodiments, the set of one or more virtual objects includes: a ninth virtual object that includes a representation of a first extended reality experience (e.g., an extended reality user interface generated by a first application (e.g., an extended reality media viewer application, an extended reality media capture application; or an extended reality conferencing application)) (in some embodiments, an extended reality experience corresponding to FIGS. 11A-11I and method 1200); and In some embodiments, the ninth virtual object, when selected, causes the first extended reality experience to be launched. In some embodiments, the set of one or more virtual objects includes a tenth virtual object that includes a representation of a second extended reality experience, different from the first extended reality experience (e.g., as discussed with reference to FIG. 13B).

In some embodiments, the set of one or more virtual objects includes: an eleventh virtual object that includes a representation of a first media item (e.g., 1306A1)(e.g., a photo or a video; or a 2D or 3D (e.g., stereoscopic) media item); and a twelfth virtual object that includes a representation of a second media item (e.g., 1306A4), different from the first media item. In some embodiments, the eleventh media item, when selected, causes an operation to be performed on the first media item.

In some embodiments, the representation of the first media item is displayed at a third size and as a two-dimensional representation (e.g., 1306A1); the representation of the second media item is displayed at a fourth size, larger than the third size, and as a three-dimensional representation (e.g., 1306A4) (e.g., a stereoscopic representation). In some embodiments, the computer system receives a first request (e.g., 1316a and 1310i) to enlarge the representation of the first media item or the representation of the second media item. The computer system, in response to receiving the first request: in accordance with a determination that the first request is a request to enlarge the representation of the first media item, enlarges the representation of the first media item from the third size to a fifth size that is larger than the third size, wherein the representation of the first media item, when displayed at the fifth size, is a three-dimensional representation (e.g., the representation of the first media item transitions from being displayed as a 2D representation to a 3D representation, when it is selected); and in accordance with a determination that the first request is a request to enlarge the representation of the second media item, enlarges the representation of the second media item from the fourth size to a sixth size that is larger than the fourth size, wherein the representation of the second media item, when displayed at the sixth size, is a three-dimensional representation (in some embodiments, media items that are above a predetermined size are displayed as 3D representation, before and after being enlarged). Displaying smaller media item representations as two-dimensional objects and a larger representation as a three-dimensional object provides improved visual feedback as to the size of the representations.

In some embodiments, displaying the set of one or more virtual objects includes displaying no more than a predetermined number (e.g., 1, 2, or 3) of virtual objects that include representations of media items that are displayed at a size greater than the third size (e.g., as discussed with reference to FIG. 13B) (in some embodiments, that are displayed as three dimensional representations). In some embodiments, no more than a predetermined number of large media item representations are displayed at a time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve user interface experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an interactive user interface. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of interactive user interfaces, the present technology can be configured to allow users to select to "opt in" or "opt out" of participation in the collection of personal information data during registration for services or anytime thereafter. In another example, users can select not to provide data for customization of services or interfaces. In yet another example, users can select to limit the length of time data is maintained or entirely prohibit the development of a customized service or interface. In addition to providing "opt in" and "opt out" options, the present disclosure contemplates providing notifications relating to the access or use of personal information. In yet another example, captured media, including stereoscopic and/or spatial media, can be provided to a user for review after capture (e.g., immediately after capture) to ensure that the user finds the contents included in the media to be acceptable and before permitting use of, or access to, the captured media (e.g., if media sharing is enabled, which a user can also choose to enable or disable to prevent use or access). For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an interactive and/or customized user interface can be generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more gaze-tracking sensors and a display generation component, comprising:
one or more processors; and
memory storing one or more programs configured to be executed by the one or more processors, the one or more programs including instructions for:
displaying, via the display generation component, a respective user interface, wherein displaying the respective user interface includes displaying:
a plurality of edges of the respective user interface that includes a first edge and a second edge, different from the first edge;
a first user interface object positioned along the first edge that corresponds to a first operation; and
a second user interface object positioned along the second edge that corresponds to a second operation, different from the first operation;
while displaying the first user interface object and the second user interface object, detecting, via the one or more gaze-tracking sensors, that a gaze of a user of the computer system is directed to a respective portion of the respective user interface; and
in response to detecting that the gaze of the user of the computer system is directed to the respective portion of the respective user interface:
in accordance with a determination that the respective portion of the respective user interface corresponds to the first user interface object:
performing the first operation; and
continuing to display the first user interface object while ceasing to display the second user interface object;
in accordance with a determination that the respective portion of the respective user interface corresponds to the second user interface object:
performing the second operation; and
continuing to display the second user interface object while ceasing to display the first user interface object.

2. The computer system of claim 1, wherein:
the respective user interface is an extended reality user interface; and
displaying the respective user interface includes displaying:
a representation of a physical environment; and
a third user interface object, wherein the third user interface object is an environment-locked virtual object.

3. The computer system of claim 1, wherein:
continuing to display the first user interface object while ceasing to display the second user interface object includes visually emphasizing the first user interface object; and
continuing to display the second user interface object while ceasing to display the first user interface object includes visually emphasizing the second user interface object.

4. The computer system of claim 1, wherein performing the first operation includes:
expanding the first user interface object from an unexpanded state to a first expanded state by expanding at least a first portion of the first user interface object, wherein the first expanded state of the first user interface object includes a first control object and first information that were not included in the unexpanded state of the first user interface object.

5. The computer system of claim 4, wherein:
the first control object, when selected, causes the computer system to perform an operation related to display brightness; and
the first information corresponds to brightness information.

6. The computer system of claim 4, wherein:
the first control object, when selected, causes the computer system to perform an operation related to audio output volume; and
the first information corresponds to volume information.

7. The computer system of claim 4, wherein:
the first control object, when selected, causes the computer system to perform an operation related to an energy storage component of the computer system; and
the first information corresponds to energy storage information.

8. The computer system of claim 4, the one or more programs further including instructions for:
detecting, via the one or more gaze-tracking sensors, that the gaze of the user of the computer system is directed to the first control object;
in response to detecting that the gaze of the user of the computer system is directed to the first control object, expanding the first control object from a first control object unexpanded state to a first control object expanded state.

9. The computer system of claim 8, wherein:
while the first user interface object is displayed with the first control object in the first control object unexpanded state, the first user interface object includes a second control object that is in a second control object expanded state, and
expanding the first control object from the first control object unexpanded state to the first control object expanded state includes contracting the second control object from the second control object expanded state to a second control object unexpanded state.

10. The computer system of claim 8, wherein the first control object, while in the first control object expanded state, includes a third control object that was not included in the first control object, while the first control object was in the first control object unexpanded state.

11. The computer system of claim 8, wherein the first control object, while in the first control object expanded state, includes second information that was not included in the first control object, while in the first control object unexpanded state.

12. The computer system of claim 4, wherein the first control object, when selected, causes the display generation component to transition from a first mode to a second mode.

13. The computer system of claim 1, wherein the first user interface object, when selected, causes the computer system to disable a set of one or more functions that are activated by detecting the gaze of the user of the computer system.

14. The computer system of claim 13, wherein causing the computer system to disable the set of one or more functions that are activated by detecting the gaze of the user of the computer system includes:
disabling a first function that is activated when the computer system detects that the gaze of the user of the computer system is directed to a first position of the respective user interface; and
maintaining, as available for activation, a second function that is activated when the computer system detects that the gaze of the user of the computer system is directed to a second position of the respective user interface.

15. The computer system of claim 13, the one or more programs further including instructions for:
in accordance with a determination that the set of one or more functions that are activated by detecting the gaze of the user of the computer system are available for activation, displaying an indication that the set of one or more functions that are activated by detecting the gaze of the user of the computer system are available for activation; and
in accordance with a determination that the set of one or more functions that are activated by detecting the gaze of the user of the computer system are disabled, displaying an indication that the set of one or more functions that are activated by detecting the gaze of the user of the computer system are disabled.

16. The computer system of claim 1, wherein the respective user interface further includes a current time indicator.

17. The computer system of claim 1, wherein:
the respective user interface includes a plurality of application user interface objects that are displayed in a first spatial arrangement; and
the first user interface object, when selected, causes the plurality of application user interface objects to transition from being displayed in the first spatial arrangement to being displayed in a second spatial arrangement, different from the first spatial arrangement.

18. The computer system of claim 1, wherein the respective user interface further includes a first representation of an application user interface of a first application.

19. The computer system of claim 18, the one or more programs further including instructions for:
while the first representation is displayed at a first location in the respective user interface, detecting a first input corresponding to the first representation;
in response to the first input, moving the first representation to a second location in the respective user interface, different from the first location.

20. The computer system of claim 19, wherein the first location is predefined and the second location is predefined.

21. The computer system of claim 18, the one or more programs further including instructions for:
while the first representation is in a first representation unexpanded state, detecting a second input corresponding to the first representation;
in response to detecting the second input, expanding the first representation to a first representation expanded state, wherein the first representation is larger in the first representation expanded state than in the first representation unexpanded state.

22. A non-transitory computer-readable storage medium storing one or more programs configured to be executed by one or more processors of a computer system that is in communication with one or more gaze-tracking sensors and a display generation component, the one or more programs including instructions for:
displaying, via the display generation component, a respective user interface, wherein displaying the respective user interface includes displaying:
a plurality of edges of the respective user interface that includes a first edge and a second edge, different from the first edge;
a first user interface object positioned along the first edge that corresponds to a first operation; and
a second user interface object positioned along the second edge that corresponds to a second operation, different from the first operation;
while displaying the first user interface object and the second user interface object, detecting, via the one or more gaze-tracking sensors, that a gaze of a user of the computer system is directed to a respective portion of the respective user interface; and
in response to detecting that the gaze of the user of the computer system is directed to the respective portion of the respective user interface:
in accordance with a determination that the respective portion of the respective user interface corresponds to the first user interface object:
performing the first operation; and
continuing to display the first user interface object while ceasing to display the second user interface object;
in accordance with a determination that the respective portion of the respective user interface corresponds to the second user interface object:
performing the second operation; and
continuing to display the second user interface object while ceasing to display the first user interface object.

23. The non-transitory computer-readable storage medium of claim 22, wherein:
the respective user interface is an extended reality user interface; and displaying the respective user interface includes displaying:
a representation of a physical environment; and
a third user interface object, wherein the third user interface object is an environment-locked virtual object.

24. The non-transitory computer-readable storage medium of claim 22, wherein:
continuing to display the first user interface object while ceasing to display the second user interface object includes visually emphasizing the first user interface object; and
continuing to display the second user interface object while ceasing to display the first user interface object includes visually emphasizing the second user interface object.

25. The non-transitory computer-readable storage medium of claim 22, wherein performing the first operation includes:
expanding the first user interface object from an unexpanded state to a first expanded state by expanding at least a first portion of the first user interface object, wherein the first expanded state of the first user interface object includes a first control object and first information that were not included in the unexpanded state of the first user interface object.

26. The non-transitory computer-readable storage medium of claim 22, wherein the first user interface object, when selected, causes the computer system to disable a set of one or more functions that are activated by detecting the gaze of the user of the computer system.

27. The non-transitory computer-readable storage medium of claim 22, wherein the respective user interface further includes a current time indicator.

28. The non-transitory computer-readable storage medium of claim 22, wherein:
the respective user interface includes a plurality of application user interface objects that are displayed in a first spatial arrangement; and
the first user interface object, when selected, causes the plurality of application user interface objects to transition from being displayed in the first spatial arrangement to being displayed in a second spatial arrangement, different from the first spatial arrangement.

29. The non-transitory computer-readable storage medium of claim 22, wherein the respective user interface further includes a first representation of an application user interface of a first application.

30. A method, comprising:
at a computer system that is in communication with one or more gaze-tracking sensors and a display generation component:
displaying, via the display generation component, a respective user interface, wherein displaying the respective user interface includes displaying:
a plurality of edges of the respective user interface that includes a first edge and a second edge, different from the first edge;
a first user interface object positioned along the first edge that corresponds to a first operation; and
a second user interface object positioned along the second edge that corresponds to a second operation, different from the first operation;
while displaying the first user interface object and the second user interface object, detecting, via the one or more gaze-tracking sensors, that a gaze of a user of the computer system is directed to a respective portion of the respective user interface; and
in response to detecting that the gaze of the user of the computer system is directed to the respective portion of the respective user interface:
in accordance with a determination that the respective portion of the respective user interface corresponds to the first user interface object:
performing the first operation; and
continuing to display the first user interface object while ceasing to display the second user interface object;
in accordance with a determination that the respective portion of the respective user interface corresponds to the second user interface object:
performing the second operation; and
continuing to display the second user interface object while ceasing to display the first user interface object.

31. The method of claim 30, wherein:
the respective user interface is an extended reality user interface; and
displaying the respective user interface includes displaying:
a representation of a physical environment; and
a third user interface object, wherein the third user interface object is an environment-locked virtual object.

32. The method of claim 30, wherein:
continuing to display the first user interface object while ceasing to display the second user interface object includes visually emphasizing the first user interface object; and
continuing to display the second user interface object while ceasing to display the first user interface object includes visually emphasizing the second user interface object.

33. The method of claim 30, wherein performing the first operation includes:
expanding the first user interface object from an unexpanded state to a first expanded state by expanding at least a first portion of the first user interface object, wherein the first expanded state of the first user interface object includes a first control object and first information that were not included in the unexpanded state of the first user interface object.

34. The method of claim 30, wherein the first user interface object, when selected, causes the computer system to disable a set of one or more functions that are activated by detecting the gaze of the user of the computer system.

35. The method of claim 30, wherein the respective user interface further includes a current time indicator.

36. The method of claim 30, wherein:
the respective user interface includes a plurality of application user interface objects that are displayed in a first spatial arrangement; and
the first user interface object, when selected, causes the plurality of application user interface objects to transition from being displayed in the first spatial arrangement to being displayed in a second spatial arrangement, different from the first spatial arrangement.

37. The method of claim 30, wherein the respective user interface further includes a first representation of an application user interface of a first application.

* * * * *